(12) United States Patent
Matsuoka et al.

(10) Patent No.: US 9,298,197 B2
(45) Date of Patent: Mar. 29, 2016

(54) AUTOMATED ADJUSTMENT OF AN HVAC SCHEDULE FOR RESOURCE CONSERVATION

(71) Applicant: Nest Labs, Inc., Palo Alto, CA (US)

(72) Inventors: Yoky Matsuoka, Palo Alto, CA (US); Mark Malhotra, San Mateo, CA (US); Evan J. Fisher, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/866,578

(22) Filed: Apr. 19, 2013

(65) Prior Publication Data

US 2014/0316584 A1 Oct. 23, 2014

(51) Int. Cl.
*G05D 23/19* (2006.01)
*F24F 11/00* (2006.01)

(52) U.S. Cl.
CPC .......... *G05D 23/1917* (2013.01); *F24F 11/001* (2013.01); *F24F 11/006* (2013.01); *F24F 2011/0047* (2013.01); *F24F 2011/0073* (2013.01); *F24F 2011/0075* (2013.01)

(58) Field of Classification Search
CPC .. G05D 23/1917; F24F 11/001; F24F 11/006; F24F 2011/0073; F24F 2011/0047; F24F 2011/0075
See application file for complete search history.

(56) References Cited

U.S. PATENT DOCUMENTS

| 4,223,831 A | 9/1980 | Szarka |
|---|---|---|
| 4,335,847 A | 6/1982 | Levine |
| 4,408,711 A | 10/1983 | Levine |
| 4,615,380 A | 10/1986 | Beckey |
| 4,674,027 A | 6/1987 | Beckey |
| 4,685,614 A | 8/1987 | Levine |
| 4,751,961 A | 6/1988 | Levine et al. |
| 4,847,781 A | 7/1989 | Brown, III et al. |
| 5,088,645 A | 2/1992 | Bell |
| 5,211,332 A | 5/1993 | Adams |
| 5,240,178 A | 8/1993 | Dewolf et al. |

(Continued)

FOREIGN PATENT DOCUMENTS

| CA | 2202008 C | 2/2000 |
|---|---|---|
| EP | 196069 B1 | 12/1991 |

(Continued)

OTHER PUBLICATIONS

Aprilaire Electronic Thermostats Model 8355 User's Manual, Research Products Corporation, 2000, 16 pages.

(Continued)

*Primary Examiner* — Ramesh Patel
(74) *Attorney, Agent, or Firm* — Kilpatrick Townsend & Stockton LLP

(57) ABSTRACT

Apparatus, systems, methods, and related computer program products for optimizing a schedule of setpoint temperatures used in the control of an HVAC system. The systems disclosed include an energy management system in operation with an intelligent, network-connected thermostat located at a structure. The thermostat includes a schedule of setpoint temperatures that is used to control an HVAC system associated with a structure in which the thermostat is located. The schedule of setpoint temperatures is continually adjusted by small, unnoticeable amounts so that the schedule migrates from the original schedule to an optimal schedule. The optimal schedule may be optimal in terms of energy consumption or some other terms.

20 Claims, 25 Drawing Sheets

(56) References Cited

U.S. PATENT DOCUMENTS

| | | | |
|---|---|---|---|
| 5,395,042 A | 3/1995 | Riley et al. | |
| 5,462,225 A | 10/1995 | Massara et al. | |
| 5,476,221 A | 12/1995 | Seymour | |
| 5,499,196 A | 3/1996 | Pacheco | |
| 5,544,036 A | 8/1996 | Brown, Jr. et al. | |
| 5,555,927 A | 9/1996 | Shah | |
| 5,611,484 A | 3/1997 | Uhrich | |
| 5,761,083 A | 6/1998 | Brown, Jr. et al. | |
| 5,816,491 A | 10/1998 | Berkeley et al. | |
| 5,902,183 A | 5/1999 | D'Souza | |
| 5,909,378 A | 6/1999 | De Milleville | |
| 5,977,964 A | 11/1999 | Williams et al. | |
| 6,062,482 A | 5/2000 | Gauthier et al. | |
| 6,098,893 A | 8/2000 | Berglund et al. | |
| 6,122,603 A | 9/2000 | Budike, Jr. | |
| 6,216,956 B1 | 4/2001 | Ehlers et al. | |
| 6,311,105 B1 | 10/2001 | Budike, Jr. | |
| 6,349,883 B1 | 2/2002 | Simmons et al. | |
| 6,356,204 B1 | 3/2002 | Guindi et al. | |
| 6,574,581 B1 | 6/2003 | Bohrer et al. | |
| 6,643,567 B2 | 11/2003 | Kolk et al. | |
| 6,645,066 B2 | 11/2003 | Gutta et al. | |
| 6,769,482 B2 | 8/2004 | Wagner et al. | |
| 6,785,630 B2 | 8/2004 | Kolk et al. | |
| 6,975,958 B2 | 12/2005 | Bohrer et al. | |
| 7,024,336 B2 | 4/2006 | Salsbury et al. | |
| 7,333,880 B2 | 2/2008 | Brewster et al. | |
| 7,346,467 B2 | 3/2008 | Bohrer et al. | |
| RE40,437 E | 7/2008 | Rosen | |
| 7,469,550 B2 | 12/2008 | Chapman, Jr. et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,848,900 B2 | 12/2010 | Steinberg et al. | |
| 7,854,389 B2 | 12/2010 | Ahmed | |
| 7,908,116 B2 | 3/2011 | Steinberg et al. | |
| 7,908,117 B2 | 3/2011 | Steinberg et al. | |
| 8,010,237 B2 | 8/2011 | Cheung et al. | |
| 8,019,567 B2 | 9/2011 | Steinberg et al. | |
| 8,090,477 B1 | 1/2012 | Steinberg | |
| 8,131,497 B2 | 3/2012 | Steinberg et al. | |
| 8,131,506 B2 | 3/2012 | Steinberg et al. | |
| 8,180,492 B2 | 5/2012 | Steinberg | |
| 2004/0034484 A1 | 2/2004 | Solomita, Jr. et al. | |
| 2004/0249479 A1 | 12/2004 | Shorrock | |
| 2005/0119793 A1 | 6/2005 | Amundson et al. | |
| 2005/0128067 A1 | 6/2005 | Zakrewski | |
| 2005/0189429 A1 | 9/2005 | Breeden | |
| 2005/0280421 A1 | 12/2005 | Yomoda et al. | |
| 2006/0186214 A1 | 8/2006 | Simon et al. | |
| 2006/0196953 A1 | 9/2006 | Simon et al. | |
| 2007/0241203 A1 | 10/2007 | Wagner et al. | |
| 2008/0015740 A1 | 1/2008 | Osann | |
| 2008/0015742 A1 | 1/2008 | Kulyk et al. | |
| 2008/0191045 A1 | 8/2008 | Harter | |
| 2008/0317292 A1 | 12/2008 | Baker et al. | |
| 2009/0059814 A1* | 3/2009 | Nixon et al. | 370/254 |
| 2009/0099699 A1 | 4/2009 | Steinberg et al. | |
| 2009/0125151 A1 | 5/2009 | Steinberg et al. | |
| 2009/0171862 A1 | 7/2009 | Harrod et al. | |
| 2009/0254225 A1 | 10/2009 | Boucher et al. | |
| 2009/0259713 A1 | 10/2009 | Blumrich et al. | |
| 2010/0019051 A1 | 1/2010 | Rosen | |
| 2010/0025483 A1 | 2/2010 | Hoeynck et al. | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1* | 11/2010 | Steinberg | 700/276 |
| 2010/0282857 A1 | 11/2010 | Steinberg | |
| 2010/0286937 A1* | 11/2010 | Hedley et al. | 702/60 |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0015797 A1 | 1/2011 | Gilstrap | |
| 2011/0015798 A1 | 1/2011 | Golden et al. | |
| 2011/0015802 A1 | 1/2011 | Imes | |
| 2011/0022242 A1 | 1/2011 | Bukhin et al. | |
| 2011/0046792 A1 | 2/2011 | Imes et al. | |
| 2011/0046805 A1 | 2/2011 | Bedros et al. | |
| 2011/0046806 A1 | 2/2011 | Nagel et al. | |
| 2011/0077896 A1 | 3/2011 | Steinberg et al. | |
| 2011/0106328 A1 | 5/2011 | Zhou et al. | |
| 2011/0166828 A1 | 7/2011 | Steinberg et al. | |
| 2011/0185895 A1 | 8/2011 | Freen | |
| 2011/0290893 A1* | 12/2011 | Steinberg | 236/49.3 |
| 2011/0307103 A1 | 12/2011 | Cheung et al. | |
| 2012/0053745 A1 | 3/2012 | Ng | |
| 2012/0065935 A1 | 3/2012 | Steinberg et al. | |
| 2012/0085831 A1 | 4/2012 | Kopp | |
| 2012/0086562 A1 | 4/2012 | Steinberg | |
| 2012/0089523 A1 | 4/2012 | Hurri et al. | |
| 2012/0158350 A1 | 6/2012 | Steinberg et al. | |
| 2012/0165993 A1* | 6/2012 | Whitehouse | 700/278 |
| 2012/0185101 A1 | 7/2012 | Leen et al. | |
| 2012/0221151 A1 | 8/2012 | Steinberg | |
| 2012/0310416 A1* | 12/2012 | Tepper et al. | 700/276 |
| 2013/0085616 A1 | 4/2013 | Wenzel | |

FOREIGN PATENT DOCUMENTS

| | | |
|---|---|---|
| JP | 59106311 A | 6/1984 |
| JP | 01252850 A | 10/1989 |
| KR | 10-0619733 B1 | 9/2006 |
| WO | 2010033563 A1 | 3/2010 |
| WO | 2011149600 A2 | 12/2011 |
| WO | 2012024534 A2 | 2/2012 |

OTHER PUBLICATIONS

Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321-9421 Operating Manual, Honeywell International, Inc., 2011, 120 pages.
Hunter Internet Thermostat Installation Guide, Hunter Fan Co., 2012, 8 pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
Lennox ComfortSense 5000 Owners Guide, Lennox Industries, Inc., 2007, 32 pages.
Lennox ComfortSense 7000 Owners Guide, Lennox Industries, Inc., 2009, 15 pages.
Lennox iComfort Manual, Lennox Industries, Inc., 2010, 20 pages.
NetX RP32-WIFI Network Thermostat Specification Sheet, Network Thermostat, 2012, 2 pages.
RobertShaw Product Manual 9620, Maple Chase Company, 2001, 14 pages.
RobertShaw Product Manual 9825i2, Maple Chase Company, 2006, 36 pages.

(56) References Cited

OTHER PUBLICATIONS

SCE Energy$mart Thermostat Study for Southern California Edison—Presentation of Study Results, Population Research Systems, Project #1010, Nov. 10, 2004, 51 pages.
SYSTXCCUIZ01-V Infinity Control Installation Instructions, Carrier Corp, 2012, 20 pages.
T8611G Chronotherm IV Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Perfect Climate Comfort Center PC8900A W8900A-C Product Data Sheet, Honeywell International Inc, 2001, 44 pages.
Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T2900Manual, Venstar, Inc., 2008, 113 pages.
VisionPRO TH8000 Series Installation Guide, Honeywell International, Inc., 2012, 12 pages.
VisionPRO TH8000 Series Operating Manual, Honeywell International, Inc., 2012, 96 pages.
VisionPRO Wi-Fi Programmable Thermostat, Honeywell International, Inc. Operating Manual, 2012, 48 pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.
Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.
Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Auslander et al., "UC Berkeley DR Research Energy Management Group", PowerPoint Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley., 2008, pp. 1-24 through 1-36.
De Almeida et al., "Advanced Monitoring Technologies for the Evaluation of Demand-Side Management Programs", Energy, vol. 19, No. 6, 1994, pp. 661-678.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Gevorkian, "Alternative Energy Systems in Building Design", 2009, pp. 195-200.
Hoffman et al., "Integration of Remote Meter Reading, Load Control and Monitoring of Customers' Installations for Customer Automation with Telephone Line Signaling", Electricity Distribution, 1989, CIRED 1989. 10th International Conference on, May 8-12, 1989, pp. 421-424.
Levy, "A Vision of Demand Response—2016", The Electricity Journal, vol. 19, Issue 8, Oct. 2006, pp. 12-23.
Loisos et al., "Buildings End-Use Energy Efficiency: Alternatives to Compressor Cooling", California Energy Commission, Public Interest Energy Research, Jan. 2000, 80 pages.
Lopes, "Case Studies in Advanced Thermostat Control for Demand Response", AEIC Load Research Conference, St. Louis, MO, Jul. 2004, 36 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Martinez, "SCE Energy$mart Thermostat Program", Advanced Load Control Alliance, Oct. 5, 2004, 20 pages.
Matty, "Advanced Energy Management for Home Use", IEEE Transaction on Consumer Electronics, vol. 35, No. 3, Aug. 1989, pp. 584-588.
Motegi et al., "Introduction to Commercial Building Control Strategies and Techniques for Demand Response", Demand Response Research Center, May 22, 2007, 35 pages.
Mozer, "The Neural Network House: An Environmental that Adapts to it's Inhabitants", AAAI Technical Report SS-98-02, 1998, pp. 110-114.
Mozer, M. et al., "The Neurothermostat: Predictive Optimal Control of Residential Heating Systems" appearing in M. Mozer et al. *Adv. in Neural Info. Proc.Systems 9*, Cambridge, MA: MIT Press. 1997, pp. 953-959.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort at Home: Design of a Residential Thermostat to Achieve Thermal Comfort, and Save Money and Peak Energy", University of California Berkeley, Mar. 2007, 1 page.
Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
International Search Report and Written Opinion mailed Aug. 6, 2014 for International Patent Application No. PCT/US2014/033394, 12 pages.
Honeywell Prestige THX9321 and TXH9421 Product Data, Honeywell International, Inc., 68-0311, Jan. 2012, 126 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
Venstar T5800 Manual, Venstar, Inc., Sep. 7, 2011, 63 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
International Preliminary Report on Patentability issued Oct. 20, 2015 for International Patent Application No. PCT/US2014/033394 filed Apr. 8, 2014, 9 pages.

\* cited by examiner

AUTOMATED ADJUSTMENT OF AN HVAC SCHEDULE FOR RESOURCE CONSERVATION

FIELD

This patent specification relates to systems, apparatus, methods, and related computer program products for optimizing the energy consumption of energy consuming devices. More particularly, this patent specification relates to techniques for reducing the amount of energy consumed by an HVAC system by performing either temperature-wise or time-wise microchanges to a schedule of temperature setpoints.

BACKGROUND

With increasing population sizes, costs per unit of energy, and the size and type of energy consuming devices used by consumer's today, there are increasing interests in optimizing consumers' use of energy. While typical consumer's use energy via a variety of mechanisms, heating, ventilation, and air conditioning (HVAC) systems are good candidates to direct optimization efforts as they account for up to 40% of energy consumption needs of an average consumer in the United States. Techniques for reducing the amount of energy consumed by such systems may thus advantageously result in tangible energy reductions and cost savings on an individual basis, and significant reductions in energy demand in the aggregate.

In many modern HVAC systems, the HVAC system can be controlled as a schedule of events. For example, a user may select a schedule of temperatures (i.e., temperature setpoints) that the user desires the HVAC system to control the indoor temperature to be. Such a schedule of temperature setpoints may define temperatures at which the HVAC system controls the indoor temperature of the structure when the user is home, away, sleeping, or awake. That is, the indoor temperature can be controlled for any and all times of the day, regardless of occupancy.

While implementation of a schedule of temperature setpoints by an HVAC system typically leads to a user being satisfied with the indoor temperature of the structure at any given time, the temperatures defined by the schedule may not reach the nexus between the user being comfortable and the user being uncomfortable. That is, there may be some difference in temperature between what the user set as being comfortable and at which the user is actually comfortable. Known HVAC control systems are typically strict in their adherence to the users requests for a specific schedule of temperature setpoints without concern to such possible differences, resulting in the potentially unnecessary consumption of energy. In addition to the strict adherence to the temperature-wise characteristics of a schedule of temperature setpoints (i.e., adherence to the temperature magnitudes set by the user), typical HVAC control systems are similarly strict in their adherence to the time-wise characteristics of a schedule of temperature setpoints (i.e., strict adherence to the time for which a temperature setpoint is defined by the user). Such inflexibility may result in additional inefficiencies in a variety of situations, such as when the real time price of energy consumption changes throughout the day.

BRIEF SUMMARY

Embodiments of the present invention are directed to methods for optimizing the energy consumption of HVAC systems. Such methods may include a variety of operations. For example, they may include identifying an original schedule of temperature setpoints, the original schedule of temperature setpoints defining a number of temperature setpoints over a time period. They may also include, beginning with the original schedule, for each of a succession of periodic time intervals that are each relatively short in comparison to an overall optimization time period, generating an incrementally adjusted version of the original schedule, the incremental change being directed to causing less energy usage during one of the periodic time intervals as compared to a previous one of the periodic time intervals. They may further include, for each of the succession of periodic time intervals, controlling the HVAC system according to the incrementally adjusted version of the original schedule generated for the periodic time interval.

In some embodiments, the methods may also include identifying a subset of temperature setpoints within the original schedule of temperature setpoints, the subset of temperature setpoints corresponding to a sub-interval of the time period over which the original schedule of temperature setpoints is defined. In such embodiments, generating an incrementally adjusted version of the original schedule may include adjusting the subset of temperature setpoints differently than temperature setpoints other than those in the subset.

In some embodiments, the methods may also include receiving, during one of the periodic time intervals, a user selection of a current temperature setpoint that is different than a corresponding temperature setpoint of the incrementally adjusted version of the original schedule generated for the periodic time interval. And, the methods may further include controlling the HVAC system, for at least a certain time period within the one of the period time intervals, according to the user selected current temperature setpoint rather than the corresponding temperature setpoint of the incrementally adjusted version of the original schedule.

In some embodiments, the methods may further include receiving, for one of the periodic time intervals, a user modification to a temperature setpoint of the incrementally adjusted version of the original schedule generated for the one of the periodic time intervals. The methods may also include incorporating the user modification into the incrementally adjusted version of the original schedule generated for the one of the periodic time intervals, and, for the one of the periodic time intervals and for successive time intervals, controlling the HVAC system based on the user modification to the temperature setpoint of the incrementally adjusted version of the original schedule generated for the one of the periodic time intervals Embodiments of the present invention are also directed to an intelligent network connected thermostat for controlling and operating an HVAC system in a smart home environment. The thermostat may include a variety of components, such as HVAC control circuitry operable to actuate one or more elements of the HVAC system. The thermostat may also include one or more sensors for measuring characteristics of the smart home environment. The thermostat may further include a processor coupled to the HVAC control circuitry and the one or more sensors and operable to cause the thermostat to perform a variety of operations. Such operations may include identifying an original schedule of temperature setpoints. Such operations may further include, beginning with the original schedule, for each of a succession of periodic time intervals that are each relatively short in comparison to an overall optimization time period, generating an incrementally adjusted version of the original schedule, the incremental change being directed to causing less energy usage during one of the periodic time intervals as compared to a previous one of the periodic time intervals. Such operations may also include, for each of the succession of periodic time intervals, controlling the HVAC system according to the incrementally adjusted version of the original schedule generated for the periodic time interval.

In some embodiments describing thermostats, generating an incrementally adjusted version of the original schedule may include, for each periodic time interval, offsetting a temperature of at least one temperature setpoint of the original schedule in a direction that reduces energy consumption by the HVAC system.

Embodiments of the present invention are also directed to a tangible non-transitory computer readable storage medium having instructions that, when executed by a computer processor, cause the computer processor perform a variety of operations. Such operations may include, for example, identifying an original schedule of temperature setpoints, the original schedule of temperature setpoints defining a number of temperature setpoints over a time period. Such operations may also include, beginning with the original schedule, for each of a succession of periodic time intervals that are each relatively short in comparison to an overall optimization time period, generating an incrementally adjusted version of the original schedule, the incremental change being directed to causing less energy usage during one of the periodic time intervals as compared to a previous one of the periodic time intervals. Such operations may further include, for each of the succession of periodic time intervals, controlling the HVAC system according to the incrementally adjusted version of the original schedule generated for the periodic time interval.

In some embodiments, the storage medium may further include instructions that, when executed by the computer processor, cause the computer processor to perform additional operations. Such additional operations may include, for example, identifying a first subset of temperature setpoints within the original schedule of temperature setpoints, the first subset of temperature setpoints corresponding to a first sub-interval of the time period over which the original schedule of temperature setpoints is defined, the first sub-interval corresponding to a time period during which a structure associated with the HVAC system is likely to be occupied. And, identifying a second subset of temperature setpoints within the original schedule of temperature setpoints, the second subset of temperature setpoints corresponding to a second sub-interval of the time period over which the original schedule of temperature setpoints is defined, the second sub-interval corresponding to a time period during which a structure associated with the HVAC system is unlikely to be occupied. In such embodiments, generating an incrementally adjusted version of the original schedule may include adjusting the first subset of temperature setpoints differently than the second subset of temperature setpoints, the second subset being adjusted to reduce energy usage by a greater amount than an amount resulting from adjustments made to the first subset.

Such additional operations may additionally or alternatively include, for example, identifying a first subset of temperature setpoints within the original schedule of temperature setpoints, the first subset of temperature setpoints corresponding to a first sub-interval of the time period over which the original schedule of temperature setpoints is defined. They may also include identifying a second subset of temperature setpoints within the original schedule of temperature setpoints, the second subset of temperature setpoints corresponding to a second sub-interval of the time period over which the original schedule of temperature setpoints is defined. They may further include identifying a third subset of temperature setpoints within the original schedule of temperature setpoints, the third subset of temperature setpoints corresponding to a third sub-interval of the time period over which the original schedule of temperature setpoints is defined. In some embodiments, for a first set of the succession of periodic time intervals, generating an incrementally adjusted version of the original schedule may include modifying temperature setpoints of the first subset of temperature setpoints. For a second set of the succession of periodic time intervals following the first set of periodic time intervals, generating an incrementally adjusted version of the original schedule may include modifying temperature setpoints of the second subset of temperature setpoints while simultaneously modifying temperature setpoints of the first subset of temperature setpoints. For a third set of the succession of periodic time intervals following the second set of periodic time intervals, generating an incrementally adjusted version of the original schedule may include modifying temperature setpoints of the third subset of temperature setpoints while simultaneously modifying temperature setpoints of the first subset of temperature setpoints and temperature setpoints of the second subset of temperature setpoints.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Figure 1:
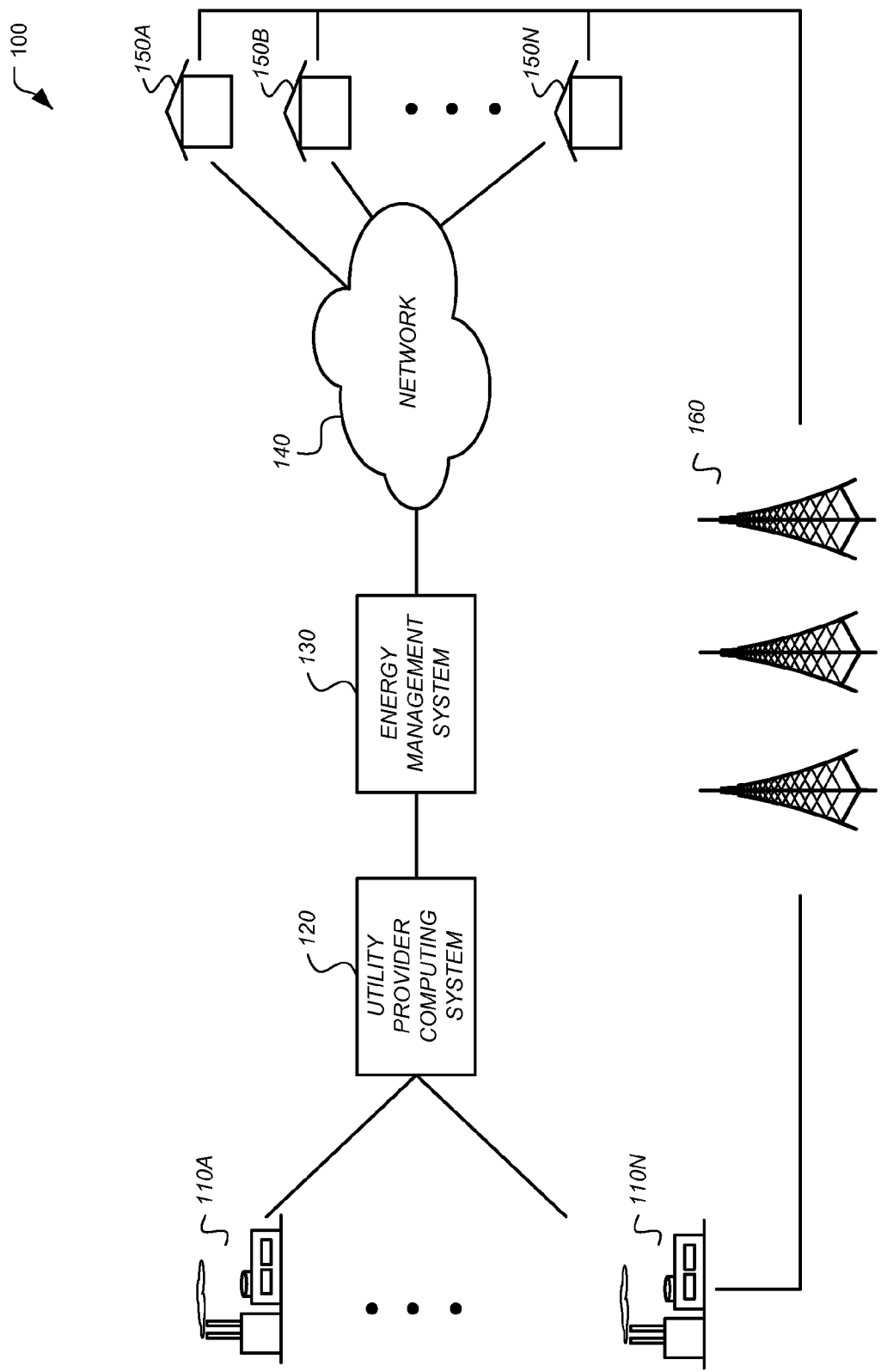
FIG. 1 depicts a system for supplying, managing, and consuming energy according to an embodiment.

Embodiments of the present invention are directed to methods for optimizing the energy consumption of HVAC systems. The entities involved in many energy consumption systems typically include a utility provider that provides electrical or other forms of energy from a power source (e.g., an electrical generator) to individual's homes or businesses. The individuals typically pay for the amount of energy they consume on a periodic, e.g., monthly, basis. In many embodiments an energy management system is disposed between the utility provider and the individuals. The energy management system may perform a variety of roles, such as administering the optimization of energy consumption of the individuals, generating optimized schedules of temperature setpoints based on original schedules of temperature setpoints, sensed data such as indoor temperature, structure occupancy, etc., predicted data such as expected outdoor temperature, user indicated preferences, and/or a variety of additional or alternative data. Such optimized schedules may then be implemented by the energy management system so as to efficiently reduce and/or redistribute both individual energy consumption and energy consumption in the aggregate.

The energy management system according to many embodiments includes an intelligent, network-connected thermostat located at the individual's homes or businesses. Such a thermostat can acquire various information about the residence, such as a thermal retention characteristic of the residence, a capacity of an HVAC associated with the residence to cool or heat the residence, a likelihood of the residence being occupied (via occupancy sensors that, over time, can build an occupancy probability profile), a forecasted weather, a real-time weather, a real-time occupancy, etc. Moreover, the thermostat can be programmed by its users or may learn, over time, the preferences and habits of its users to set scheduled temperature setpoints. In exemplary embodiments, a population of such network-connected thermostats associated with a respective population of individual homes and businesses is configured to communicate with one or more central servers managed by one or more cloud service providers. Each network-connected thermostat is associated with one or more accounts managed by the cloud service provider(s), and data is sent back and forth as needed between each network-connected thermostat and the central server(s) for providing a variety of advantageous functionalities such as facilitating remote control, reporting weather data, reporting HVAC control data and status information, and providing the centralized and/or partially centralized control and data communications useful for carrying out the schedule optimization functionalities described herein.

It is to be appreciated that although some embodiments herein may be particularly suitable and advantageous for commercial scenarios in which (i) the cloud service provider(s) associated with the population of network-connected thermostats is/are also the provider(s) of the described energy management system, (ii) the provider(s) of the energy management system are separate and distinct business entities from the utilities themselves, and (iii) the energy management system is provided as a value-added service to the utilities, the scope of the present description is in no way limited to such scenarios. In other applicable scenarios, for example, all of the elements can be provided by the utility. In other applicable scenarios, some of the elements can be provided by the utility while other elements can be provided by a governmental entity or by miscellaneous combinations of disparate cooperating businesses or consortia. Prior to a particular schedule optimization, based on a wealth of information the energy management system possesses regarding the residence(s) it is managing, the energy management system can effectively predict how much energy a residence is likely to consume given a particular schedule of setpoint temperatures. Such information may be used for a variety of purposes, including determining whether the residence is a suitable candidate for schedule optimization. Once a particular residence has been determined to be a suitable candidate for schedule optimization, some or all of the wealth of information may subsequently be used to optimize the schedule of temperature setpoints for that particular residence in such a fashion that the amount of energy consumption and/or cost of energy consumption is reduced and/or shifted without a noticeable change in comfort to occupants of that residence. In some cases, such optimizations may even result in continued levels of comfort for the occupants where a continued static schedule would have otherwise resulted in noticeable discomforts.

The described provisions for such energy consumption prediction and management bring about many advantages as described further herein. For example, not only do they allow the energy management system to effectively manage the energy consumption of a number of connected residences, but they also allow the energy management system to intelligently select a subset of residences from a large pool for participation in schedule optimization events. The physical characteristics of residences, geographical characteristics of residences, and habitual tendencies of occupants of those residents vary widely across regions, and thus the potential energy savings/shifting also varies widely. The energy management system disclosed herein may intelligently choose the participants in an energy savings program to maximize efficiency and minimize costs including unnecessary disturbances to occupants. Various energy management systems are further described in commonly assigned U.S. Ser. No. 13/842,213 (Ref. No. NES0253-US), filed Mar. 15, 2013, the entire contents of which are incorporate by reference herein in their entirety for all purposes.

The specifics of these and other embodiments are further disclosed herein, and a further understanding of which can be appreciated with reference to the figures. Turning now then to the Figures, FIG. 1 depicts a system 100 for supplying, managing, and consuming energy according to an embodiment. System 100 includes a plurality of electrical power generators 110A-110N, a utility provider computing system 120, an energy management system 130, a communication network 140, a plurality of energy consumer residences 150A-150N, and a power distribution network 160.

Electrical power generators 110A-110N are operable to generate electricity or other type of energy (e.g., gas) using one or more of a variety of techniques known in the art. For example, electrical power generators 110A-110N may include hydroelectric systems, nuclear power plants, fossil-fuel based power plants, solar plants, wind plants, gas processing plants, etc. The amount of electricity that may be generated at any given time may limited to some maximum energy supplied that is determined by the generators 110A-110N. Further, the electrical power generators 110A-110N may be owned and managed by a utility provider implementing the utility provider computing system 120, or may be owned and/or managed by one or more third party entities that contract with the utility provider to provide source energy to customers of the utility provider.

Utility provider computing system 120 is a computing system operable to communicate with one or more of the electrical power generators 110A-110N, the energy management system 130, and in some embodiments electronic systems in one or more of the residences 150A-150N. The utility provider associated with the utility provider company system 120 typically manages the distribution of electricity from the electrical power generators 110A-110N to energy consumers at the residences 150A-150N. This management includes ensuring the electricity is successfully communicated from the power generators 110A-110N to the residences 150A-150N, monitoring the amount of energy consumption at each of the residences 150A-150N, and collecting fees from occupants of the residences 150A-150N in accordance with the their respective monitored amount of energy consumption. The utility provider computing system 120 may perform one or more of the operations described herein, and may include a variety of computer processors, storage elements, communications mechanisms, etc. as further described herein and as necessary to facilitate the described operations.

Energy management system 130 is a computing system operable to intelligently and efficiently manage the energy consumption at one or more of the residences 150A-150N while optionally providing reporting and control mechanisms to the utility provider computing system 120. The energy management system 130 may be operable to engage in real-time two-way communications with electronic devices associated with the residences 150A-150N via the network 140, as well as in engage in real-time two-way communications with the utility provider computing system 120. In one particular embodiment, the energy management system 130 may be operable to reduce the aggregate amount of energy consumed at the residences 150A-150N so as to reduce the energy supply requirements of the power generators 110A-110N. Such reductions may be achieved at one or more of a variety of times. For example, such reductions may be achieved at the beginning of weather periods that are relatively constant with respect to other weather periods (i.e., relatively small shifts in average daily temperatures). In some environments, this may be at the beginning of spring or autumn seasons. However, in other environments, this may be at the beginning of summer or winter seasons. Some environments may have relatively constant weather periods year-round, in which case it may be desirable to perform schedule optimization to achieve energy reductions only once or once per annum.

Network 140 is any suitable network for enabling communications between various entities, such as between one or more components of the energy management system 130 and one or more electronic devices associated with one or more of the residences 150A-150N. Such a network may include, for example, a local area network, a wide-area network, a virtual private network, the Internet, an intranet, an extranet, a public switched telephone network, an infrared network, a wireless network, a wireless data network, a cellular network, or any other such wired or wireless network(s) or combination(s) thereof. The network 140 may, furthermore, incorporate any suitable network topology. Network 140 may utilize any suitable protocol, and communication over the network 140 may be enabled by wired or wireless connections, and combinations thereof.

Residences 150A-150N are a variety of structures or enclosures that are associated with energy consumption. The structures may span a variety of structure types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in residential living context, it is to be appreciated that this is for purposes of clarity of description and not by way of limitation.

The residences 150A-150N typically include one or more energy consumption devices, which could be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, the residences 150A-150N may include a natural gas (air/water/etc.) heater, stove, fireplace, etc. The residences 150A-150N in many embodiments include one or more control devices that control energy consumption by one or more of the aforementioned energy consumption devices. For example, they may include an intelligent, network connected thermostat that is operable to control the thermal environment of the residence. The thermostats may be considered to be part of the energy management system 130, in that much of the processing subsequently described herein may be performed by computing systems at the energy management system 130 or by the thermostats themselves. Alternatively, the thermostats may be considered to be separate from the energy management system 130 due to their remote geographical location with respect to other components of the energy management system 130. In either case, electronic devices associated with the residences 150A-150N may perform one or more of the operations described herein, and may include a variety of computer processors, storage elements, communications mechanisms, etc. as further described herein and as necessary to facilitate the described operations. While most embodiments are described in the context of situations where it is desired to reduce the temperature inside of the structure (e.g., during a hot summer), similar principles apply (just applied in the opposite) in situations where it is desired to increase the temperature inside of the structure (e.g., during a cold winter). For some embodiments, some or all of the intelligent, network-connected thermostats may be the same as or similar in functionality to the NEST LEARNING THERMOSTAT® available from Nest Labs, Inc. of Palo Alto, Calif.

Power distribution network 160 is any suitable network for transferring energy from one or more of the electrical power generators 110A-110N to one or more of the residences 150A-150N. In an electrical distribution network, power distribution network 160 may include a variety of power lines, substations, pole-mounted transformers, and the like as known in the art for carrying electricity from the electrical power generators 110A-110N to the residences 150A-150N. In a gas distribution network, power distribution network 160 may include a variety of compressor stations, storage elements, pipes, and the like for transporting natural or other types of energy producing gas from the power generators 110A-110N (in this embodiment, gas wells and/or processing plants) to the residences 150A-150N.

System 100 in certain embodiments is a distributed system for supplying, managing, and consuming energy, and in some embodiments may be a system for managing demand-response programs and events utilizing several computer systems and components that are interconnected via communication links using one or more computer networks or direct connections. However, it will be appreciated by those skilled in the art that such systems could operate equally well in systems having fewer or a greater number of components than are illustrated in FIG. 1. Thus, the depiction of system 100 in FIG. 1 should be taken as being illustrative in nature, and not as limiting the scope of the present teachings.

Figure 2:
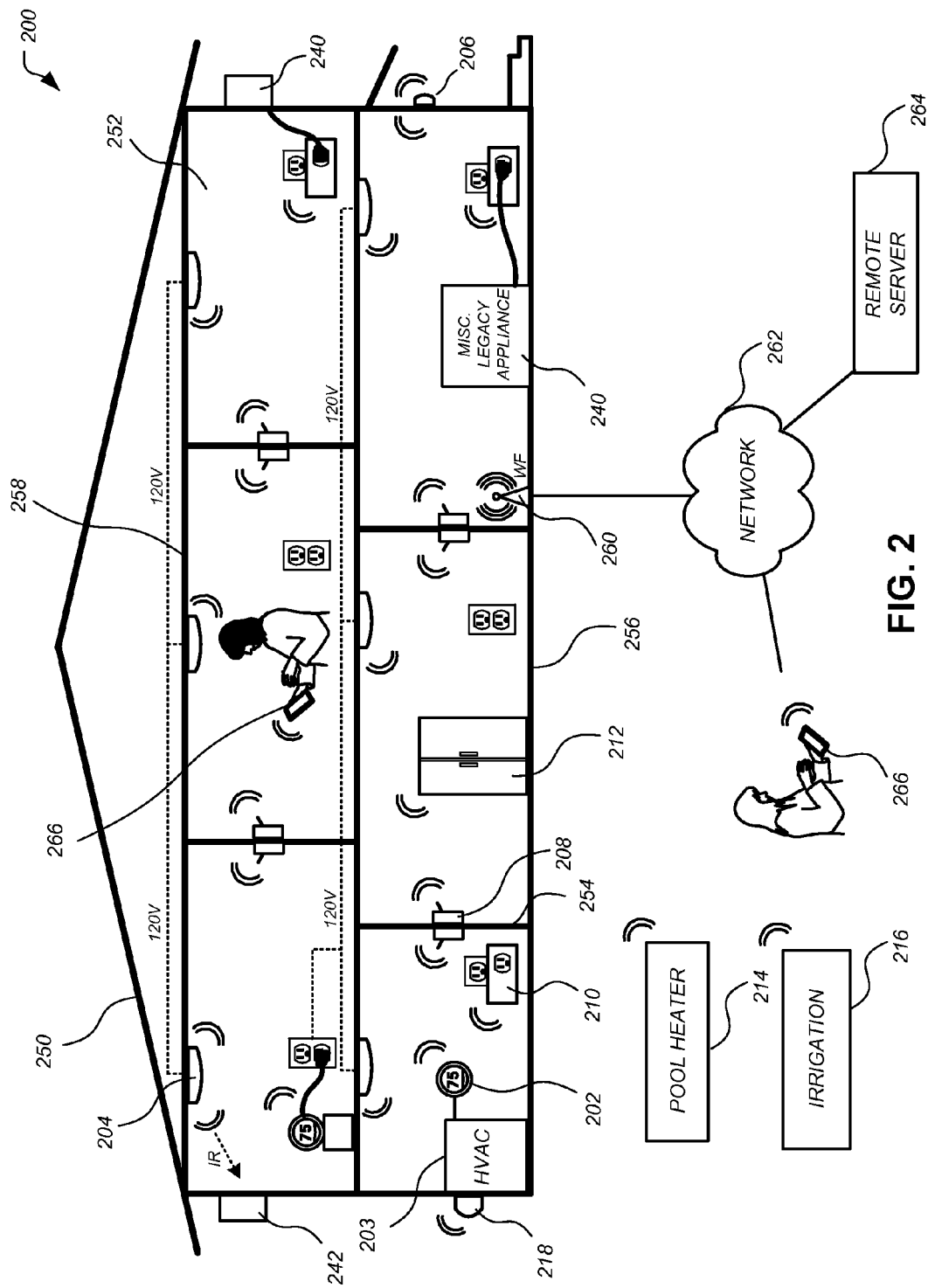
FIG. 2 illustrates an example of a smart home environment within which one or more of the devices, methods, systems, services, and/or computer program products described further herein can be applicable.

FIG. 2 illustrates an example of a smart home environment 200 within which one or more of the devices, methods, systems, services, and/or computer program products described further herein can be applicable. The depicted smart home environment includes a structure 250, which can include, e.g., a house, office building, garage, or mobile home. In some embodiments, the structure 250 may correspond to one of structures 150A-150N described with reference to FIG. 1. In addition to the structure 250, the smart home environment 200 also includes a network 262 and remote server 264 which, in one embodiment, respectively correspond to network 140 and energy management system 130 (FIG. 1). While the structure 250 as depicted includes a variety of components and devices as further described herein, a number of components and devices, such as pool heater 214, irrigation system 216, and access device 266 may also be associated with (e.g., powered at) the structure 250 without being physically attached or disposed within or on the structure 250.

The smart home environment 200 includes a plurality of rooms 252 separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258. The various devices that may be incorporated within the smart home environment 200 include intelligent, multi-sensing, network-connected devices that can integrate seamlessly with each other and/or with cloud-based server systems to provide any of a variety of useful smart home objectives. An intelligent, multi-sensing, network-connected thermostat 202 can detect ambient climate characteristics (e.g., temperature and/or humidity) and control a heating, ventilation and air-conditioning (HVAC) system 203. It should be recognized that while control of an HVAC system is described herein, similar principles can equally be applied to controlling other temperature/humidity control systems, such as a heating system, an air conditioning system, a humidity control system, or any combination thereof. One or more intelligent, network-connected, multi-sensing hazard detection units 204 can detect the presence of a hazardous substance and/or a hazardous condition in the home environment (e.g., smoke, fire, or carbon monoxide). One or more intelligent, multi-sensing, network-connected entryway interface devices 206, which can be termed a "smart doorbell", can detect a person's approach to or departure from a location, control audible functionality, announce a person's approach or departure via audio or visual means, or control settings on a security system (e.g., to activate or deactivate the security system).

In some embodiments, the smart home may include at least one energy consumption meter 218 such as a smart meter. The energy consumption meter 218 monitors some or all energy (electricity, gas, etc.) consumed by the devices in and around the structure 250. The energy consumption meter 218 may display the amount of energy consumed over a given period of time on a surface of the meter 218. The given period may be, e.g., a second, a minute, an hour, a day, a month, a time span less than one second, a time span greater than a month, or a time span between one second and one month. In some embodiments, the energy consumption meter 218 may include communication capabilities (wired or wireless) that enable the meter 218 to communicate various information, e.g., the amount of energy consumed over one or more given periods, the price of energy at any particular time or during any particular period of time, etc. The communication capabilities may also enable the meter to receive various information. For example, the meter may receive instructions for controlling one or more devices in the smart home such as the HVAC system 203, the price of energy at any particular time or during any particular period of time, etc. To facilitate control of devices in and around the structure 250, the meter 218 may be wired or wirelessly connected to such devices.

Each of a plurality of intelligent, multi-sensing, network-connected wall light switches 208 can detect ambient lighting conditions, detect room-occupancy states and control a power and/or dim state of one or more lights. In some instances, light switches 208 can further or alternatively control a power state or speed of a fan, such as a ceiling fan. Each of a plurality of intelligent, multi-sensing, network-connected wall plug interfaces 210 can detect occupancy of a room or enclosure and control supply of power to one or more wall plugs (e.g., such that power is not supplied to the plug if nobody is at home). The smart home may further include a plurality of intelligent, multi-sensing, network-connected appliances 212, such as refrigerators, stoves and/or ovens, televisions, washers, dryers, lights (inside and/or outside the structure 250), stereos, intercom systems, garage-door openers, floor fans, ceiling fans, whole-house fans, wall air conditioners, pool heaters 214, irrigation systems 216, security systems, and so forth. While descriptions of FIG. 2 can identify specific sensors and functionalities associated with specific devices, it will be appreciated that any of a variety of sensors and functionalities (such as those described throughout the specification) can be integrated into the device.

In addition to containing processing and sensing capabilities, each of the devices within the smart home environment 200 can be capable of data communications and information sharing with any other devices within the smart home environment 200, as well as to any devices outside the smart home environment 240 such as the access device 266 and/or remote server 264. The devices can send and receive communications via any of a variety of custom or standard wireless protocols (Wi-Fi, ZigBee, 6LoWPAN, IR, IEEE 802.11, IEEE 802.15.4, etc.) and/or any of a variety of custom or standard wired protocols (CAT6 Ethernet, HomePlug, etc.). The wall plug interfaces 210 can serve as wireless or wired repeaters, and/or can function as bridges between (i) devices plugged into AC outlets and communicating using Homeplug or other power line protocol, and (ii) devices that are not plugged into AC outlets.

For example, a first device can communicate with a second device via a wireless router 260. A device can further communicate with remote devices via a connection to a network, such as the network 262. Through the network 262, the device can communicate with a central (i.e., remote) server or a cloud-computing system 264. The remote server or cloud-computing system 264 can be associated with a manufacturer, support entity or service provider associated with the device. In one embodiment, a user may be able to contact customer support using a device itself rather than needing to use other communication means such as a telephone or Internet-connected computer.

Devices' network connections can further allow a user to interact with the device even if the user is not proximate to the device. For example, a user can communicate with a device (e.g., thermostat 202) using a computer (e.g., a desktop computer, laptop computer, or tablet) or other portable electronic device (e.g., a smartphone) 266. A webpage or software application can be configured to receive communications from the user and control the device based on the communications and/or to present information about the device's operation to the user. For example, when the portable electronic device 266 is being used to interact with the thermostat 202, the user can view a current setpoint temperature for a thermostat and adjust it using the portable electronic device 266. The user can be in the structure during this remote communication or outside the structure. The communications between the portable electronic device 266 and the thermostat 202 may be routed via the remote server 264 (e.g., when the portable electronic device 266 is remote from structure 250) or, in some embodiments, may be routed exclusive of the remote server 264.

The smart home environment 200 also can include a variety of non-communicating legacy appliances 240, such as old conventional washer/dryers, refrigerators, and the like which can be controlled, albeit coarsely (ON/OFF), by virtue of the wall plug interfaces 210. The smart home can further include a variety of partially communicating legacy appliances 242, such as IR-controlled wall air conditioners or other IR-controlled devices, which can be controlled by IR signals provided by the hazard detection units 204 or the light switches 208 or, in some embodiments, by using socket-based communication protocol such as powerline to communicate via a wall plug interface 210.

It should be recognized that some or all of the components located inside and outside of structure 250 may be considered part of energy management system 130 depending on the embodiment. In general, devices or components which facilitate control of other energy consumption devices may be considered to be part of energy management system 130. For example, thermostat 202 and access device 266 may be part of energy management system 130 while energy consuming components such as HVAC 203, pool heater 214, and legacy appliances 240 may be considered external to energy management system 130 as they comprise energy consuming elements that are controllable by the thermostat 202 and access device 266. In other examples, however, additional or alternative components of smart home environment 200 may be considered part of energy management system 130, such as hazard detection units 204, entryway interface devices 206, light switches 208, plug interface 210, etc., as they may provide monitoring (and/or control) functionality for the energy management system 130 to assist the system 130 in making intelligent energy management decisions. In yet other examples, none of the devices of the smart home environment (except for remote server 264) may be part of energy management system 130, but rather one or more of the devices of the smart home environment 200 may be submissive devices that are remotely controlled by energy management system 130 to perform monitoring and/or energy consumption tasks.

Smart home 200 in certain embodiments is an environment including a number of client devices and access devices all operable to communicate with one another as well as with devices or systems external to the smart home 200 such as remote server 264. However, it will be appreciated by those skilled in the art that such an environment could operate equally well having fewer or a greater number of components than are illustrated in FIG. 2. One particular example of a smart-home environment including various elements having differing functionality is described in detail in commonly assigned U.S. Provisional Ser. No. 61/704,437 (Ref. No. NES0254-US), filed Sep. 21, 2012, the entire contents of which are incorporated by reference herein in their entirety for all purposes. Thus, the depiction of the smart home environment 200 in FIG. 2 should be taken as being illustrative in nature, and not limiting to the scope of the present teachings.

Figure 3A:
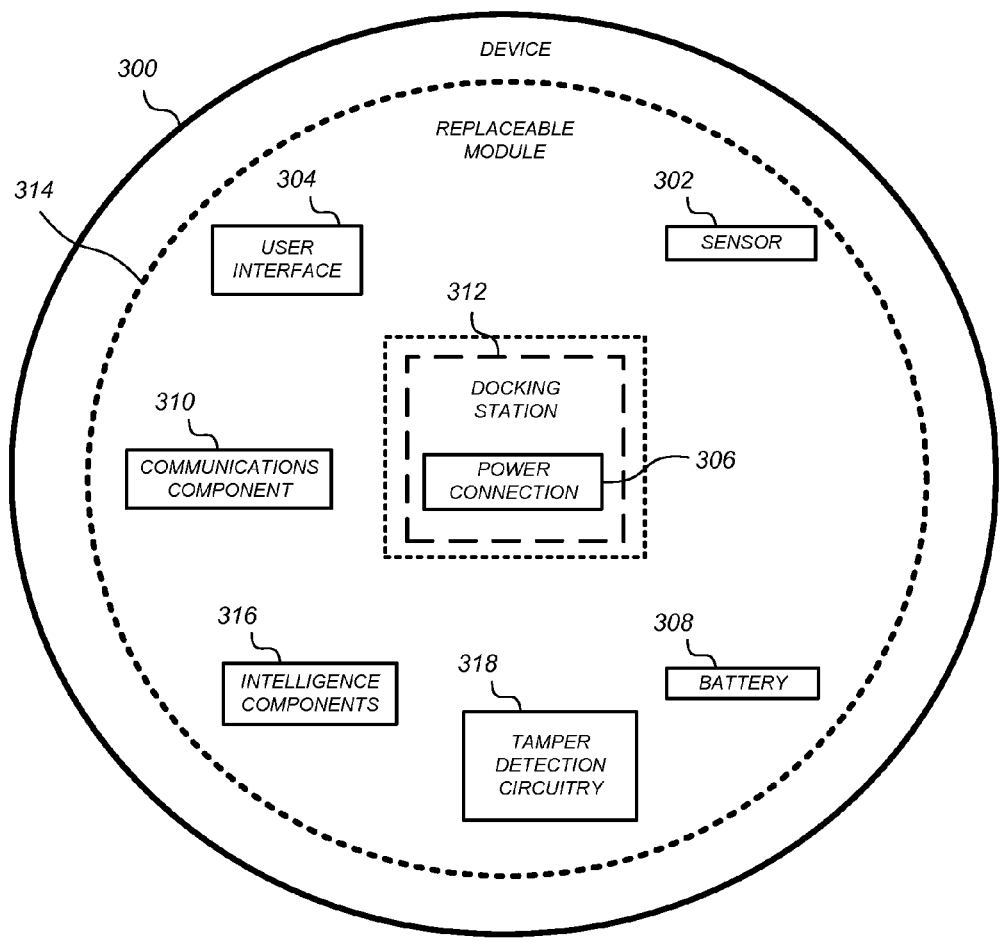
FIG. 3A illustrates an example of general device components which can be included in an intelligent, network-connected device according to an embodiment.

FIG. 3A illustrates an example of general device components which can be included in an intelligent, network-connected device 300 (i.e., "device"). Device 300 may be implemented as one or more of the various devices discussed with reference to FIG. 2, such as thermostat 202, hazard detection unit 204, entryway interface device 206, wall light switch 208, wall plug interface 210, etc. Much of the following discussion presents the device 300 as being a thermostat 202, but it should be recognized that embodiments are not so limited. Each of one, more or all devices 300 within a system of devices can include one or more sensors 302, a user-interface component 304, a power supply (e.g., including a power connection 306 and/or battery 308), a communications component 310, a modularity unit (e.g., including a docking station 312 and replaceable module 314), intelligence components 316, and tamper detection circuitry 318. Particular sensors 302, user-interface components 304, power-supply configurations, communications components 310, modularity units, intelligence components 316, and/or wire tamper detection circuitry 318 can be the same or similar across devices 300 or can vary depending on device type or model.

By way of example and not by way of limitation, one or more sensors 302 in a device 300 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 302 can include temperature sensor(s), humidity sensor(s), hazard-related sensor(s) or other environmental sensor(s), accelerometer(s), microphone(s), optical sensor(s) up to and including camera(s) (e.g., charged-coupled-device or video cameras), active or passive radiation sensor(s), GPS receiver(s) or radio-frequency identification detector(s). While FIG. 3A illustrates an embodiment with a single sensor, many embodiments will include multiple sensors. In some instances, device 300 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 304 in device 300 may be configured to present information to a user via a visual display (e.g., a thin-film-transistor display or organic light-emitting-diode display) and/or an audio speaker and/or some other communication medium. User-interface component 304 can also include one or more user-input components to receive information from a user, such as a touchscreen, buttons, scroll component (e.g., a movable or virtual ring component), microphone or camera (e.g., to detect gestures). In one embodiment, user-interface component 304 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 304 includes a camera, such that gestures can be detected (e.g., to indicate that a power or alarm state of a device is to be changed).

A power-supply component in device 300 may include a power connection 306 and/or local battery 308. For example, power connection 306 can connect device 300 to a power source such as a line voltage source. In some instances, connection 306 to an AC power source can be used to repeatedly charge a (e.g., rechargeable) local battery 308, such that battery 308 can later be used to supply power if needed in the event of an AC power disconnection or other power deficiency scenario.

A communications component 310 in device 300 can include a component that enables device 300 to communicate with a central server, such as remote server 264, or a remote device, such as another device 300 described herein or a portable user device. Communications component 310 can allow device 300 to communicate using one or more wired or wireless communication techniques, either simultaneously or sequentially, such as Wi-Fi, ZigBee, 3G/4G wireless, IEEE 802.11, IEEE 802.15.4, 6-LO-PAN, Bluetooth, CAT6 wired Ethernet, HomePlug or other powerline communications method, telephone, or optical fiber, by way of non-limiting examples. Communications component 310 can include one or more wireless cards, Ethernet plugs, or other transceiver connections. In some embodiments, the communications component 310 facilitates communication with a central server to synchronize information between device 300, the central server, and in some cases additional devices. Techniques for synchronizating data between such devices are further described in the commonly assigned U.S. Ser. No. 13/624,892 (Ref. No. NES0231-US), filed Sep. 22, 2012, the contents of which are incorporated by reference herein in their entirety for all purposes.

A modularity unit in device 300 can include a static physical connection, and a replaceable module 314. Thus, the modularity unit can provide the capability to upgrade replaceable module 314 without completely reinstalling device 300 (e.g., to preserve wiring). The static physical connection can include a docking station 312 (which may also be termed an interface box) that can attach to a building structure. For example, docking station 312 could be mounted to a wall via screws or stuck onto a ceiling via adhesive. Docking station 312 can, in some instances, extend through part of the building structure. For example, docking station 312 can connect to wiring (e.g., to 120V line voltage wires) behind the wall via a hole made through a wall's sheetrock. Docking station 312 can include circuitry such as power-connection circuitry 306 and/or AC-to-DC powering circuitry and can prevent the user from being exposed to high-voltage wires. Docking station 312 may also or alternatively include control circuitry for actuating (i.e., turning on and off) elements of an HVAC system, such as a heating unit (for heating the building structure), an air-condition unit (for cooling the building structure), and/or a ventilation unit (for circulating air throughout the building structure). In some instances, docking stations 312 are specific to a type or model of device, such that, e.g., a thermostat device includes a different docking station than a smoke detector device. In some instances, docking stations 312 can be shared across multiple types and/or models of devices 300.

Replaceable module 314 of the modularity unit can include some or all sensors 302, processors, user-interface components 304, batteries 308, communications components 310, intelligence components 316 and so forth of the device. Replaceable module 314 can be configured to attach to (e.g., plug into or connect to) docking station 312. In some instances, a set of replaceable modules 314 are produced with the capabilities, hardware and/or software, varying across the replaceable modules 314. Users can therefore easily upgrade or replace their replaceable module 314 without having to replace all device components or to completely reinstall device 300. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 316 of the device can support one or more of a variety of different device functionalities. Intelligence components 316 generally include one or more processors configured and programmed to carry out and/or cause to be carried out one or more of the advantageous functionalities described herein. The intelligence components 316 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 316 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 316 can be configured to detect when a location (e.g., a house or room) is occupied, up to and including whether it is occupied by a specific person or is occupied by a specific number and/or set of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 316 may include image-recognition technology to identify particular occupants or objects.

In some instances, intelligence components 316 can be configured to predict desirable settings and/or to implement those settings. For example, based on the presence detection, intelligence components 316 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 316 can initiate an audio or visual indicator of where the person, animal or object is or can initiate an alarm or security feature if an unrecognized person is detected under certain conditions (e.g., at night or when lights are out). As yet another example, intelligence components 316 can detect hourly, weekly or even seasonal trends in user settings and adjust settings accordingly. For example, intelligence components 316 can detect that a particular device is turned on every week day at 6:30 am, or that a device setting is gradually adjusted from a high setting to lower settings over the last three hours. Intelligence components 316 can then predict that the device is to be turned on every week day at 6:30 am or that the setting should continue to gradually lower its setting over a longer time period.

In some instances, devices can interact with each other such that events detected by a first device influence actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Tamper detection circuitry 318 may be part or separate from intelligence components 316. Tamper detection circuitry 318 may include software and/or hardware operable to detect tampering of the device 300. Tampering may include, e.g., a disconnect between the device 300 and the HVAC indicative of a user attempt to obviate HVAC control by the remote server, a change in impedance or power consumption by the HVAC indicative of a user attempt to obviate HVAC control by the remote server, etc.

Figure 3B:
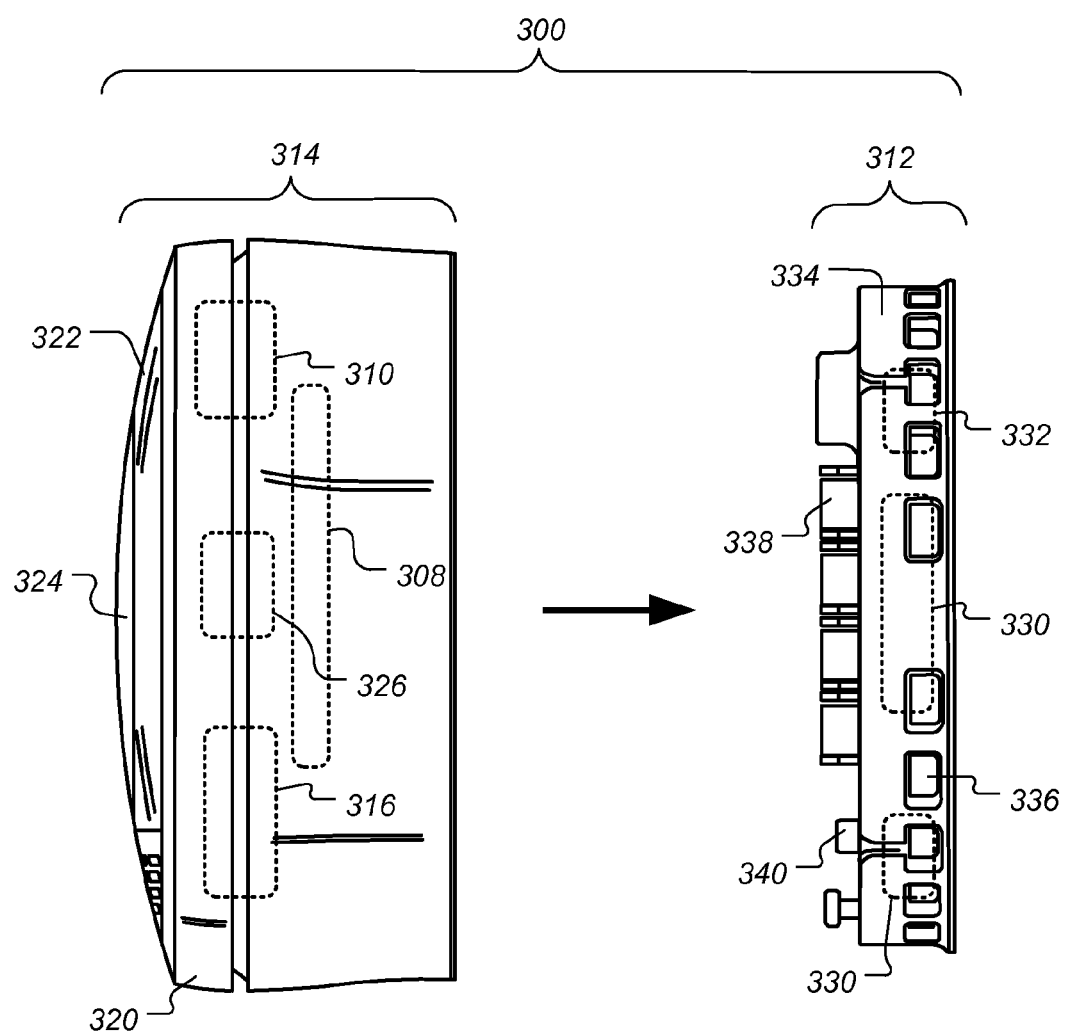
FIG. 3B illustrates an intelligent, network-connected device having a replaceable module and a docking station according to an embodiment.

FIG. 3B illustrates an intelligent, network-connected device 300 having a replaceable module 314 (e.g., a head unit) and a docking station 312 (e.g., a back plate) for ease of installation, configuration, and upgrading according to some embodiments. As described hereinabove, device 300 may be wall mounted, have a circular shape, and have an outer rotatable ring 320 (that may be, e.g., part of user interface 304) for receiving user input. Outer rotatable ring 320 allows the user to make adjustments, such as selecting a new target temperature. For example, by rotating outer ring 320 clockwise, a target setpoint temperature can be increased, and by rotating the outer ring 320 counter-clockwise, the target setpoint temperature can be decreased. Changes to an existing setpoint temperature that reflect a desire for the temperature in the structure to be immediately changed to that setpoint temperature may herein be referred to as changes to an "immediate setpoint temperature" or a "current setpoint temperature". This is in contrast to setpoint temperatures that may be provided in a hourly, daily, weekly, monthly, or other schedule in which setpoint temperatures may reflect a desire for future temperatures in the structure. Such setpoint temperatures may herein be referred as "scheduled setpoint temperature" or as a "schedule of setpoint temperatures".

Device 300 has a cover 322 that includes a display 324 (that may be, e.g., part of user interface 304). Head unit 314 slides onto back plate 312. Display 324 may display a variety of information depending on, e.g., a current operational state of the device 300, direct user interaction with the device via ring 320, sensed presence of the user via, e.g., a proximity sensor 302 (such as a passive infrared motion sensor), remote user interaction with the device via a remote access device, etc. For example, display 324 may display central numerals that are representative of a current setpoint temperature.

According to some embodiments the connection of the head unit 314 to back plate 312 can be accomplished using magnets, bayonet, latches and catches, tabs or ribs with matching indentations, or simply friction on mating portions of the head unit 314 and back plate 312. According to some embodiments, the head unit 314 includes battery 308, communications component 310, intelligence components 316, and a display driver 326 (that may be, e.g., part of user interface 304). Battery 308 may be recharged using recharging circuitry (that may be, e.g., part of intelligence components 316 and/or may be included in the back plate 312) that uses power from the back plate 312 that is either obtained via power harvesting (also referred to as power stealing and/or power sharing) from the HVAC system control circuit(s) or from a common wire, if available, as described in further detail in commonly assigned co-pending U.S. Ser. No. 13/034,674 (Ref. No. NES0006-US) and Ser. No. 13/034,678 (Ref. No. NES0007-US), both filed Feb. 24, 2011, and commonly assigned U.S. Ser. No. 13/267,871 (Ref. No. NES0158-US), filed Oct. 6, 2011, all of which are incorporated by reference herein in their entirety for all purposes. According to some embodiments, battery 308 is a rechargeable single cell lithium-ion, or a lithium-polymer battery.

Back plate 312 includes electronics 330 and a temperature sensor 332 (that may be, e.g., one of sensors 302) in housing 334, which are ventilated via vents 336. Temperature sensor 332 allows the back plate 312 to operate as a fully functional thermostat even when not connected to the head unit 314. Wire connectors 338 are provided to allow for connection to HVAC system wires, such as connection to wires for actuating components of the HVAC system, wires for receiving power from the HVAC system, etc. Connection terminal 340 is a male or female plug connector that provides electrical connections between the head unit 314 and back plate 312. Various arrangements for connecting to and controlling an HVAC system are further described in U.S. patent application Ser. Nos. 13/034,674 and 13/034,678, supra.

In some embodiments, the back plate electronics 330 includes an MCU processor, and driver circuitry for opening and closing the HVAC control circuits, thereby turning on and turning off the one or more HVAC functions such as heating and cooling. The electronics 330 also includes flash memory which is used to store a series of programmed settings that take effect at different times of the day, such that programmed setpoint (i.e., desired temperature) changes can be carried out even when the head unit 314 is not attached to the back plate 312. According to some embodiments, the electronics 330 also includes power harvesting circuitry (that may be in addition or alternatively to that provided in head unit 314) to obtain power from the HVAC control circuit(s) even when an HVAC common power wire is not available. In various embodiments, tamper detection circuitry 318 (FIG. 3A) may also be incorporated in one or more of the head unit 314 and back plate 312 such that tampering may be detected regardless of whether the head unit 314 is coupled to the back plate 312.

Figure 3C:
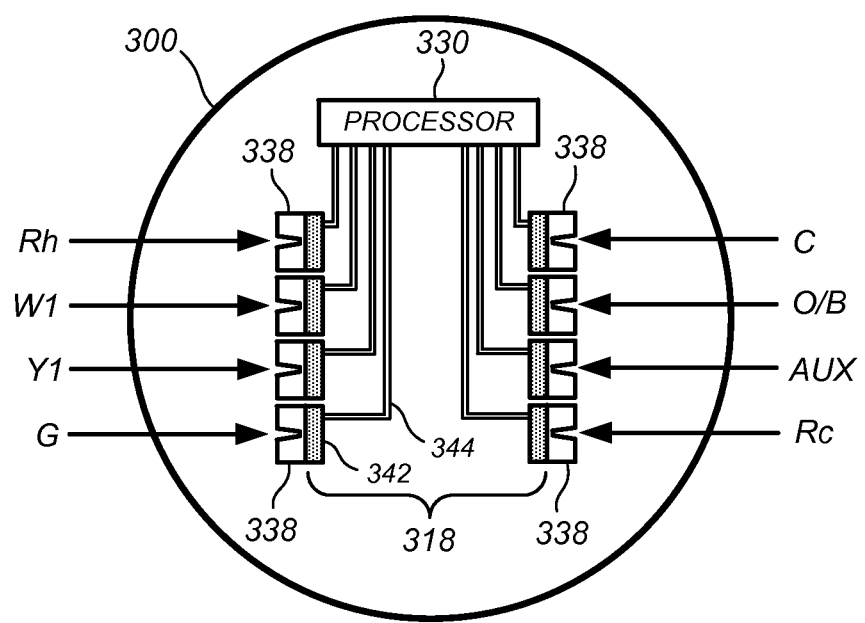
FIG. 3C illustrates connection ports and wire insertion sensing circuitry of an intelligent, network-connected device according to an embodiment.

FIG. 3C illustrates a conceptual diagram of the device 300 with particular reference to the wire connectors 338 and tamper detection circuitry 318. It is to be appreciated that the wire connectors 338 and tamper detection circuitry 318 can, in whole or in part, be separably or inseparably integral with the main body of the device 300 without departing from the scope of the present teachings. Thus, for example, for one embodiment the wire connectors 338 and tamper detection circuitry 318 can be inseparably integral with the main body of the device 300, with the HVAC wires being inserted directly into the back before placement on the wall as a single monolithic unit. In another embodiment, the wire connectors 338 and tamper detection circuitry 318 can be located in a wall plate unit to which the main body of the thermostat attaches, it being understood that references herein to the insertion of wires into the thermostat encompass embodiments in which the wires are inserted into the wall plate and the main body is attached to the wall plate to form the completed device 300.

As illustrated in FIG. 3C, each wire connector 338 is associated with a predetermined HVAC signal type. For one embodiment that has been found to provide an optimal balance between simplicity of installation for do-it-yourselfers and a reasonably broad retrofit applicability for a large number of homes, there are eight (8) wire connectors 338 provided, which are dedicated respectively to a selected group of HVAC signal types consisting of heating call power (Rh), heating call (W1), cooling call (Y1), fan call (G), common (C), heat pump (O/B), auxiliary (AUX), and heating call power (Rh). Preferably, the device 300 is of a "jumperless" type according to the commonly assigned U.S. Ser. No. 13/034,674, supra, such that (i) the Rh and Rc connection ports automatically remain shunted together for cases in which there is a single call power wire provided by the HVAC system, one or the other connection port receiving a single call power wire (which might be labeled R, V, Rh, or Rc depending on the particular HVAC installation), and (ii) the Rh and Rc connection ports are automatically electrically segregated for cases in which there are dual call power wires provided by the HVAC system that are inserted.

According to one embodiment, tamper detection circuitry 318 includes, for each wire connector 338, a port sensing circuit 342 that communicates with the back plate electronics 330 over a pair of electrical leads 344. Although the port sensing circuit 342 can operate in a variety of different ways without departing from the scope of the present teachings, in one embodiment the control port sensing circuit 342 comprises a two-position switch (not shown) coupled to the electrical leads 344, the two-position switch being closed to short the electrical leads 344 together when no wire has been inserted into the associated wire connector 338, the two-position switch being mechanically urged into an open position to electrically segregate the electrical leads 344 when a wire is inserted into the associated wire connector 338. The back plate electronics 330 thereby is able to readily sense when a wire is inserted into the connection port by virtue of the shorted or open state of the electrical leads 344. One particularly advantageous configuration that implements the combined functionality of the wire connector 338 and the port sensing circuit 342 is described in the commonly assigned U.S. Ser. No. 13/034,666 (Ref. No. NES0035-US), filed Feb. 24, 2011, the contents of which are incorporated by reference in their entirety for all purposes.

Device 300 in certain embodiments is an intelligent, network-connected learning thermostat that includes various components such as a head unit, a back plate, a user interface, communications components, intelligent components, etc. However, it will be appreciated by those skilled in the art that devices that perform the various operations described herein could operate equally well with fewer or a greater number of components than are illustrated in FIGS. 3A through 3C. For example, the device 300 may be formed as a single unit rather than multiple modules, and may include more or fewer components than described with reference to FIGS. 3A to 3C. For example, the device 300 may be formed as described in U.S. Ser. No. 13/624,878, filed Sep. 21, 2012, and/or as described in U.S. Ser. No. 13/632,148, filed Sep. 30, 2012, both of which are incorporated herein by reference in their entirety for all purposes. Thus, the depiction of device 300 in FIGS. 3A through 3C should be taken as being illustrative in nature, and not limiting to the scope of the present teachings.

Figure 4:
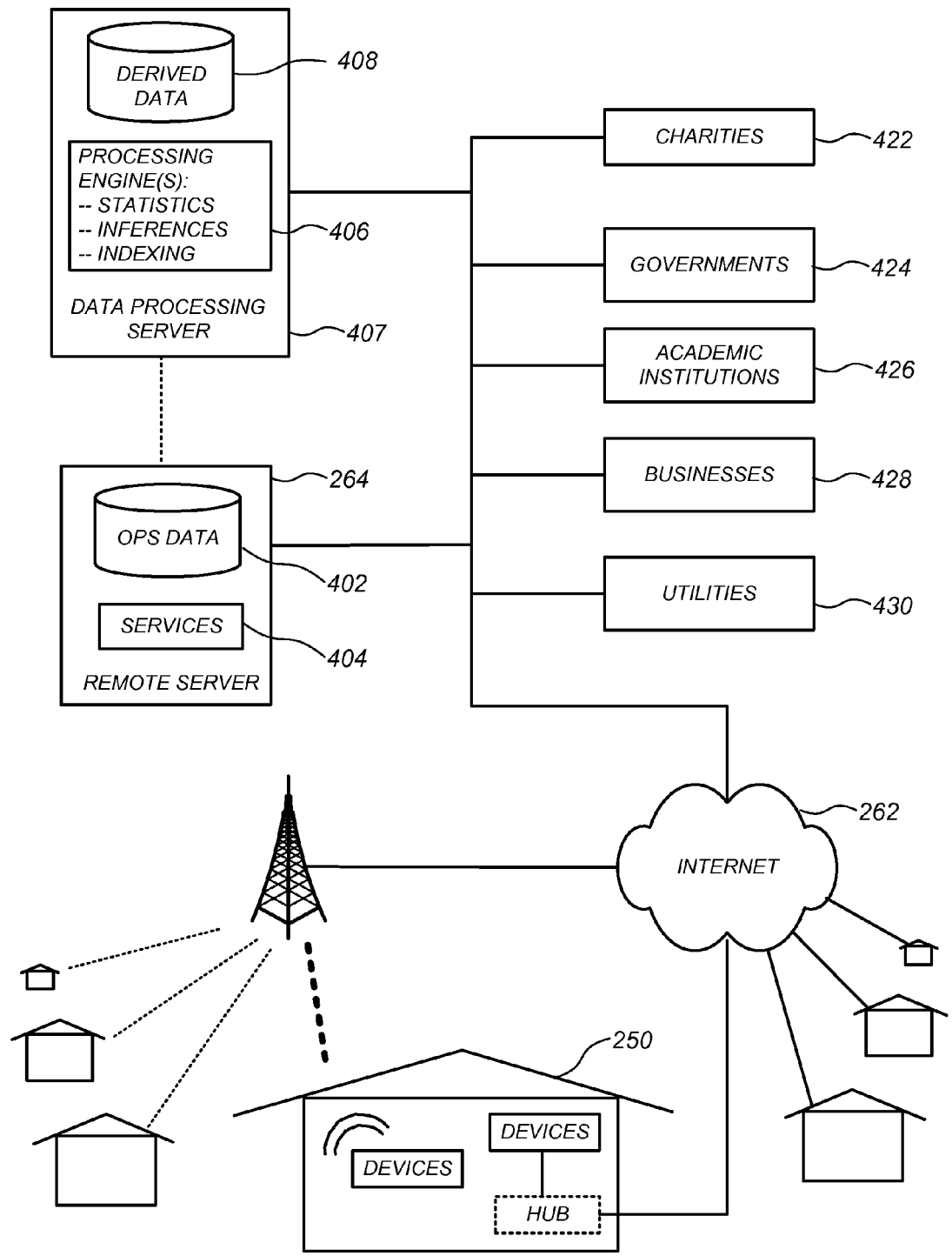
FIG. 4 illustrates a network-level view of an extensible devices and services platform with which the smart home of FIGS. 1 and/or 2 and/or the device of FIGS. 3A through 3C can be integrated.

FIG. 4 illustrates a network-level view of an extensible devices and services platform with which the smart home of FIGS. 1 and/or 2 and/or the device of FIGS. 3A through 3C can be integrated. Each of the intelligent, network-connected devices discussed previously with reference to structure 250 can communicate with one or more remote servers or cloud computing systems 264. The communication can be enabled by establishing connection to the network 262 either directly (for example, using 3G/4G connectivity to a wireless carrier), through a hubbed network (which can be a scheme ranging from a simple wireless router, for example, up to and including an intelligent, dedicated whole-home control node), or through any combination thereof.

The remote server or cloud-computing system 264 can collect operation data 402 from the smart home devices. For example, the devices can routinely transmit operation data or can transmit operation data in specific instances (e.g., when requesting customer support). The remote server or cloud-computing architecture 264 can further provide one or more services 404. The services 404 can include, e.g., software updates, customer support, sensor data collection/logging, remote access, remote or distributed control, or use suggestions (e.g., based on collected operation data 402 to improve performance, reduce utility cost, etc.). Data associated with the services 404 can be stored at the remote server or cloud-computing system 264 and the remote server or cloud-computing system 264 can retrieve and transmit the data at an appropriate time (e.g., at regular intervals, upon receiving request from a user, etc.).

One salient feature of the described extensible devices and services platform, as illustrated in FIG. 4, is a processing engine 406, which can be concentrated at a single data processing server 407 (which may be included in or separate from remote server 264) or distributed among several different computing entities without limitation. Processing engine 406 can include engines configured to receive data from a set of devices (e.g., via the Internet or a hubbed network), to index the data, to analyze the data and/or to generate statistics based on the analysis or as part of the analysis. The analyzed data can be stored as derived data 408. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the network 262. In this manner, processing engine 406 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, for optimizing schedules of temperature setpoints, or implementing demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, the processing engine 406 can generate statistics about device usage across a population of devices and send the statistics to device users, service providers or other entities (e.g., that have requested or may have provided monetary compensation for the statistics). As specific illustrations, statistics can be transmitted to charities 422, governmental entities 424 (e.g., the Food and Drug Administration or the Environmental Protection Agency), academic institutions 426 (e.g., university researchers), businesses 428 (e.g., providing device warranties or service to related equipment), or utility companies 430. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 5:
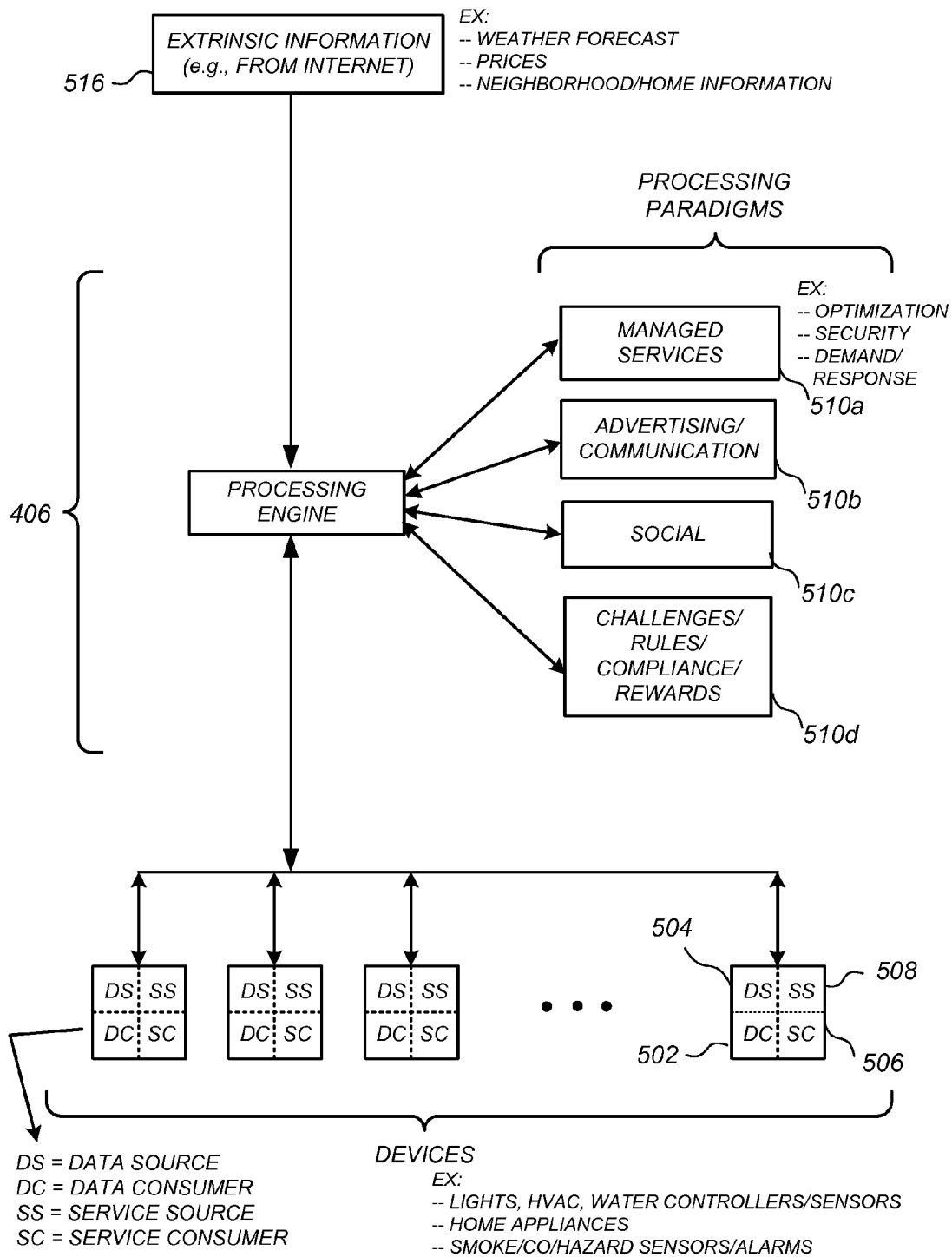
FIG. 5 illustrates an abstracted functional view of the extensible devices and services platform of FIG. 4 according to an embodiment.

FIG. 5 illustrates an abstracted functional view of the extensible devices and services platform of FIG. 4, with particular reference to the processing engine 406 as well as the devices of the smart home environment, according to an embodiment. Even though the devices situated in the smart home environment have an endless variety of different individual capabilities and limitations, they can all be thought of as sharing common characteristics in that each of them is a data consumer 502 (DC), a data source 504 (DS), a services consumer 506 (SC), and/or a services source 508 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 5 shows processing engine 406 as including a number of paradigms 510. Processing engine 406 can include a managed services paradigm 510a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), generating or otherwise implementing optimized schedules of temperature setpoints, implementing or otherwise responding to energy demand response events, or alerting a user of a current or predicted future event or characteristic. Processing engine 406 can further include an advertising/communication paradigm 510b that estimates characteristics (e.g., demographic information), desires and/ or products of interest of a user based on device usage. Services, promotions, products or upgrades can then be offered or automatically provided to the user. Processing engine 406 can further include a social paradigm 510c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 406 can include a challenges/rules/compliance/rewards paradigm 510d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 406 can integrate or otherwise utilize extrinsic information 516 from extrinsic sources to improve the functioning of one or more processing paradigms. Extrinsic information 516 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/ monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 406 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 6:
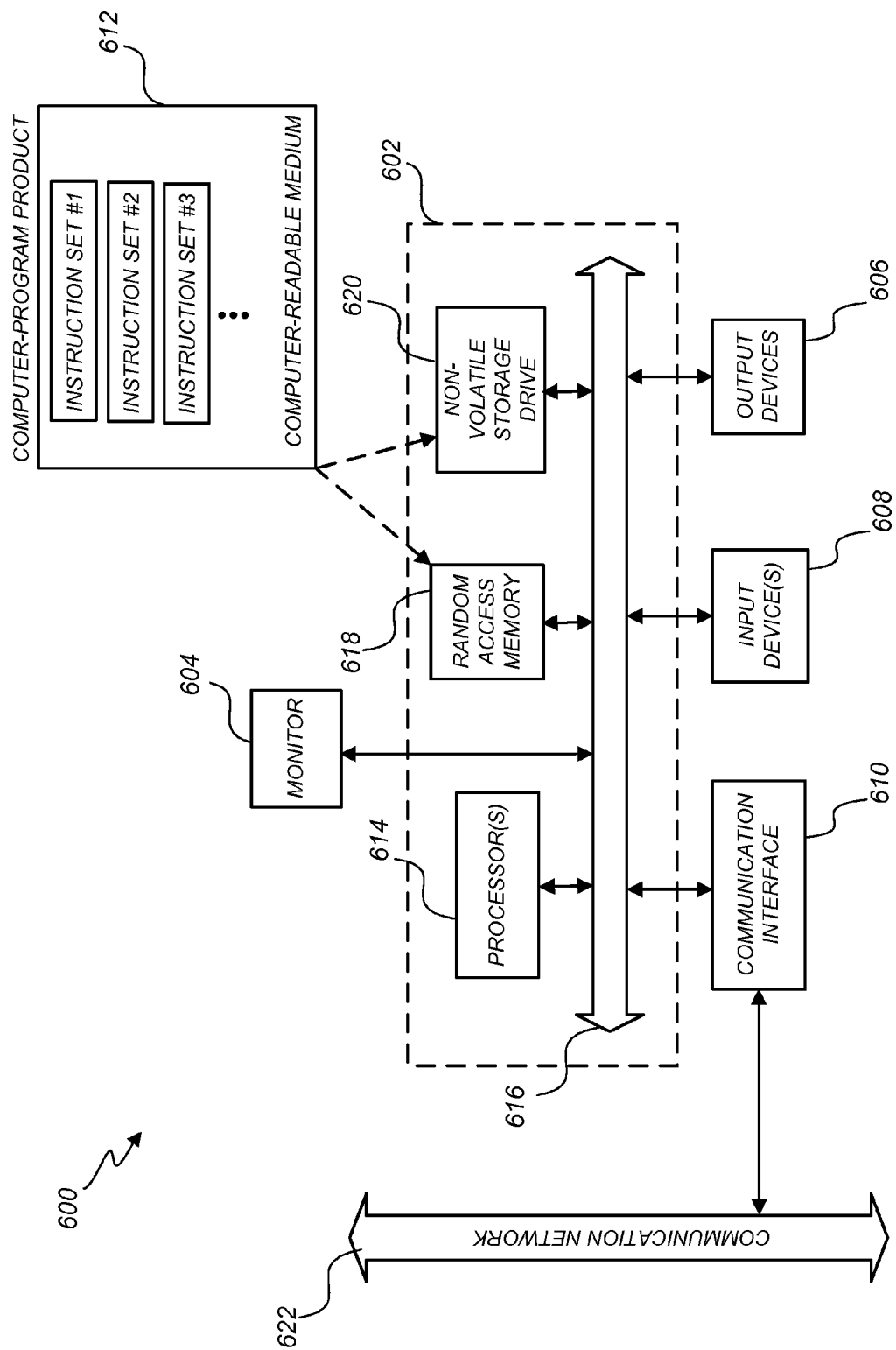
FIG. 6 is a block diagram of a special-purpose computer system according to an embodiment.

FIG. 6 is a block diagram of a special-purpose computer system 600 according to an embodiment. For example, one or more of a utility provider computing system 120, energy management system 130, elements of smart home environment 200, remote server 264, client device 300, processing engine 406, data processing server 407, or other electronic components described herein may be implemented as a special-purpose computer system 600. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 600 comprises a computer 602, a monitor 604 coupled to computer 602, one or more additional user output devices 606 (optional) coupled to computer 602, one or more user input devices 608 (e.g., keyboard, mouse, track ball, touch screen) coupled to computer 602, an optional communications interface 610 coupled to computer 602, and a computer-program product including a tangible computer-readable storage medium 612 in or accessible to computer 602. Instructions stored on computer-readable storage medium 612 may direct system 600 to perform the methods and processes described herein. Computer 602 may include one or more processors 614 that communicate with a number of peripheral devices via a bus subsystem 616. These peripheral devices may include user output device(s) 606, user input device(s) 608, communications interface 610, and a storage subsystem, such as random access memory (RAM) 618 and non-volatile storage drive 620 (e.g., disk drive, optical drive, solid state drive), which are forms of tangible computer-readable memory.

Computer-readable medium 612 may be loaded into random access memory 618, stored in non-volatile storage drive 620, or otherwise accessible to one or more components of computer 602. Each processor 614 may comprise a microprocessor, such as a microprocessor from Intel® or Advanced Micro Devices, Inc.®, or the like. To support computer-readable medium 612, the computer 602 runs an operating system that handles the communications between computer-readable medium 612 and the above-noted components, as well as the communications between the above-noted components in support of the computer-readable medium 612. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 608 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 608 are typically embodied as a computer mouse, a trackball, a track pad, a joystick, wireless remote, a drawing tablet, a voice command system. User input devices 608 typically allow a user to select objects, icons, text and the like that appear on the monitor 604 via a command such as a click of a button or the like. User output devices 606 include all possible types of devices and mechanisms to output information from computer 602. These may include a display (e.g., monitor 604), printers, non-visual displays such as audio output devices, etc.

Communications interface 610 provides an interface to other communication networks and devices and may serve as an interface to receive data from and transmit data to other systems, WANs and/or the Internet, via a wired or wireless communication network 622. Embodiments of communications interface 610 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 610 may be coupled to a computer network, to a FireWire® bus, or the like. In other embodiments, communications interface 610 may be physically integrated on the motherboard of computer 602, and/or may be a software program, or the like.

RAM 618 and non-volatile storage drive 620 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 618 and non-volatile storage drive 620 may be configured to store the basic programming and data constructs that provide the functionality of various embodiments of the present invention, as described above.

Software instruction sets that provide the functionality of the present invention may be stored in computer-readable medium 612, RAM 618, and/or non-volatile storage drive 620. These instruction sets or code may be executed by the processor(s) 614. Computer-readable medium 612, RAM 618, and/or non-volatile storage drive 620 may also provide a repository to store data and data structures used in accordance with the present invention. RAM 618 and non-volatile storage drive 620 may include a number of memories including a main random access memory (RAM) to store of instructions and data during program execution and a read-only memory (ROM) in which fixed instructions are stored. RAM 618 and non-volatile storage drive 620 may include a file storage subsystem providing persistent (non-volatile) storage of program and/or data files. RAM 618 and non-volatile storage drive 620 may also include removable storage systems, such as removable flash memory.

Bus subsystem 616 provides a mechanism to allow the various components and subsystems of computer 602 communicate with each other as intended. Although bus subsystem 616 is shown schematically as a single bus, alternative embodiments of the bus subsystem may utilize multiple busses or communication paths within the computer 602.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Figure 7:
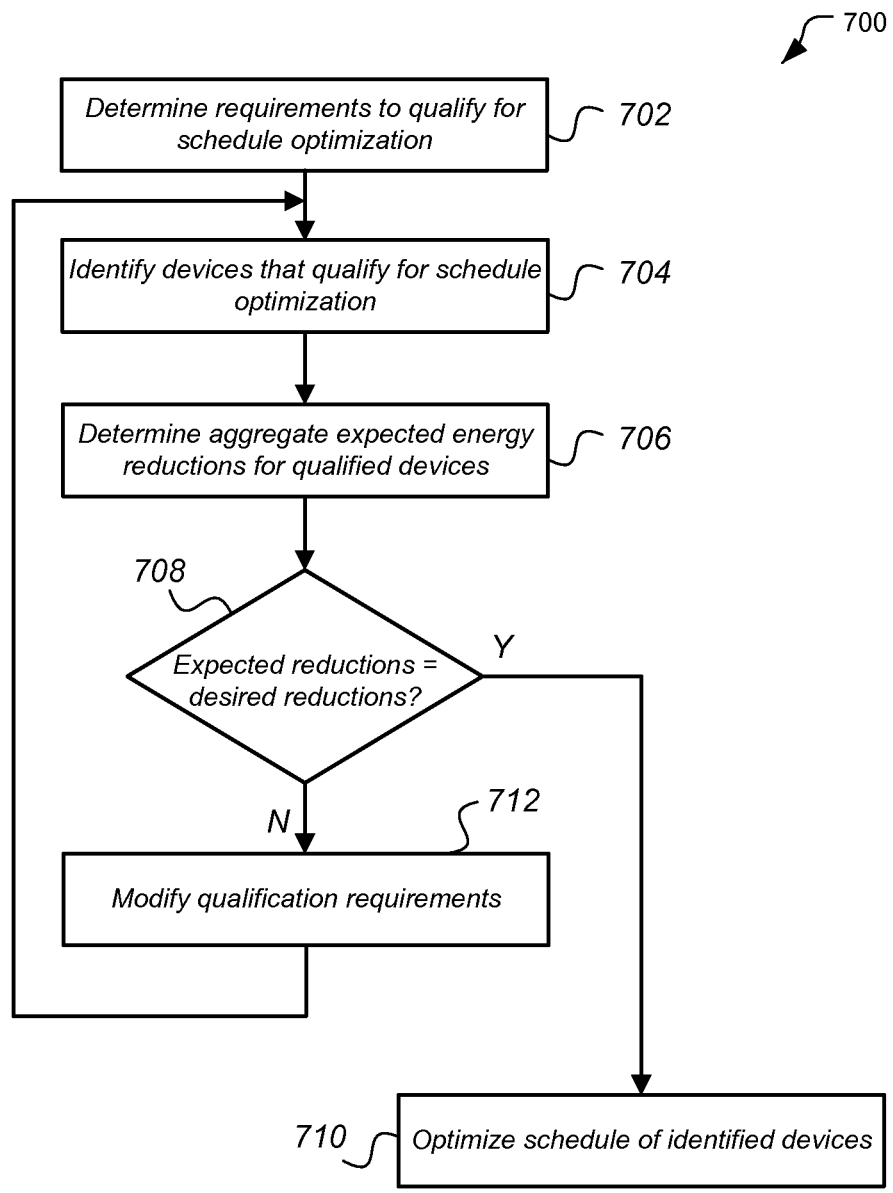
FIG. 7 illustrates a process for implementing and managing a schedule optimization program according to an embodiment.

FIG. 7 illustrates a process 700 for implementing and managing a schedule optimization program according to an embodiment. To facilitate understanding, the process 700 is described with reference to FIGS. 1, 2, and 8, although it should be understood that embodiments of the process 700 are not limited to the exemplary systems and apparatus described with reference to FIGS. 1, 2, and 8.

With brief reference to FIG. 1, the schedule of setpoint temperatures for one or more of residences 150A-150N may be optimized at any given time. In some cases, the schedule of setpoint temperatures for all residences managed by energy management system 130 may be optimized. In other cases, the schedule of setpoint temperatures for subsets of residences managed by energy management system 130 may be optimized. The subsets may be defined in a variety of ways. For example, they may be based on the utility providing energy resources (i.e., a subset of all residences 150A-150N that is supplied energy by the same utility company), a geographical location of the residences, characteristics of the environment in which the residences are located, characteristics of the residences (e.g., thermal retention), affluency of the occupants of the residences (e.g., absolute wealth, annual income, etc.), etc. In some embodiments, a subset of residences 150A-150N may be determined based on the expected reductions of energy were that subset to partially or fully engage in a schedule optimization program. For example, a desired reduction in energy consumption resulting from implementation of a schedule optimization may be determined (e.g., by utility provider computing system 120, energy management system 130, or other entity of system 100). The expected amount of energy reduction were a particular subset of residences 150A-150N to partially or fully engage in a schedule optimization program may then be determined and compared to the desired amount. Based on whether the expected energy reduction meets, exceeds, or is short of the desired energy reduction, the size of the subset may be increased or decreased. In such a fashion, desired energy reductions may be achieved while advantageously reducing the number of residences 150A-150N that are disturbed by presentation of a schedule optimization process. It should be recognized that while throughout the following description embodiments are described as 'reductions' in energy consumption, in other embodiments 'shifts' in energy consumption and/or reductions in cost of energy may similarly be applied, where energy consumption is shifted from one time period to another time period.

Returning to FIG. 7, in operation 702 the requirements to qualify for schedule optimization are determined. Such requirements may be embodied as a set of qualification factors, where each factor is used to determine whether an energy consumer (i.e., a residence) qualifies to participate in a particular schedule optimization program. For example, whether a device (e.g., a thermostat) is still in a particular learning mode, such as an aggressive learning mode, may be a qualification factor. For another example, whether the expected energy savings exceed some value may be a qualification factor. The number and type of qualification factors that are used in any particular implementation may vary depending on the particular embodiment. Further, it should be recognized that some or all of the qualification factors may be defined by one or more parameters that can be set by one or more entities of system 100. For example, the value used when determining whether the expected energy savings exceed some value may be set by one of the aforementioned entities and may differ based on the particular implementation. Further yet, each qualification factor may be weighted to influence a decision in favor or against qualification, and/or one or more of the qualification factors may be independently determinative of a decision in favor or against qualification. For example, if the device does not have access to a weather forecast, then even if other qualification factors are satisfied, the device may not qualify for schedule optimization.

Once the requirements to qualify for schedule optimization are determined, in operation 704 devices that qualify for schedule optimization are identified. For example, one or more thermostats of residences 150A-150N that qualify for schedule optimization may be identified. Each of the identified devices are devices that satisfy the aforementioned requirements.

Figure 8:
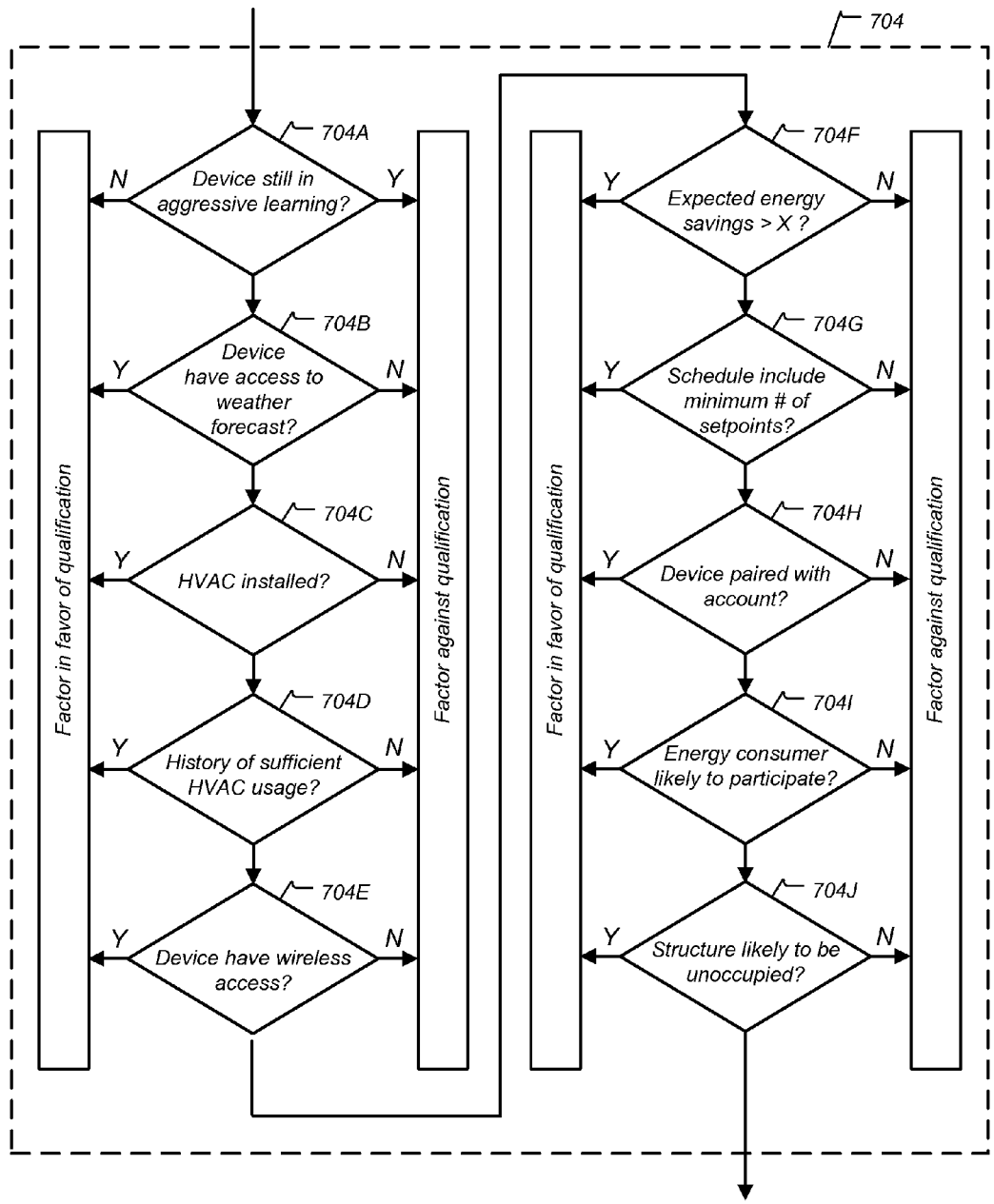
FIG. 8 illustrates a process for identifying devices that qualify for schedule optimization according to an embodiment.

Turning briefly to FIG. 8, FIG. 8 illustrates a process 704 for identifying devices that qualify for schedule optimization according to an embodiment. According to this process, a number of qualification factors are analyzed to determine whether an energy consumer is qualified to participate in a schedule optimization process according to an embodiment. As mentioned, some of the factors may be determinative on their own, while other factors may be weighed to present an overall qualification level. The qualification level may range anywhere from not qualified (e.g., 0) to very qualified (e.g., 100). Whether a particular energy consumer is identified for participation in a schedule optimization program may thus depend on whether their qualification level meets a desired qualification level. The qualification level, in addition or alternatively to the parameters that define some or all of the qualification factors, may be determined in operation 702.

In operation 704A it is determined whether the device (e.g., thermostat 202) controlling the environmental management system (e.g., HVAC 203) at the structure (e.g., structure 250) is in a particular learning mode, e.g., an 'aggressive' learning mode. For example, an intelligent, multi-sensing, network-connected thermostat 202 may implement one or more learning algorithms whereby the thermostat 202 learns the tendencies and preferences of the occupants of the structure associated with the thermostat 202. The thermostat 202 may learn preferred temperatures, humidity's, etc. for different times of the day, for different occupants, etc. The thermostat 202 may implement multiple modes of learning, wherein an initial learning mode aggressively responds to user selections. That is, the learning mode provides significant weight to temperature settings and changes instigated by the occupants. The initial learning mode may last for a certain duration, for example a week, two weeks, three weeks, etc., or until a certain amount of temperature settings and adjustments have been recorded.

At the end of the initial learning mode, the substantive preferences and tendencies of the occupants should be recognized. The thermostat 202 may thus enter a second learning mode such as a refining mode of learning. The refining mode may be much less aggressive compared to the initial learning mode, in that changes made by occupants are given much less weight in comparison to changes made during the initial learning mode. Various specific learning algorithms are further described in commonly assigned U.S. Ser. No. 13/632, 041 (Ref. No. NES0162-US), filed Sep. 30, 2012, the contents of which are incorporated by reference herein in their entirety for all purposes.

It should be recognized that embodiments are not necessarily limited to the thermostat 202 learning tendencies and preferences of the occupants of the structure, but rather the learning algorithms may be incorporated in any one or more of the electronic devices described with reference to the smart home environment 200 and/or the energy management system 130. In any event, when such devices are still in an aggressive learning mode they may not be suitable for participation in a schedule optimization process, and thus this may weigh against qualification. In contrast, when such devices are out of the aggressive learning mode, this may weigh in favor of qualification.

In operation 704B it is determined whether one or more devices associated with the structure of the energy consumer has access to weather forecast information. For example, it may be determined whether thermostat 202 is operable to receive a weather forecast for the weather in the vicinity of the structure. In other embodiments, the devices associated with the structure need not have access to weather forecast information, but rather such information may be acquired by other entities such as energy management system 130. If it is determined that one or more devices or entities has access to weather forecast information, then his may weigh in favor of qualification; otherwise, this may weigh against qualification.

In operation 704C it is determined whether an environmental management system (e.g., an HVAC system, cooling system, heating system, etc.) is installed, operable, and controllable at the structure. For example, thermostat 202 may detect installation of a particular type of environmental management system via connections to wire connectors of the thermostat. One particular technique for detecting installation of a particular type of environmental management system is disclosed in commonly assigned U.S. Ser. No. 13/038,191 (Ref. No. NES0009-US), filed Mar. 1, 2011, which is incorporated by reference in its entirety for all purposes. Further, thermostat 202 may similarly be used to determine whether the attached environmental management system is operable and controllable by, e.g., the thermostat 202. For example, thermostat 202 may attempt to control an attached cooling system to cool the structure. If temperature sensors of the thermostat 202 subsequently measure a reduction in inside temperature that is not likely a result of factors such as declining outside temperature, the thermostat 202 may deduce that the attached cooling system is operable and controllable. Other techniques for determining whether an attached environmental management system is operable and controllable are disclosed in U.S. Ser. No. 13/038,191, supra. If it is determined that an environmental management system is installed, operable, and controllable, then this may weigh in favor of qualification. In contrast, if it is determined that an environmental management system is not installed, operable, or controllable, then this way weigh against qualification.

In operation 704D it is determined whether there is a history of sufficient HVAC usage. For example, thermostat 202 may determine whether the HVAC 203 has been in operation and controlled by thermostat 202 for at least a certain period of time, and that data concerning the control and associated environmental characteristics for that period of time has been recorded. Such data may include, for example, data used to generate a usage model (as subsequently described with reference to operation 704F), such as indoor temperature, outdoor temperature, and information indicative of the amount of energy consumed by the HVAC 203. Whether the history is sufficient may be determined based on whether the history is sufficient to generate a usage model that accurately predicts energy consumption within a certain percentage, such as 2%, 5%, 10%, a range therebetween, or a percentage less than 2% or greater than 10%. In some embodiments a week's worth of data may be sufficient, a month's worth of data may be sufficient, an amount of data less than a week, more than a month, or for a duration between a week and a month, may be sufficient. In some cases, the time period for data accumulation may be tied to the time at which the requirements to qualify for schedule optimization are determined, and/or the time at which the schedule optimization is expected to run. For example, it may be determined whether data has been accumulated for a week immediately prior to qualification.

In operation 704E it is determined whether the device controlling the environmental management system (e.g., an HVAC) at the structure has wireless communication capabilities. For example, it may be determined whether thermostat 202 is capable of communicating wirelessly with remote server 264 and/or energy management system 130. If so, this may weigh in favor of qualification; otherwise, this may weigh against qualification.

In operation 704F it is determined whether the amount of energy reduction likely to occur as a result of the identified energy consumer participating in the schedule optimization process exceeds a threshold value. The amount of energy reduction likely to occur may be determined using a number of factors such as the energy consumer's original schedule of setpoint temperatures, an expected modified schedule of setpoint temperatures, an estimate as to the amount of energy consumed to achieve actual indoor temperatures for given outdoor temperatures, a weather forecast, and/or a variety of additional or alternative factors.

In one particular embodiment, a usage estimator may estimate the amount of energy consumed by an HVAC system to achieve a particular indoor temperature or to be controlled in accordance with a particular setpoint temperature for a given outdoor temperature. For example, the energy consumed by the HVAC over time may be recorded together with the indoor (either actual or setpoint temperature) and outdoor temperatures associated with the structure. A line or curve may be fit to the resulting data so as to create a usage model for subsequently estimating energy consumption given a particular schedule of temperature setpoints and a weather forecast. In some embodiments, a linear model may be implemented whereby the HVAC runtime is equal to a first constant multiplied by the target indoor temperature, plus a second constant multiplied by the outdoor temperature, plus a third constant, where for any given day HVAC runtime is the total time that the HVAC system is commanded to be in an actuated state (e.g., heat on, air conditioning system on, etc.), the target indoor temperature is the time normalized room temperature setpoint, and the outdoor temperature is the average outside temperature for that day. In some embodiments, the usage model may be periodically or continuously generated and updated so as to have a current and accurate model. The model may be generated by the device itself, e.g., by thermostat 202, or by other devices of the smart home environment (e.g., hazard detection unit 204, entryway interface device 206, wall light switch 208, wall plug interface 210, appliance 212, access device 266, or other electronic device associated with the identified energy consumer), or by other elements of the system 100 (e.g., energy management system 130, utility provider computing system 120, etc.) where the information used to generate such a model (e.g., weather forecast, energy usage, indoor temperature) may be acquired or otherwise communicated to the device(s) that generate the model.

Once the usage model has been generated, an energy consumer's original schedule of setpoint temperatures together with a weather forecast that forecasts the weather for a duration similar to the schedule of setpoint temperatures may be applied to the usage model to determine the expected amount of energy consumption that would result were the original schedule of setpoint temperatures implemented. The optimized schedule of setpoint temperatures together with the same weather forecast may then be applied to the same usage model to determine the expected amount of energy consumption that would result were the optimized schedule of setpoint temperature implemented. For example, in the linear model embodiment described above, temperature setpoints defined by the optimized schedule may be used as the target indoor temperature. These two amounts of energy consumption may then be compared to determine whether, and how much, energy savings would likely result if the optimized schedule of setpoint temperatures were implemented, so as to provide an indication as to the expected energy savings. This indication of expected energy savings may be expressed as a percentage of energy reduction, absolute amount of energy reduction, financial value of energy reduction, or in some other form, and may be compared to a value indicative of desired energy savings. If the expected energy savings are equal to or exceed the desired energy savings, then this may weigh in favor of qualification. In contrast, if the expected energy savings are less than the desired energy savings, then this may weigh against qualification.

In operation 704G it is determined whether the original schedule of setpoint temperatures includes a minimum number of setpoints. For example, for a given duration, such as a week, setpoints may be defined on a daily basis, hourly basis, a minutely basis, or some interval therebetween (e.g., at 1 pm, at 7 pm, and at 8 pm). They may be defined over regular or irregular intervals. The number of setpoints defined for a given period, such as a week, may be determined and compared to a minimum number. If the number of defined setpoints meets or exceeds the minimum number, then this may weigh in favor of qualification. In contrast, if the number of defined setpoints is less than the minimum number, then this may weigh against qualification.

In operation 704H it is determined whether the device controlling the environmental management system (e.g., an HVAC) at the structure is paired with a user account. By being paired with a user account, the device is uniquely associated with a user account managed by the energy management system 130. In many cases, the device is paired with an account created by the energy consumer associated with the structure. The account may be managed by the energy management system 130 and provide the energy consumer access to control and monitoring of the device (e.g., thermostat 202) using one or more remote electronic device (e.g., access device 266). Various techniques for pairing a device to a user account are further described in commonly assigned U.S. Ser. No. 13/275,311 (Ref. No. NES0129-US), filed Oct. 17, 2011, the contents of which are incorporated by reference herein in their entirety for all purposes. If the device controlling the environmental management system at the structure is paired with a user account, this may weigh in favor of qualification. In contrast, if the device controlling the environmental management system at the structure is not paired with a user account, this may weigh against qualification.

In operation 704I it is determined whether the energy consumer is likely to participate in the schedule optimization process. The likelihood of the energy consumer participating in the schedule optimization process may be determined based on a number of factors, such as the prior participation levels by the energy consumer in past schedule optimization processes, the HVAC schedule of the energy consumer, the likelihood of the structure being occupied during the DR event, the geographical location of the energy consumer, the affluence of the energy consumer, etc. If the energy consumer is likely to participate in the DR event, then this may weigh in favor qualification. Otherwise, this may weigh against qualification.

In operation 704J it is determined whether the structure associated with the energy consumer is likely to be unoccupied for at least a certain percentage of time throughout a given period (e.g., a day). In determining whether the structure is likely to be unoccupied, an occupancy probability profile may be generated or otherwise acquired. The occupancy probability profile indicates a probability that the structure will be occupied at various times. The occupancy probability profile may be generated using one or more occupancy sensors incorporated in one or more electronic devices associated with the structure, such as in a thermostat 202, hazard detection unit 204, entryway interface device 206, wall light switch 208, wall plug interface 210, appliance 212, access device 266, or other electronic device associated with the identified energy consumer. A historical record of the occupancy detected by one or more of these devices may be maintained and used to develop the occupancy probability profile. In one particular embodiment, a technique for developing an occupancy probability profile as described in commonly assigned U.S. Ser. No. 13/632,070 (Ref. No. NES0234-US), which is incorporated by reference in its entirety for all purposes, may be used. When the occupancy probability profile indicates that the structure is likely to be unoccupied for at least a certain percentage of some period (e.g., 30% of a day), such a likelihood weighs in favor of qualification. In contrast, when the occupancy probability profile indicates that the structure is likely to be occupied for a certain percentage of some period, such a likelihood weighs against qualification.

It should be appreciated that the specific operations illustrated in FIG. 8 provide a particular process for analyzing a number of factors to determine whether an energy consumer is qualified for participation in a particular schedule optimization process. The various operations described with reference to FIG. 8 may be implemented at and performed by one or more of a variety of electronic devices or components described herein. For example, they may be implemented at and performed by one or more electronic devices in the smart home environment 200, the energy management system 130, etc. Other sequences of operations may also be performed according to alternative embodiments. For example, alternative embodiments of the present invention may perform the operations outlined above in a different order. Moreover, the individual operations illustrated in FIG. 8 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Returning now to FIG. 7, once the devices that qualify for schedule optimization have been identified, the aggregate expected energy reductions for these devices may be determined in operation 706. The expected energy reductions may be determined based on full or even partial participation of the energy consumers in the schedule optimization process. If full participation is presumed, then the expected energy savings as described with reference to operation 704F may be determined and aggregated for all of the identified devices. If partial participation is presumed, then the such expected energy savings may be reduced by some factor. For example, in one embodiment, the probability of the identified devices fully participating in the schedule optimization process may be determined based on, e.g., historical participation levels, and used to determine the reduced expected energy savings.

In operation 708 it is determined whether the expected energy reductions are equal to the desired reductions. If they are, then processing may continue to operation 710 where the schedule of setpoint temperatures of the identified devices is optimized. Otherwise, processing may continue to operation 712 where the qualification requirements are modified. Such modification may include, for example, decreasing the requirements for qualification (e.g., reducing the number of requirements, reducing the parameters defining or more requirements, etc.) in the event the expected reductions are less than the desired reductions. Such modification may also or alternatively include, for example, increasing the requirements for qualification in the event the expected reductions are greater than the desired reductions. As a result of altering the requirements for qualification, the number of devices identified for schedule optimization may change, and thus so will the expected reductions in energy.

It should be appreciated that the specific operations illustrated in FIG. 7 provide a particular process for implementing and managing a schedule optimization program according to an embodiment. The various operations described with reference to FIG. 7 may be implemented at and performed by one or more of a variety of electronic devices or components described herein. For example, they may be implemented at and performed by one or more electronic devices in the smart home environment 200, the energy management system 130, etc. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operations. Furthermore, additional operations may be added or existing operations removed depending on the particular applications. For example, in some embodiments if it is determined that the expected energy reductions meet or exceed the desired energy reductions, processing may continue to operation 710 where the schedules of identified devices are optimized. One of ordinary skill in the art would recognize and appreciate many variations, modifications, and alternatives.

Various embodiments described herein advantageously provide an unsurpassed level of HVAC control by the energy consumer in the context of schedule optimization in that the desires of the energy consumer may be solicited before, during, and/or after any type of setpoint optimization process is undertaken. Such desires may be tangibly recognized and followed by way of, for example, soliciting the input of the energy consumer prior to performing any setpoint optimization process to determine whether the energy consumer is even interested in engaging such a process. For another example, input from the energy consumer may be solicited during or after the setpoint optimization process to determine whether the energy consumer would like to keep any optimized schedule, continue with an optimization process, or otherwise revert back to their original schedule of setpoint temperatures. In such a fashion, the energy consumer is empowered with a variety of levels of HVAC system control before, during, and after a schedule optimization process, thereby reducing inhibitions of the energy consumer to participate in such optimization processes which may provide not only individual energy savings but significant reductions in aggregate energy consumption by a society of energy consumers.

Figure 9:
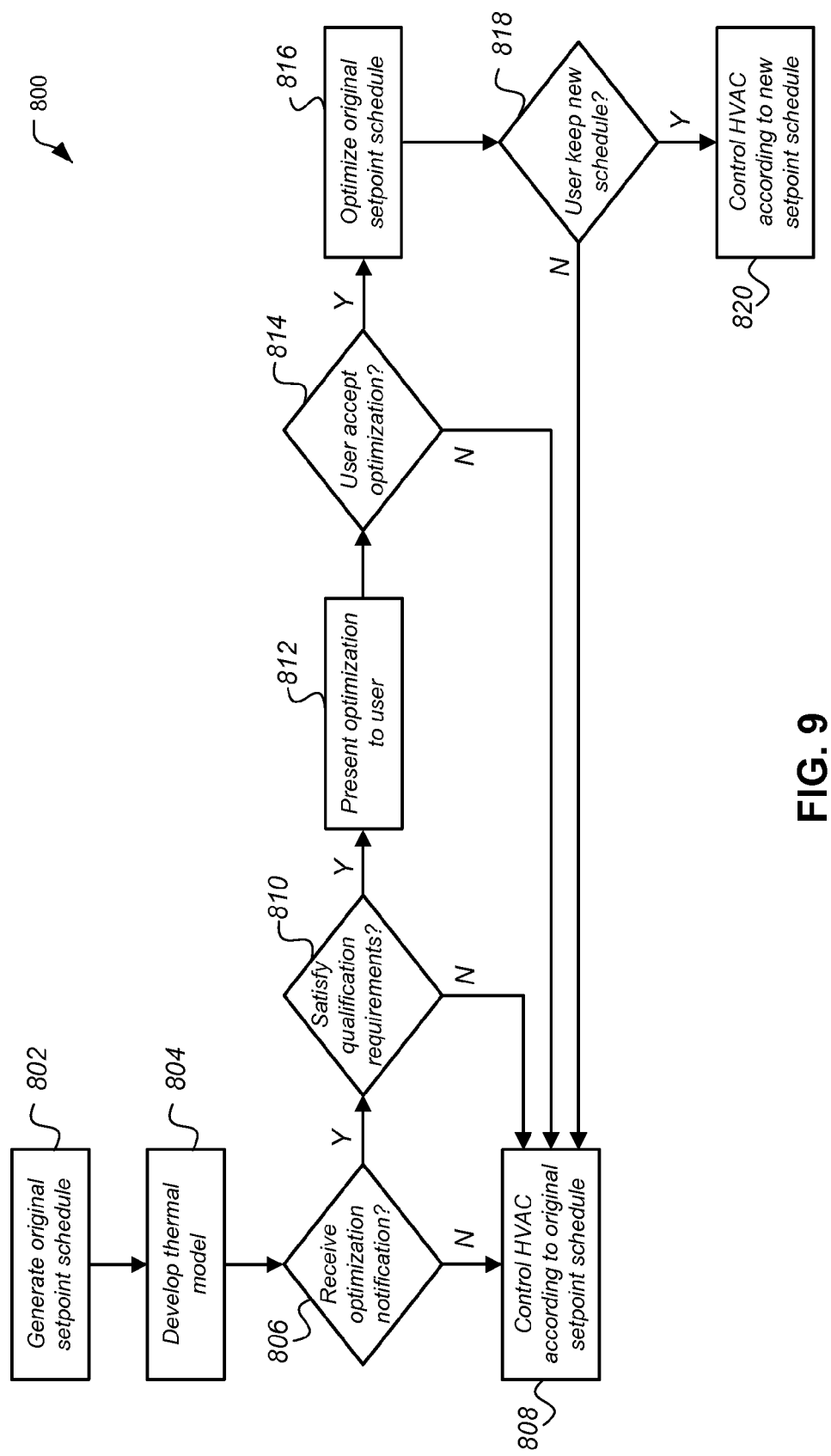
FIG. 9 illustrates a process for generating, presenting, and implementing a schedule optimization process according to an embodiment.

FIG. 9 illustrates a process 800 for generating, presenting, and implementing a schedule optimization process according to an embodiment. To facilitate understanding, the process 800 is described with reference to FIGS. 1, 2, 8, and 12A, although it should be understood that embodiments of the process 800 are not limited to the exemplary systems and apparatus described with reference to FIGS. 1, 2, 8, and 12A.

In operation 802 an original schedule of setpoint temperatures is generated. The schedule may be generated in one or more of a variety of fashions. For example, the schedule may be set by a user of thermostat 202, and may be input for storage in thermostat 202 via a user interface of thermostat 202, access device 266, and/or another computing device of smart home environment 200. The schedule may be generated by an entity of smart home environment 200, such as the thermostat 202 itself, by learning the tendencies and preferences of the occupants of the structure associated with the thermostat 202. The original schedule may be generated by an entity of system 100 other than smart-home environment 200, such as by remote server 264, energy management system 130, or another entity of system 100, and either pre-programmed in the thermostat 202 prior to installation of the thermostat 202 or communicated to the thermostat 202 post-installation. In some embodiments, the original schedule of setpoint temperatures may be generated based on a combination of one or more of the above. For example, the original schedule may initially be defined by the energy consumer, and subsequently tailored via learning.

Figure 12A:
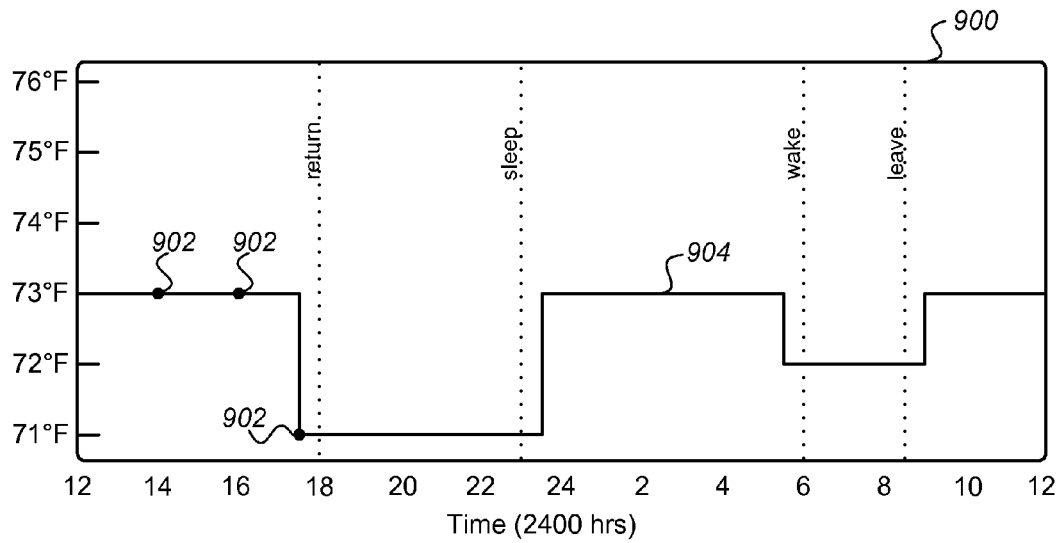
FIGS. 12A through 12H illustrate adjustments made to an original schedule of setpoint temperatures in accordance with a scheduled setpoint optimization process that includes a three-stage modification to a schedule that is segregated into three sub-intervals, according to an embodiment.

For explanation purposes, turning briefly to FIG. 12A, FIG. 12A illustrates a schedule 900 of original setpoint temperatures according to an embodiment. The schedule of setpoint temperatures includes a number of individually scheduled setpoint temperatures 902 that indicate a particular desired indoor temperature (e.g., 73° F.) at a particular time of day (e.g., 1400 hrs). There may be any number of individual setpoint temperatures 902 for a given period (e.g., one day) that, for the given period, define an indoor temperature control trajectory 904. The setpoint temperatures may be defined at regular intervals (e.g., every 15 minutes, 30 minutes, 60 minutes, etc.) or at irregular intervals (e.g., at 1400 hrs, at 1600 hrs, at 1700 hrs, and at 1800 hrs). In one particular embodiment, a schedule of setpoint temperatures may be defined for each day of the week, where the same schedule of setpoint temperatures for any one given day is then persistently repeated for that day. For example, a schedule may be defined for Monday, and then that schedule may be used to control the HVAC system for every Monday. Embodiments are not so limited, however, as schedules may be defined for other time intervals (e.g., one schedule for Monday to Friday, one schedule for Saturday and Sunday), and may or may not repeat.

Returning now to FIG. 9, once an original schedule of setpoint temperatures has been generated, processing may continue to operation 804. In operation 804, a usage model is generated. The usage model may be generated as previously described with reference to operation 704F and, in some embodiments, may be generated for purposes of determining whether the energy consumer qualifies for a schedule optimization process.

In operation 806, it is determined whether an optimization notification is received. For example, in some embodiments, an optimization notification may be communicated from the remote server 264 to thermostat 202. Such a notification may include parameters of the optimization process, such as how long the optimization process lasts, how many degrees temperature change should be applied to the original schedule of setpoint temperatures for each day or week in the optimization, how the original schedule of setpoint temperatures may be split into sub-intervals, how setpoint temperatures should be changed for each sub-interval, etc. In some cases, such parameters may be pre-stored in the thermostat 202 or previously communicated to the thermostat 202, and the notification may instruct the thermostat 202 to initiate a schedule optimization process or qualification process preceding such schedule optimization. If an optimization notification is not received, then processing may continue to operation 808 where the HVAC system is controlled in accordance with the original schedule of setpoint temperatures. Otherwise, processing may continue to operation 810.

In operation 810 it is determined whether the qualification requirements are satisfied. For example, as described with reference to FIG. 8, thermostat 202 may determine whether one or more of a variety of qualification factors are satisfied. If the qualification factors are not satisfied, then processing may return to operation 808 where the HVAC system is controlled in accordance with the original schedule of setpoint temperatures. Otherwise, processing may continue to operation 812.

In operation 812, an option to perform schedule optimization is presented to an energy consumer. For example, thermostat 202 (or other element(s) of smart home environment 200, such as access device 266) may display or otherwise communicate to occupants associated with the smart home environment 200 an option to perform schedule optimization. In some embodiments, in addition to communicating such an option, additional information describing the schedule optimization process, how long the process is expected to take, the expected energy savings resulting from the process, or other information that may be valuable to the energy consumer in assisting the energy consumer to decide whether to perform schedule optimization may similarly be communicated to the energy consumer.

In operation 814 it is determined whether the user accepts the option to perform schedule optimization. If not, then processing may return to operation 808 where the HVAC system is controlled in accordance with the original schedule of setpoint temperatures. Otherwise, processing may continue to operation 816. A user may indicate acceptance of the option to perform schedule optimization in any one or more of a variety of fashions. For example, the user may manipulate an input/output element of the thermostat 202 (or other element of smart home environment 200, such as access device 266). In some embodiments, the energy consumer may delay making such a decision by selecting a 'not now' or 'remind me later' option, in which case the option to perform schedule optimization is at least temporarily suspended or otherwise relegated to a different menu option on the thermostat 202 or other electronic device associated with the energy consumer.

In operation 816 the original schedule of setpoint temperatures is optimized. The schedule may be optimized to reduce the amount of energy consumed the HVAC system in comparison to the amount of energy consumed were the original schedule of setpoint temperatures maintained or otherwise implemented. This may be done, for example, by reducing the setpoint temperatures of the original schedule if the HVAC system is in a heating mode, or by increasing the setpoint temperatures of the original schedule if the HVAC system is in a cooling mode, or by performing some combination thereof.

In some embodiments, the schedule may be optimized for purposes other than or in addition to reduction of energy consumption. For example, the original schedule may be optimized to: (1) migrate towards an optimal dollar cost savings into which time-of-use pricing is considered; (2) migrate to gradually reduce the impact (i.e., immediate setpoint adjustments) resulting from the 1-hour time shift of Daylight Savings Time; (3) migrate to a schedule that provides increased health benefits to the occupants of the structure (e.g., a schedule that encourages occupants to go to bed earlier, wake up earlier, etc.); (4) migrate toward a "Monday Night Football" schedule (e.g., over the three weeks prior to football season, the bedtime temperature setpoint may slowly migrate from the normal time of 10 PM on Monday nights to 1 AM on Monday nights; then, after football season is over, it gradually migrates back to 10 PM on Monday nights over a three-week period).

In other words, optimization of the original schedule may include a 'vertical' shift (i.e., increased or decreased temperature settings) for one or more setpoints in the schedule and/or a 'horizontal' shift (i.e., increased or decreased time settings) for one or more setpoints in the schedule. In many embodiments, the optimization of the original schedule is a slow migration from the original schedule to the optimized schedule. The migration is slow in that the setpoint temperatures of the schedule or adjusted or otherwise offset by small, unnoticeable amounts, over the course of an optimization period. Each adjustment (or offset) is unnoticeable in that it has a temperature or time magnitude that is typically undetectable by the human body. For example, each adjustment may be a fraction of a degree (e.g., $1/100°$ F., $1/50°$ F., $1/20°$ F., $1/10°$ F., $1/7°$ F., $1/4°$ F., $1/2°$ F., in a range between any of these fractions, or of a fractional value less than $1/100°$ F. or greater than $1/2°$ F.) and/or a fraction of an hour (e.g., 1 minute, 5 minutes, 10 minutes, 15 minutes, 30 minutes, 45 minutes, in a range between any of these fractions, or of a fractional value less than 1 minute or greater than 45 minutes). While each individual adjustment may be unnoticeable to the human body, and may not achieve any optimal result (e.g., noticeable reduction in energy savings) itself, the aggregate adjustments over the course of the optimization period may indeed achieve optimal results (e.g., noticeable reductions in energy savings) without creating any noticeable levels of discomfort for the occupants (or, in some cases, conditioning the occupants to be acceptable to the new, optimal schedule).

In some embodiments, optimization of the original schedule of setpoint temperatures may be responsive to user feedback. For example, during the optimization period, while the original schedule is being slowly and incrementally adjusted, the energy consumer may respond to the changes being made to the original schedule. The feedback from the energy consumer may either be positive or negative. It may be positive in that the feedback is indicative of acceptance or encouragement of the migration from the original schedule to the optimal schedule. For example, if a schedule is being adjusted to reduce the temperature setpoints, the feedback may indicate an increased reduction of the temperature setpoints as compared to the adjustments being made by the optimization process. Alternatively, it may be negative in that the feedback is indicative of rejection or discouragement of the migration from the original schedule to the optimal schedule. For example, if a schedule is being adjusted to reduce the temperature setpoints, the feedback may indicate a decreased reduction of the temperature setpoints as compared to the adjustments being made by the optimization process.

Optimization of the original schedule may respond to user feedback depending on whether the feedback is positive or negative. If the feedback is positive, optimization may ignore the feedback or, in some embodiments, increase the rate of change (e.g., the size of each adjustment) and/or increase the difference between the original scheduled setpoint temperature and the optimal setpoint temperature. In contrast, if feedback is negative, optimization may ignore the feedback, cancel optimization altogether, or in some embodiments, decrease the rate of change and/or decrease the difference between the original scheduled setpoint temperature and the optimal setpoint temperature.

Once the original schedule of setpoint temperatures is optimized, processing may continue to operation 818 where the user is asked whether they wish to keep the new, optimized schedule of setpoint temperatures. In some embodiments, this option may be presented to the user once the optimization process is complete (i.e., the original schedule has migrated to the optimal schedule either taking into consideration user feedback or not taking consideration user feedback). In other embodiments, this option may also or alternatively be presented to the user in the event the user has indicated a desire to stop the optimization (e.g., the user has indicated some negative feedback). In one particular embodiment, the option to keep the new, optimal schedule may be presented or otherwise communicated to the user via thermostat 202, access device 266, or other electronic device of smart home environment 200. If the user indicates that they do not wish to keep the new schedule, e.g., via an input/output interface of thermostat 202, processing may return to operation 808 where the HVAC is controlled according to the original schedule of setpoint temperatures. Otherwise, processing may continue to operation 820 where the HVAC is controlled according to the new, optimal schedule of setpoint temperatures.

It should be appreciated that the specific operations illustrated in FIG. 9 provide a particular process for generating, presenting, and implementing a schedule optimization process according to an embodiment. The various operations described with reference to FIG. 9 may be implemented at and performed by one or more of a variety of electronic devices or components described herein. For example, they may be implemented at and performed by one or more electronic devices in the smart home environment 200, the energy management system 130, etc. Other sequences of operations may also be performed according to alternative embodiments. For example, alternative embodiments of the present invention may perform the operations outlined above in a different order. Moreover, the individual operations illustrated in FIG. 9 may include multiple sub-operations that may be performed in various sequences as appropriate to the individual operations. Furthermore, additional operations may be added or existing operations removed depending on the particular applications. For example, in some embodiments qualification may be performed prior to an optimization notification being communicated to a thermostat. For example, the thermostat may initially determine whether it satisfies the qualification requirements and then receive and respond to an optimization request. Additionally or alternatively, the remote server may determine whether a particular thermostat satisfies the qualification requirements. If it does, then it may communicate the optimization notification for presentation to the energy consumer. Otherwise, it may not even communicate the optimization notification to the thermostat.

Figure 10:
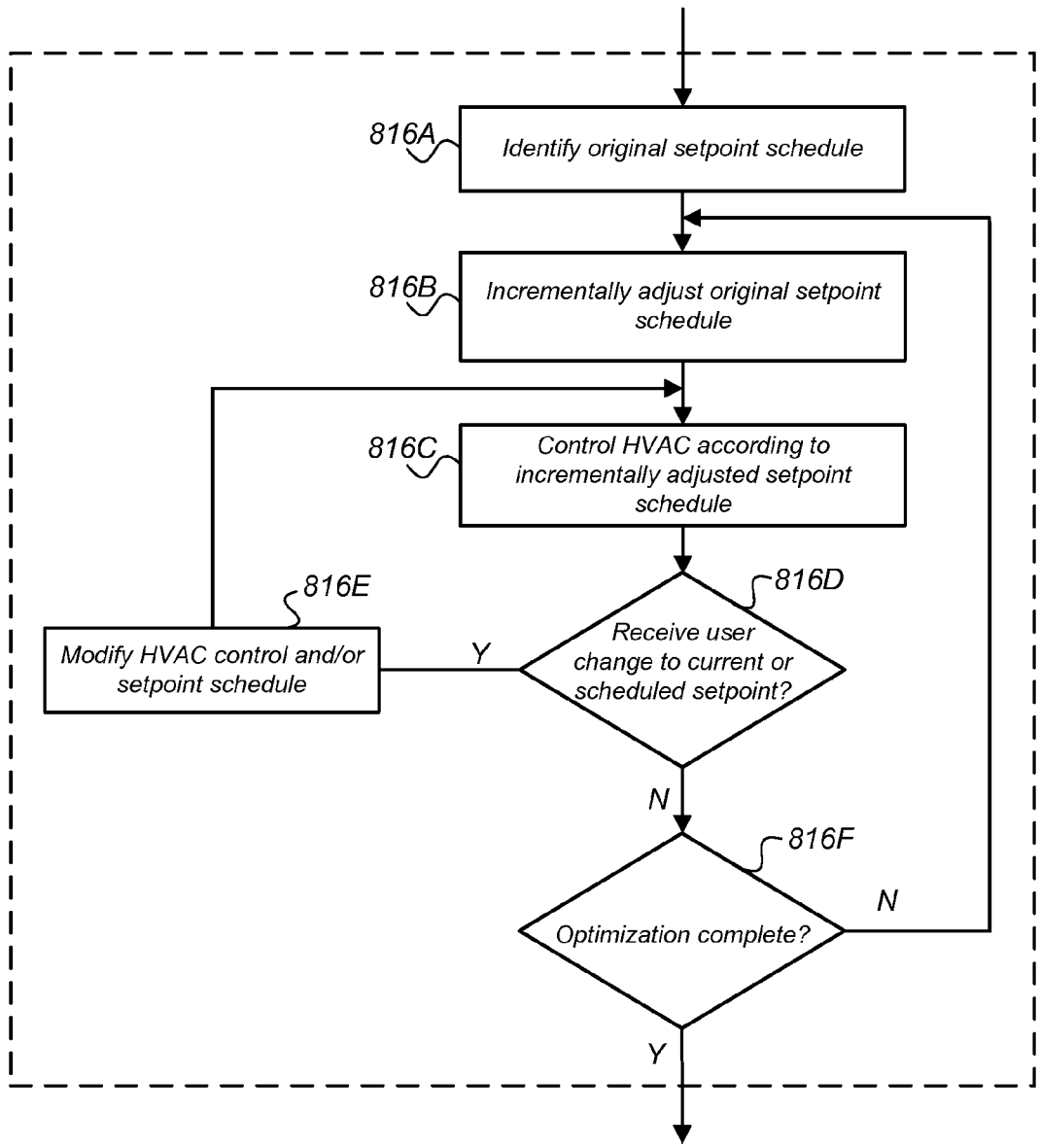
FIG. 10 illustrates a process for optimizing an original schedule of setpoint temperatures according to a first embodiment.

Turning now to FIG. 10, FIG. 10 illustrates a process for optimizing an original schedule of setpoint temperatures (e.g., as described with reference to operation 816) according to a first embodiment. To facilitate understanding, the process 816 is described with reference to FIGS. 1, 2, and 9, although it should be understood that embodiments of the process 800 are not limited to the exemplary systems and apparatus described with reference to FIGS. 1, 2, and 9.

In operation 816A the original schedule of setpoint temperatures is identified. For example, a processor of thermostat 202 may read a schedule of setpoint temperatures stored in a storage element of thermostat 202. In operation 816B, the original schedule of setpoint temperatures is incrementally adjusted. The temperature control trajectory defined by the original schedule of setpoint temperatures may be incrementally modified to reach some new, optimal schedule of setpoint temperatures, where the new schedule may be optimal in terms of energy reductions, cost reductions, etc. In modifying the temperature control trajectory, setpoint temperatures that exist in the original schedule of setpoint temperatures may be modified (e.g., shifted in temperature or time). In some cases, new setpoint temperatures may be defined for the temperature control trajectory and subsequently adjusted. For example, in some cases the original schedule of setpoint temperatures may include large gaps in time where no setpoint temperatures are explicitly defined. In such cases, those gaps may be filled by adding new setpoint temperatures within those gaps, where the new setpoint temperatures may be defined based on, for example, an interpolation of adjacent and previously defined setpoint temperatures.

In operation 816C the HVAC is controlled according to the incrementally adjusted setpoint schedule. For example, at the beginning of a first periodic time interval (e.g., a first day) during an optimization period (e.g., a week), the original schedule may be adjusted. The HVAC system is then controlled in accordance with that adjusted schedule for the first periodic time interval. At the beginning of a second periodic time interval (e.g., a second day), the schedule that was applied to the previous periodic time interval (e.g., the first day) may be adjusted (or, equivalently, the original schedule may be adjusted but to a greater extent that takes into consideration both the adjustments made during the first day and the adjustments being made for the second day). The HVAC system is then controlled in accordance with the newly adjusted schedule for the second periodic time interval. The incremental adjustments may be applied for each of a succession of any suitable time periods (e.g., one day, two days, three days, half of a day, a period less than half of a day, a period greater than three days, or a period between half a day and three days), where each individual time period for a single adjustments is short in comparison to the overall optimization time period (e.g., individual time period may be one day, overall optimization time period may be one week or a period greater than one week).

In operation 816D, it is determined whether a user change to a current or scheduled setpoint is received. As previously described, changes to an existing setpoint temperature that reflect a desire for the temperature in the structure to be immediately changed to that setpoint temperature are referred to as changes to an "immediate setpoint temperature" or a "current setpoint temperature". A user may indicate a desire to change the current setpoint temperature in any one or more of a variety of fashions. For example, the user may rotate a ring of thermostat 202, or simulate a similar operation with access device 266. Also as previously described, this is in contrast to changes made to setpoint temperatures that may be provided in an hourly, daily, weekly, monthly, or other schedule in which setpoint temperatures may reflect a desire for future temperatures in the structure, where such setpoint temperatures are referred to as "scheduled setpoint temperatures" or a "schedule of setpoint temperatures". A user may indicate a desire to change one or more setpoint temperatures defined by the schedule of setpoint temperatures in a variety of fashions as well. For example, via the ring of thermostat 202, a user may access a scheduling menu to view and/or alter the schedule of setpoint temperatures. Users may simulate similar operations with access device 266.

If a user change to a current or scheduled setpoint is received, then processing may continue to operation 816E, where the HVAC control and/or schedule of setpoint temperatures is modified. In some embodiments, changes made to a current setpoint temperature may be immediately followed or otherwise adhered to the by thermostat. For example, in response to receiving a user change to a current setpoint temperature, the thermostat 202 may control the HVAC system in an attempt to cause the indoor temperature of the structure to reach the current setpoint temperature defined by the user change (in contrast to the setpoint defined by the optimization process). Such changes made to the current setpoint temperature may also be taken into consideration when making subsequent adjustments to the scheduled setpoints in accordance with operation 816B. These changes may be based on whether the user change is indicative of a positive or negative feedback. For example, if the user change is indicative of a positive feedback, the rate of change (i.e., size of one or more subsequent adjustments) may be increased and/or the difference between the original scheduled setpoint temperatures and the optimal setpoint temperatures may be increased. If, on the other hand, the user change is indicative of a negative feedback, the rate of change (i.e., size of one or more subsequent adjustments) may be decreased and/or the difference between the original scheduled setpoint temperatures and the optimal setpoint temperatures may be decreased.

In at least one embodiment, changes made to the scheduled setpoints may be responded to differently than changes made to the current setpoint temperature. For example, in one embodiment, where a user makes a change to a scheduled setpoint (e.g., increasing the temperature from 70° F. to 72° F.), subsequent adjustments in operation 816B will not be made to the previously scheduled setpoint temperature (e.g., 70° F.) but rather adjustments will be made to the newly scheduled setpoint temperature (e.g., 72° F.). Accordingly, the user changes to the scheduled setpoint may be incorporated into the incrementally adjusted version of the original schedule of setpoint temperatures. Further, in some embodiments, the subsequent adjustments that are made to the newly scheduled setpoint temperature may be modified based on whether the user feedback is positive or negative, similar to those modifications previously described. In at least one embodiment, the size of the modification may be greater for schedule changes than for similar current setpoint temperature changes.

During each particular periodic time interval, if it is determined that no user changes are received and once the end of the periodic time interval is reached, processing may continue to operation 816F. In operation 816F it is determined whether optimization is complete. For example, thermostat 202 may determine whether the end of the optimization time period has been reached. If not, processing may return to operation 816B where the setpoint schedule is incrementally adjusted. Otherwise, the schedule optimization may be deemed complete.

It should be appreciated that the specific operations illustrated in FIG. 10 provide a particular process for optimizing an original schedule of setpoint temperatures according to an embodiment. The various operations described with reference to FIG. 10 may be implemented at and performed by one or more of a variety of electronic devices or components described herein. For example, they may be implemented at and performed by one or more electronic devices in the smart home environment 200, the energy management system 130, etc. Other sequences of operations may also be performed according to alternative embodiments. For example, alternative embodiments of the present invention may perform the operations outlined above in a different order. Moreover, the individual operations illustrated in FIG. 10 may include multiple sub-operations that may be performed in various sequences as appropriate to the individual operations. Furthermore, additional operations may be added or existing operations removed depending on the particular applications.

Figure 11A:
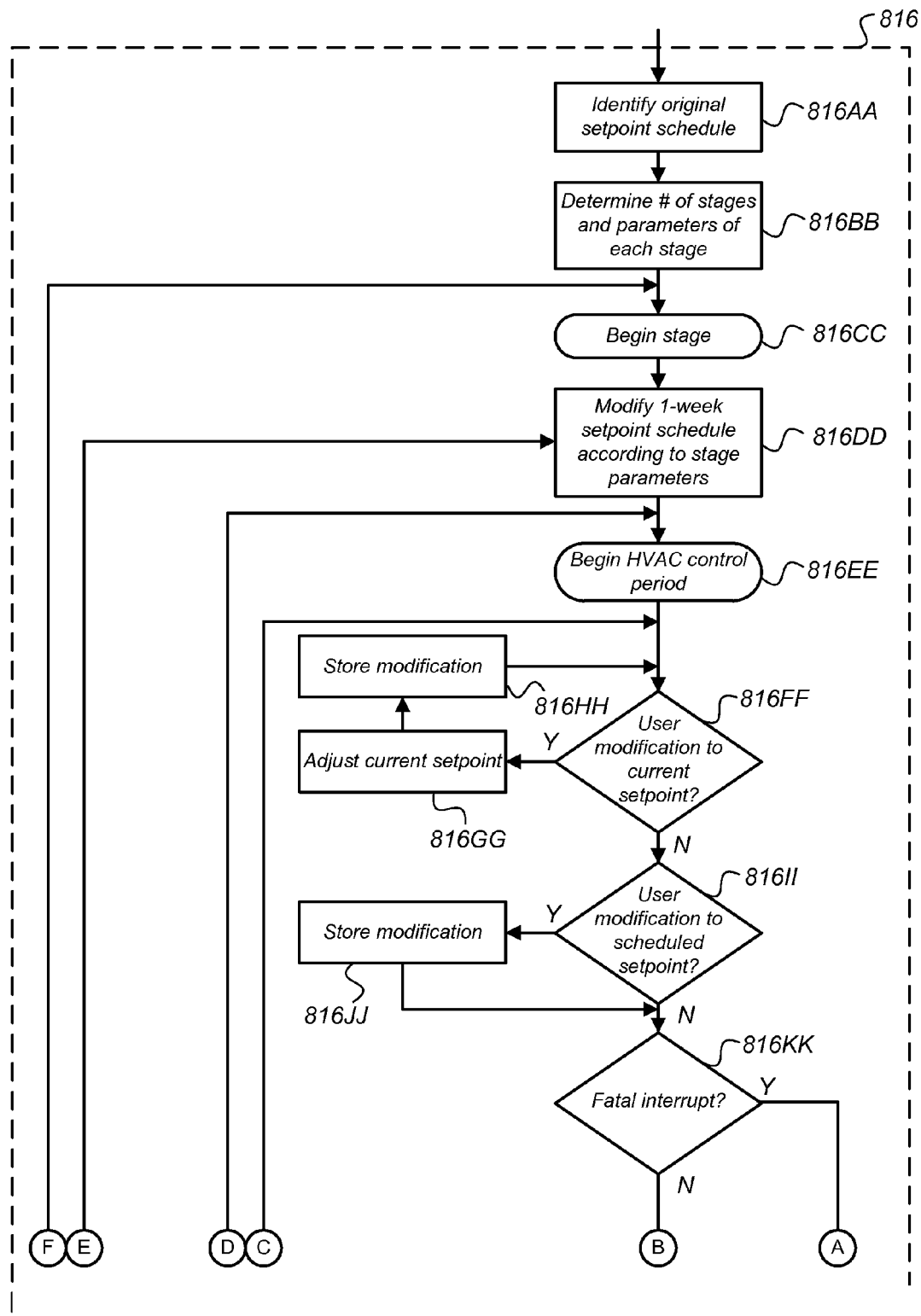
FIGS. 11A and 11B illustrate a process for optimizing an original schedule of setpoint temperatures according to a second embodiment.
Figure 11B:
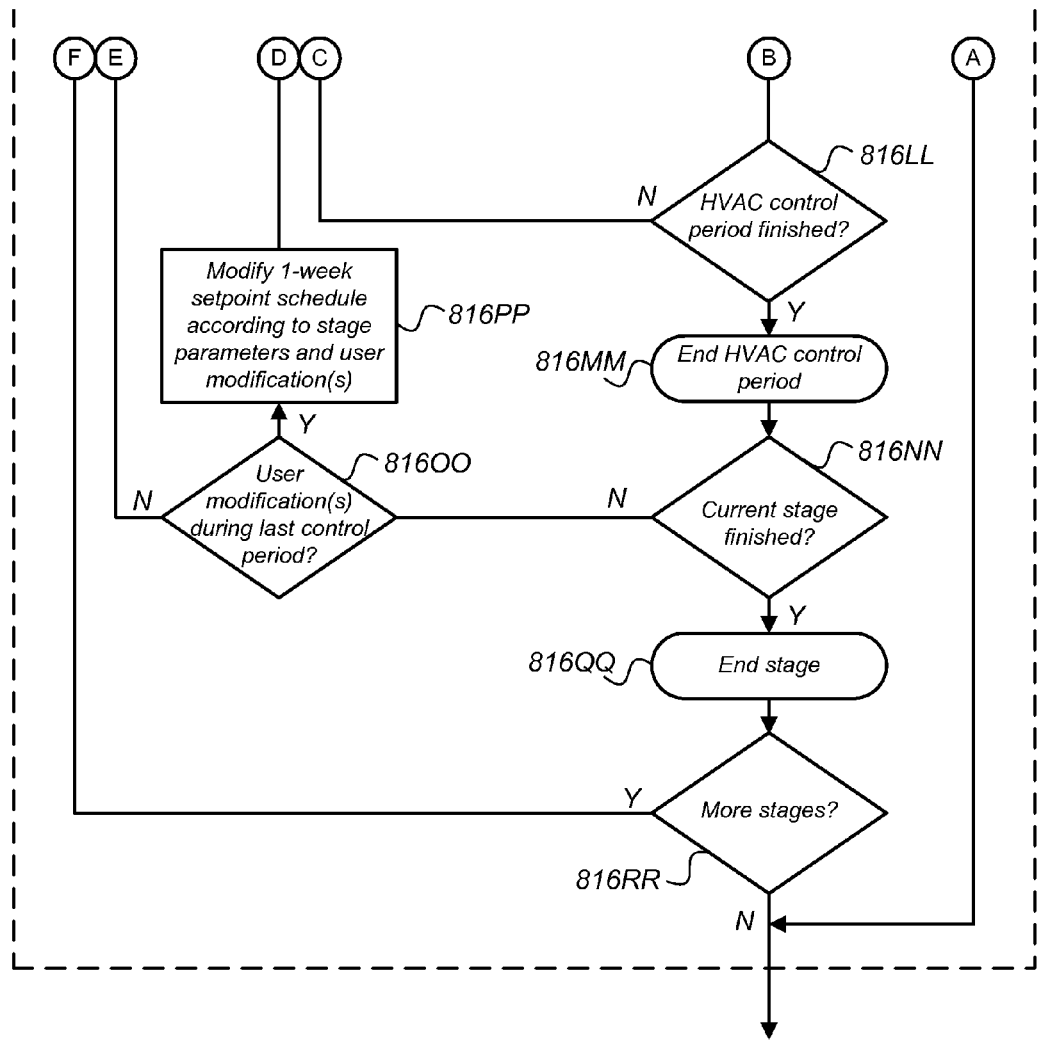

Turning now to FIGS. 11A and 11B, FIGS. 11A and 11B illustrate a process for optimizing an original schedule of setpoint temperatures (e.g., as described with reference to operation 816) according to a second embodiment. To facilitate understanding, the process 816 is described with reference to FIGS. 1, 2, 9, 12A to 12H, 13A, and 13B, although it should be understood that embodiments of the process 816 are not limited to the exemplary embodiments described with reference to FIGS. 1, 2, 9, 12A to 12H, 13A, and 13B. Further, it should be understood that similar operations described with reference to FIG. 10 may similarly be applied to the operations described with reference to FIGS. 11A and 11B, where duplicate description is omitted to reduce reader burden.

In operation 816AA, an original schedule of setpoint temperatures is identified. This operation is similar to operation 816A. Such an original schedule may be, for example, similar to that described with reference to FIG. 12A. As mentioned, FIG. 12A illustrates a schedule of original setpoint temperatures according to an embodiment. The schedule in this example is defined over a period of 24 hours, and defines an indoor temperature control trajectory 904 that ranges between 71° F. and 73° F. In this particular schedule, various events are defined, including a return time (1800 hrs), a sleep time (2300 hrs), a wake time (0600 hrs), and a leave time (0830 hrs). The return time may be indicative of a time when the structure transitions from an unoccupied state to an occupied state. The sleep time may be indicative of a time when the occupants go to bed or fall asleep. The wake time may be indicative of a time when the occupants get out of bed or wake up. The leave time may be indicative of a time when the structure transitions from an occupied state to an unoccupied state.

The various events may be defined in or more of a variety of fashions. For example, a user may input these event times into the thermostat 202 (via thermostat 202, access device 266, or other electronic device of smart home environment 200). For another example, these event times may be pre-set in the thermostat 202 or communicated to the thermostat 202 from an entity other than the user, such as energy management system 130. For yet another example, these event times may be determined by the thermostat 202 (or other element of smart home environment 200). For example, thermostat 202 may generate an occupancy probability profile that indicates a probability that the structure will be occupied at various times. The leave time may be identified as the time at which there is an 80% likelihood that the structure will be unoccupied. The return time may be identified as the time at which there is an 80% likelihood that the structure will be occupied. The specific percentages need not be 80%, but rather could be any value greater than 50%, nor do they need to be identical to one another but rather they may be different from one another. The sleep and awake events may similarly be determined by thermostat 202 via, e.g., occupancy sensors, learned setpoint changes, etc. Accordingly, the events may be static or they may dynamically change over time as the occupants habits and tendencies evolve over time, and the events, or sub-intervals of the schedule of setpoint temperatures, may thus be based at least partially on the occupancy probability profile.

As a result, schedule optimization may be at least partially based on real time occupancy and/or occupancy probability. For example, energy reductions may be made more aggressively when the structure is unoccupied or expected to be unoccupied, and less aggressively when the structure is occupied or expected to be occupied. In some cases, an activity level of the occupant may also be determined (i.e., determined whether the occupant(s) is likely awake or sleeping), where energy reductions may be made more aggressively during a low activity level (e.g., occupant is sleeping) compared to a high activity level (e.g., occupant is awake). The activity level may be determined from one or more of a variety of types of information, including the type and/or frequency of user interactions with the thermostat, light conditions in the structure, in-structure network activity levels, time of day, etc. Occupancy and activity levels may not only impact a rate of change and/or magnitude of change in energy consumption, but may also impact the time at which energy consumption changes are made throughout the schedule optimization period. For example, high occupancy and/or activity levels may result in changes in energy consumption early in the schedule optimization period or even throughout the schedule optimization period, whereas low occupancy and/or activity levels may result in changes in energy consumption late in the schedule optimization period.

Returning to FIG. 11A, in operation 816BB the number of stages and parameters of each stage is determined. That is, in some embodiments, optimization of an original schedule to an optimal schedule may occur in one or more stages. Each stage may last for only a portion of the overall optimization period. For example, an optimization period may last for three weeks. The optimization period may be segregated into a number of independent stages. For example, the three week optimization period may be split into three independent stages each having a one-week duration. During each stage, a subset of the temperature setpoints within the original schedule of temperature setpoints may be adjusted. The subsets may be unique from one another, or overlapping. Once a stage is complete and the subset of temperature setpoints corresponding to that stage have been adjusted, a subsequent stage may begin. The subset of temperature setpoints corresponding to the subsequent stage may then be adjusted over the duration of the second stage. In some cases, the subset of temperature setpoints corresponding to previous stage(s) may be simultaneously adjusted.

Figure 12B:
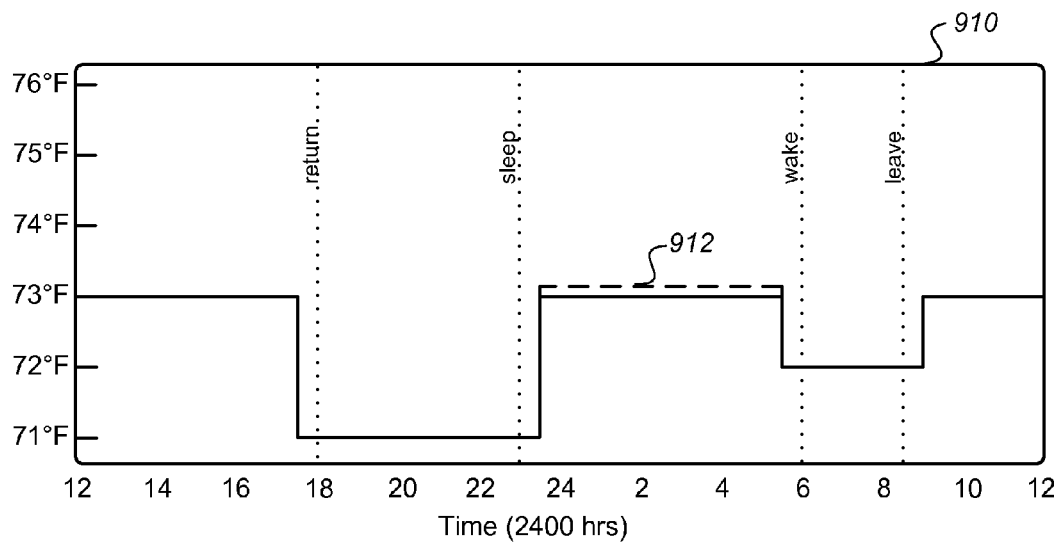
Figure 12C:
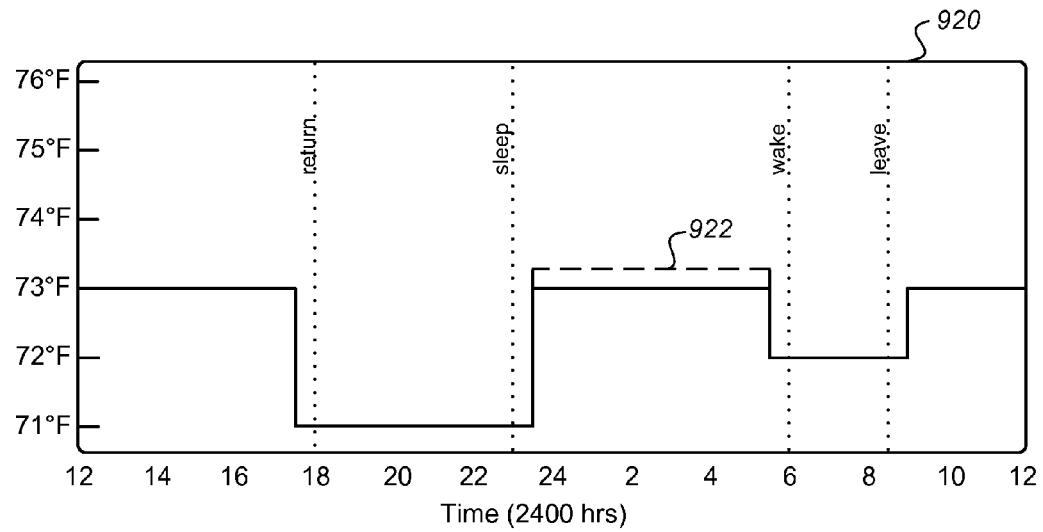
Figure 12D:
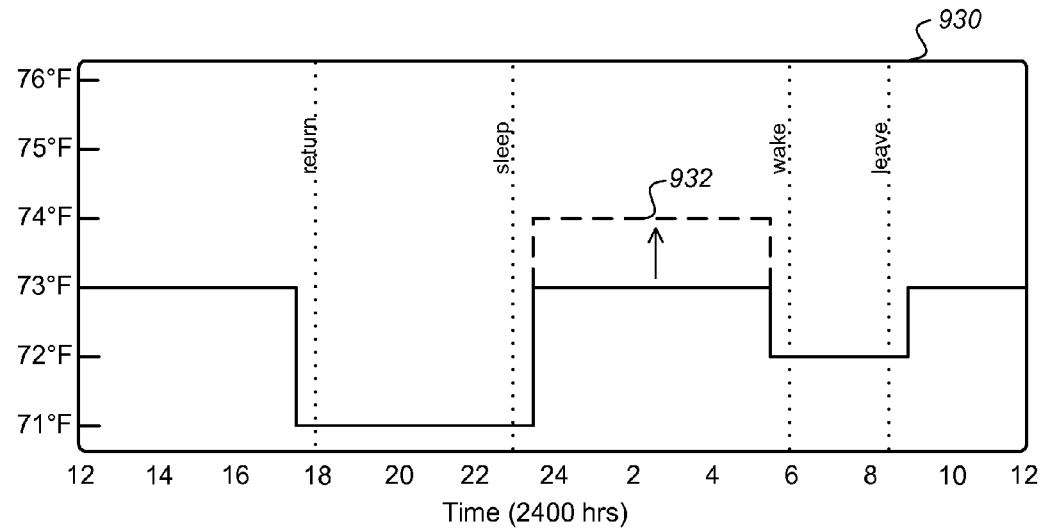

For example, FIGS. 12A through 12H illustrate adjustments made to an original schedule of setpoint temperatures in accordance with a scheduled setpoint optimization process that includes a three-stage modification to a schedule that is segregated into three sub-intervals, according to an embodiment. FIGS. 12A through 12D illustrate incremental adjustments made to the original schedule during the first stage. The adjustments are made to a first subset of temperature setpoints that correspond to a first sub-interval of the time period over which the original schedule of temperature setpoints is defined, where the first sub-interval extends between 2330 hrs and 0530 hrs. The temperature setpoints for this first sub-interval are offset (in this case, increased) by $\frac{1}{7}°$ F. each day for a week. For example, FIG. 12B illustrates an adjusted schedule 910 that includes an adjusted indoor temperature control trajectory 912 for the first day of the week. FIG. 12C illustrates an adjusted schedule 920 that includes an adjusted indoor temperature control trajectory 922 for the second day of the week. FIG. 12D illustrates an adjusted schedule 930 that includes an adjusted indoor temperature control trajectory 932 for the last day of the week. As a result, at the end of the first week, or stage, the temperature setpoints defined between 2330 hrs and 0530 hrs are increased by 1° F.

Figure 12E:
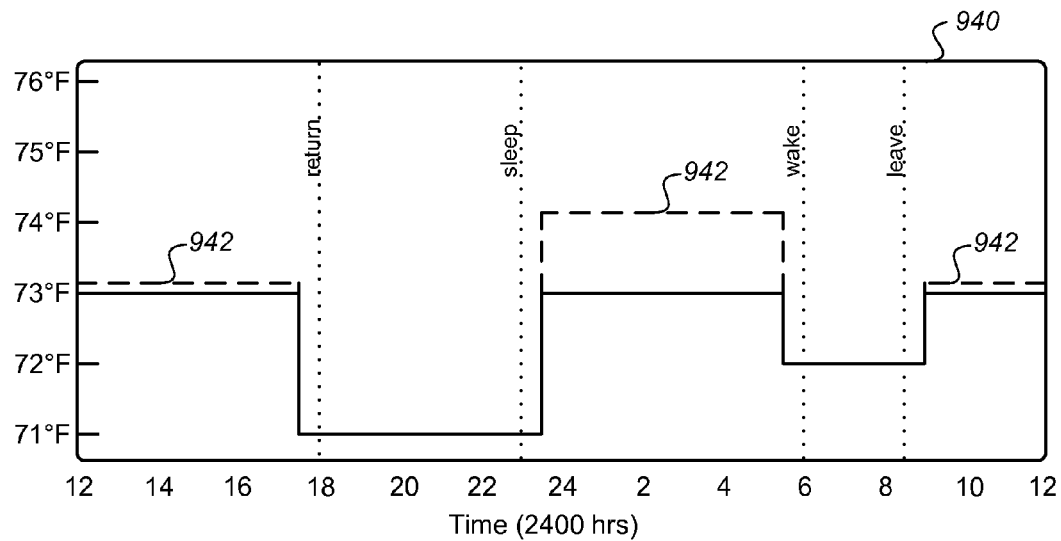
Figure 12F:
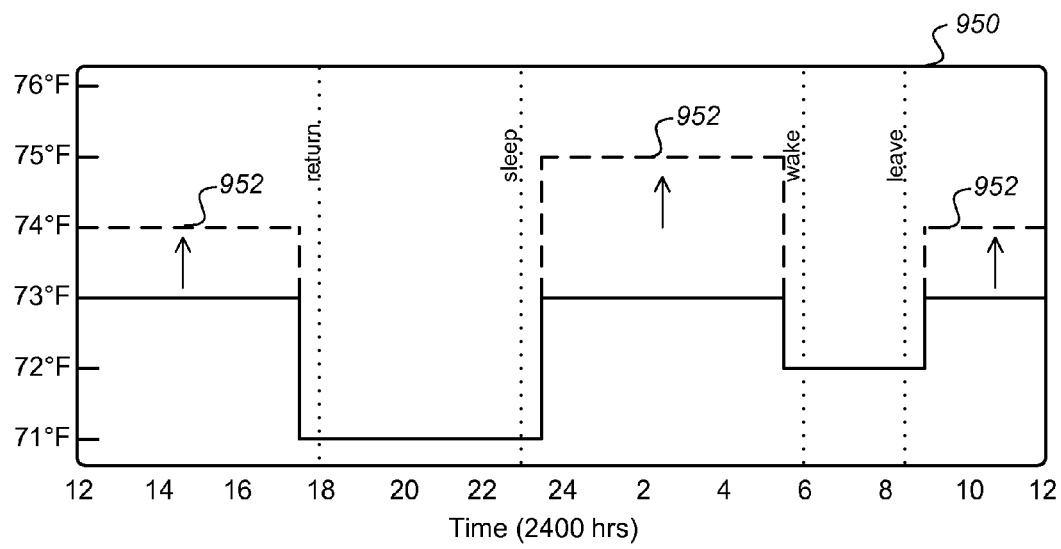

FIGS. 12E and 12F illustrate incremental adjustments made to the original schedule during the second stage. The adjustments described with respect to the temperature setpoints for the first sub-interval are continued. That is, over the course of the second stage, or the second week, the temperature setpoints for the first sub-interval are again increased by $\frac{1}{7}°$ F. each day for the second week. Further, adjustments are also made to a second subset of temperature setpoints that correspond to a second sub-interval extending between 0830 hrs and 1730 hrs, where that second subset of temperature setpoints is also increased by $\frac{1}{7}°$ F. each day for the second week. For example, FIG. 12E illustrates an adjusted schedule 940 that includes an adjusted indoor temperature control trajectory 942 for the first day of the week. FIG. 12F illustrates an adjusted schedule 950 that includes an adjusted indoor temperature control trajectory 952 for the seventh day of the week. As a result of the adjustments made during the second stage, at the end of the second stage, or week, the temperature setpoints defined for the first sub-interval (i.e., between 2330 hrs and 0530 hrs) are increased by 2° F. from their original setpoint temperature of 73° F. to an adjusted setpoint temperature of 75° F., and the temperature setpoints defined for the second sub-interval (i.e., between 0830 hrs and 1730 hrs) are increased by 1° F. from their original setpoint temperature of 73° F. to 74° F.

Figure 12G:
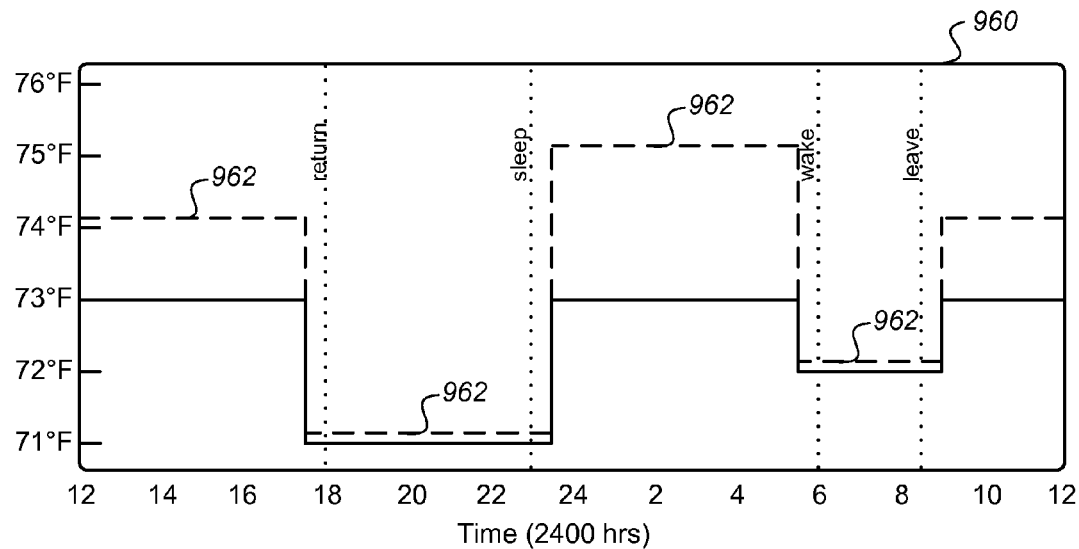
Figure 12H:
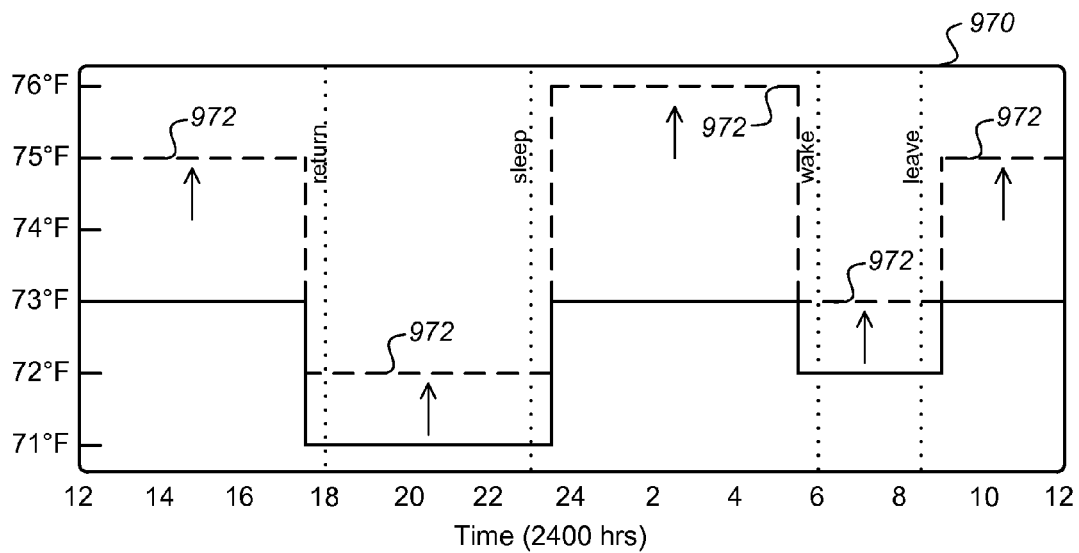

FIGS. 12G and 12H illustrate incremental adjustments made to the original schedule during the third stage. The adjustments described with respect to the temperature setpoints for the first and second sub-intervals are continued. That is, over the course of the third stage, or the third week, the temperature setpoints for the first and second sub-intervals are again increased by $\frac{1}{7}°$ F. each day for the third week. Further, adjustments are also made to a third subset of temperature setpoints that correspond to a third sub-interval extending between 1730 hrs and 2330 hrs and between 0530 hrs and 0830 hrs, where that third subset of temperature setpoints is also increased by $\frac{1}{7}°$ F. each day for the third week. For example, FIG. 12G illustrates an adjusted schedule 960 that includes an adjusted indoor temperature control trajectory 962 for the first day of the week. FIG. 12H illustrates an adjusted schedule 970 that includes an adjusted indoor temperature control trajectory 972 for the seventh day of the week. As a result of the adjustments made during the third stage, at the end of the third stage, or week, the temperature setpoints defined for the first sub-interval (i.e., between 2330 hrs and 0530 hrs) are increased by 3° F. from their original setpoint temperature of 73° F. to an adjusted setpoint temperature of 76° F., the temperature setpoints defined for the second sub-interval (i.e., between 0830 hrs and 1730 hrs) are increased by 2° F. from their original setpoint temperature of 73° F. to 75° F., and the temperature setpoints defined for the third sub-interval (i.e., between 1730 hrs and 2330 hrs and between 0530 hrs and 0830 hrs) are increased by 1° F. from their original setpoint temperatures of 71° F. and 72° F., respectively, to 72° F. and 73° F., respectively.

It should be recognized that the adjustments and setpoint schedules described with reference to FIGS. 12A through 12H are illustrated for explanation purposes only, and the scope of the subject description is not so limited. For example, while adjustments are shown as increases in temperature, adjustments may also or alternatively include decreases in temperature, increases in the time of setpoint temperatures, or decreases in the time of setpoint temperatures. For another example, while the schedule is described as being segregated into three sub-intervals, the schedule may be segregated into more or fewer sub-intervals. For another example, while the optimization process is described as having the same number of stages and schedule sub-intervals, these may be different. For another example, while the optimization process is described as increasing the temperature setpoints at the same rate for each stage, they may be adjusted at different rates across stages or even within a stage. For another example, while the optimization process is described as increasing the temperature setpoints at the same rate for each sub-interval, they may be adjusted at different rates for different sub-intervals. For another example, while the optimization process is described as maintaining the same sub-intervals for each stage, the size, location, and/or number of sub-intervals may vary from stage to stage. For another example, while the optimization process is described as reducing energy consumption more aggressively when occupants are asleep as compared to when occupants are awake, in other embodiments energy consumption may be reduced more aggressively when occupants are awake compared to when occupants are asleep.

It should also be recognized that in some embodiments, the sub-intervals may be defined with reference to the aforementioned user events. For example, the first sub-interval may be defined with reference to the sleep event and subsequent wake event, otherwise defining an interval during which the occupants are likely asleep. The second sub-interval may be defined with reference to the leave event and the return event, otherwise defining an interval during which the structure is likely to be unoccupied. The third sub-interval may be defined with reference to the return event and sleep event, and with reference to the wake event and leave event, otherwise defining an interval during which the structure is likely to be occupied and the occupants awake.

It should further be recognized that in some embodiments, the rate of adjustment and/or magnitude of the total adjustment (i.e., difference between the original schedule and optimal schedule) may be determined based on one or more of the aforementioned user events. For example, the rate of adjustment and/or magnitude of the total adjustment may be greater for periods during which the structure is likely to be unoccupied compared to periods during which the structure is likely to be unoccupied. For another example, the rate of adjustment and/or magnitude of the total adjustment may be greater for periods during which the occupants of the structure are likely to be asleep compared to periods during which the occupants of the structure are likely to be awake.

Returning now to FIG. 11A, as previously mentioned, in operation 816BB the number of stages and the parameters of each is determined. For example, as described with reference to FIGS. 12A through 12H, the number of stages may be three. Parameters may define characteristics of each stage, such as the duration of a stage (e.g., one week), the number of stages (e.g., three), the size (e.g., 2 hrs) and/or location (e.g., starting at 1750 hrs) of the sub-intervals for each stage, the rate of adjustment of the temperature setpoints for the stage (e.g., $\frac{1}{7}°$ F.) and/or sub-intervals defined for the stage, and/or other characteristics. Once the number of stages and parameters of each stage are determined, processing may continue to operation 816CC where the schedule optimization for the first stage begins.

In operation 816DD, the 1-week setpoint schedule (or other period as defined by the aforementioned parameters) is modified according to the parameters. For example, in some embodiments as previously described, an original schedule of setpoint temperatures may define setpoint temperatures for a particular period, such as a week. That period of schedule setpoints may be adjusted according to the aforementioned parameters. For example, with reference to FIG. 12A, schedule 900 may be a schedule of setpoint temperatures for a particular day, such as Monday. The full schedule of setpoint temperatures may include an identical or similar schedule of setpoint temperatures for other days of the week, such as Tuesday to Friday. The full schedule may further include an identical, similar, or more often, fairly different, schedule of setpoint temperatures for Saturday and Sunday. In this particular embodiment, the schedule of setpoint temperatures for the entire week are adjusted according to the stage parameters. For example, with reference to FIG. 12B, the original schedule 900 may be adjusted to generate the adjusted schedule 910. The adjusted schedule 910 includes an adjusted indoor temperature control trajectory 912 defined for the first sub-interval, where the adjusted indoor temperature control trajectory 912 over this sub-interval is increased by $\frac{1}{7}°$ F. as compared to the original indoor temperature control trajectory 904 over the same sub-interval. In addition to adjusting the schedule for a particular day, such as Monday, the adjustments may similarly be made to the schedule for other days, such as Tuesday to Friday, Saturday, and Sunday. In some cases the first sub-interval will be the same for each day. In other cases, such as when the user events change between days (e.g., the wake event changes from 6 am on Monday to Friday to 8 am on Saturday and Sunday), the first sub-interval will be different for at least one of the days defined in the schedule. Even though the same sub-interval (e.g., the first sub-interval representing a likely period during which the occupants are asleep) may be defined over different time periods throughout the one-week schedule, in some embodiments identical adjustments (e.g., $\frac{1}{7}°$ F.) may be made to that sub-interval.

Once the one-week setpoint schedule is modified, processing may continue to operation 816EE where an HVAC control period begins. An HVAC control period may be defined for a period of time less than a stage and less than the overall optimization period. For example, an HVAC control period may be one day (it could, similarly, be less than or more than one day). Accordingly, the HVAC may be controlled according to the adjusted schedule (e.g., adjusted schedule 910) for that one day. During the HVAC control period, user interactions (e.g., via thermostat 202, access device 266, or other computing devices of smart home environment 200) may be monitored. Additionally or alternatively, interactions by entities other than the user, e.g., by energy management system 130, remote server 264, or other entity of system 100, may similarly be monitored. Such monitoring may include monitoring for user changes to scheduled setpoint temperatures, monitoring for user changes to current setpoint temperatures, monitoring for user indications to stop the schedule optimization, monitoring for changes to the stage parameters, etc.

In operation 816FF, it is determined whether a user has modified a current setpoint temperature. For example, thermostat 202 may determine whether a user has modified a current setpoint temperature at thermostat 202, at access device 266, or via one or more other computing devices of smart home environment 200. If it is determined that a user has modified a current setpoint temperature, then processing may continue to operation 816GG where the current setpoint temperature is adjusted and immediately followed or otherwise adhered to by the thermostat. It should be recognized that the HVAC system may not be controlled indefinitely in accordance with the current setpoint temperature as adjusted by the user. Rather, the user-adjusted setpoint temperature may be followed for a certain period of time. For example, the user-adjusted setpoint temperature may be followed until a subsequent setpoint defined in the schedule of setpoint temperatures is reached, at which point the HVAC system may revert to being controlled in accordance with that subsequent setpoint.

In operation 816HH, information regarding the modification, such as the time at which the modification was made, the magnitude of the modification, and the like, may be stored. Such information may be stored, e.g., in a storage element of thermostat 202. On the other hand, if it is determined in operation 816FF that a user has not modified a current setpoint temperature, then processing may continue to operation 816II.

In operation 816II, it is determined whether a user has modified one or more of the setpoint temperatures defined in the schedule of setpoint temperatures. For example, thermostat 202 may determine whether a user has modified one or more of the setpoint temperatures defined in the schedule of setpoint temperatures via thermostat 202, access device 266, or via one or more other computing devices of smart home environment 200. If it is determined that a user has modified one or more of the setpoint temperatures defined in the schedule of setpoint temperatures, then processing may continue to operation 816JJ where information regarding the modification, such as the time of the setpoint(s) that was changed, the magnitude of the modification, and the like, may then be stored. Such information may be stored, e.g., in a storage element of thermostat 202. On the other hand, if it is determined in operation 816II that a user has not modified one or more of the setpoint temperatures defined in the schedule of setpoint temperatures, then processing may continue to operation 816KK.

In operation 816KK it is determined whether a fatal interrupt occurs. A fatal interrupt may be any interruption in the schedule optimization that causes the optimization to complete. This may result from, e.g., the user indicating a desire to stop schedule optimization. For example, the user may select an option to stop schedule optimization via a input/output interface of thermostat 202, access device 266, and/or another computing device of smart home environment 200. If a fatal interrupt occurs, then schedule optimization may end. Otherwise, processing may continue to operation 816LL.

In operation 816LL, it is determined whether the control period is finished. For example, where the control period is one day, thermostat 202 may determine that the control period is finished approximately 24 hours after the HVAC control period began. If the control period is not finished, then processing may return to operation 816FF where monitoring is continued. Otherwise, processing may continue to operation 816MM where it is determined that the HVAC control period is finished.

Once it is determined that the HVAC control period is finished, processing may continue to operation 816NN. In operation 816NN, it is determined with the current stage is finished. For example, where the first stage is one week long, thermostat 202 may determine that the current stage is not finished until seven control periods have been performed. With brief reference to FIGS. 12B through 12D, FIG. 12B illustrates an adjusted schedule 910 including an adjusted indoor temperature control trajectory 912 for the first HVAC control period of the first stage, FIG. 12C illustrates an adjusted schedule 920 including an adjusted indoor temperature control trajectory 922 for the second HVAC control period of the first stage, and FIG. 12D illustrates an adjusted schedule 930 including an adjusted indoor temperature control trajectory 932 for the seventh control period of the first stage.

If it is determined that the current stage is not finished, then processing may return to operation 816DD where the one-week setpoint schedule is again modified according to the stage parameters. For example, with reference to FIGS. 12B and 12C, after the adjusted setpoint schedule 910 is implemented for an HVAC control period (e.g., one day), the setpoint schedule may be adjusted again as shown in the adjusted schedule 920. The newly adjusted setpoint schedule 920 may then be implemented for an HVAC control period. This process may repeat until the newly adjusted setpoint schedule 930 is implemented for an HVAC control period.

Prior to returning to modify the one-week setpoint schedule, it may be determined whether there was a user modification during the last control period. That is, if it is determined in operation 816NN that the current stage is not finished, then processing may continue to operation 816OO where it is determined whether there was a user modification during the HVAC control period that just ended. The user modification may include, for example, a modification to a current setpoint and/or to a scheduled setpoint. If it is determined that there was no user modification, then processing may return to operation 816DD where the one-week setpoint schedule is adjusted according to the stage parameters. However, if it is determined that there was a user modification, then processing may continue to operation 816PP.

In operation 816PP the one-week setpoint schedule is modified according to both the stage parameters and the user modification(s). For example, where the user modification indicates positive feedback, the rate of change (i.e., size of one or more subsequent adjustments) may be increased (e.g., from $1/7°$ F. to $1/5°$ F.) and/or the difference between the original scheduled setpoint temperatures and the optimal setpoint temperatures may be increased (e.g., from 1° F. to 2° F.). If, on the other hand, the user change is indicative of a negative feedback, the rate of change (i.e., size of one or more subsequent adjustments) may be decreased (e.g., from $1/7°$ F. to $1/14°$ F.) and/or the difference between the original scheduled setpoint temperatures and the optimal setpoint temperatures may be decreased (e.g., from 1° F. to 0.5° F.).

Figure 13A:
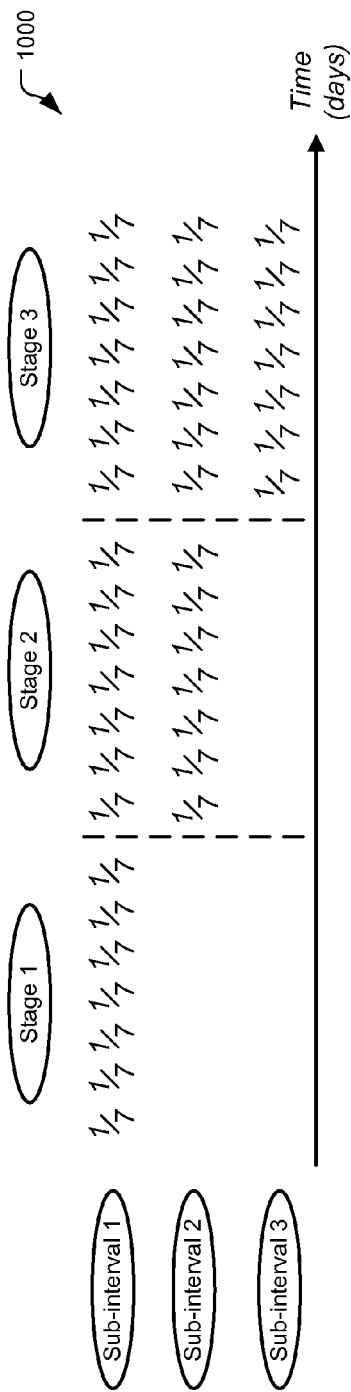
FIG. 13A illustrates the magnitude of incremental schedule adjustments over time for a three-stage schedule optimization without any user modifications, according to an embodiment.
Figure 13B:
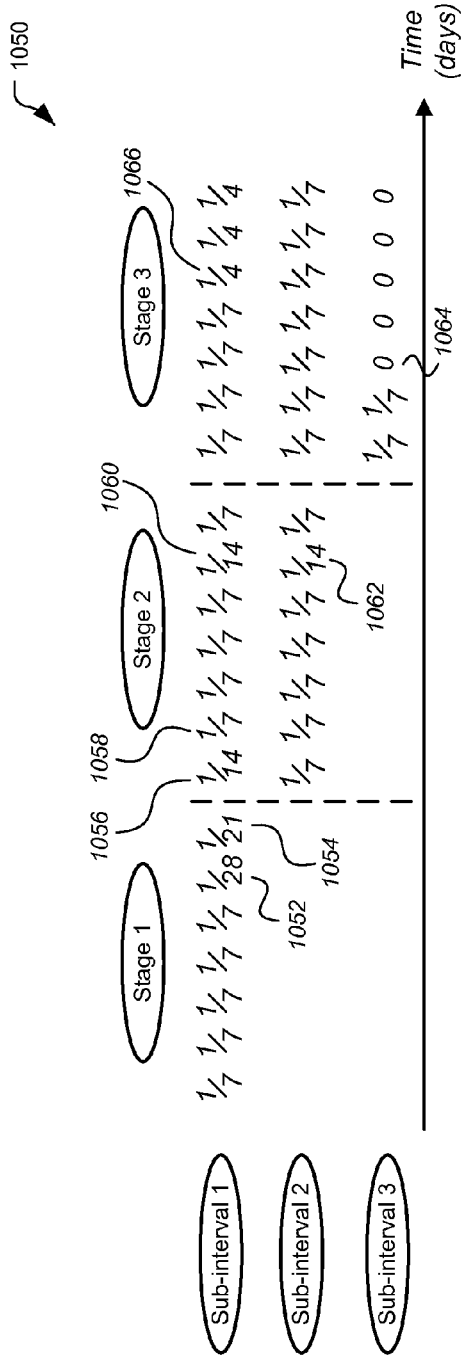
FIG. 13B illustrates the magnitude of incremental schedule adjustments over time for a three-stage schedule optimization with various user modifications, according to an embodiment.

Turning briefly to FIGS. 13A and 13B, FIG. 13A illustrates the magnitude of incremental schedule adjustments (i.e., the magnitude of temperature offsets) over time 1000 for a three-stage schedule optimization without any user modifications, according to an embodiment. For the first stage, for example the stage described with reference to FIGS. 12A through 12D, on each day of the one-week stage the scheduled temperature setpoints for a first sub-interval are adjusted (e.g., increased) by $1/7°$ F. each day. During the second stage which immediately follows the first stage, the scheduled temperature setpoints for the first sub-interval are again adjusted by $1/7°$ F. each day of the second stage, and the scheduled temperature setpoints for the second sub-interval are adjusted by $1/7°$ F. each day of the second stage. Then during the third stage which immediately follows the second stage, the scheduled temperature setpoints for each of the first sub-interval and the second sub-interval are again adjusted by $1/7°$ F. each day of the third stage, and the scheduled temperature setpoints for the third sub-interval are adjusted by $1/7°$ F. each day of the third stage.

FIG. 13B illustrates the magnitude of incremental schedule adjustments over time 1050 for a three-stage schedule optimization with various user modifications, according to an embodiment. The various user modifications include user modifications indicative of both negative and positive feedback, including variations to the schedule adjustments based on the magnitude of that feedback.

In one particular example, a user modification during the fifth day of stage one is indicative of negative feedback. For example, the user may reduce the temperature of a current setpoint temperature and/or reduce the temperature of a scheduled setpoint temperature. In some cases, a reduction to the current setpoint temperature may be performed during the first sub-interval, while in other cases a reduction may be performed during sub-intervals other than the first sub-interval. Similarly, in some cases, a reduction to the temperature of a scheduled setpoint temperature may be a reduction to the temperature of a scheduled setpoint temperature defined within the first sub-interval, while in other cases a reduction to the temperature of a scheduled setpoint temperature may be a reduction to the temperature of a scheduled setpoint temperature defined in a sub-interval other than the first sub-interval. In any case, as a result of the negative feedback during the fifth day of stage one, the setpoint adjustment for one or more subsequent days, such as the sixth and seventh day of stage one, and the first day of stage two, is reduced. For example, the setpoint adjustment for the sixth day of stage one 1052 is set to $1/28°$ F. rather than $1/7°$ F.

In some embodiments the magnitude of the change to the adjustment may be fixed regardless of the number or magnitude of user modifications. For example, the scheduled setpoint may be adjusted by $1/28°$ F. rather than $1/7°$ F. as a result of any user modification indicative of negative feedback. In other embodiments the magnitude of the change to the adjustment may be determined based on the number, magnitude, and/or type of user modifications during the previous HVAC control period. For example, as the number of user modifications during the previous HVAC control period increase, the magnitude of the change to the adjustment may increase. For another example, as the magnitude of the user modifications during the previous HVAC control period increase, the magnitude of the change to the adjustment may increase. For yet another example, the magnitude of the change may be greater for user changes to scheduled setpoint temperatures as compared to user changes to current setpoint temperatures.

In some embodiments the magnitude of the change to the adjustment may depreciate over time. For example, in response to a user modification indicative of negative feedback during the fifth day of stage one, the setpoint adjustment for the sixth day of stage one 1052 may be set to $1/28°$ F. rather than $1/7°$ F. Instead of keeping the setpoint adjustment set at $1/28°$ F. for subsequent days, the difference between the original adjustment of $1/7°$ F. and the new adjustment of $1/28°$ F. may be reduced over time. For example, the setpoint adjustment may be set to $1/21°$ F. for the seventh day of stage one 1054, and the setpoint adjustment may be set to $1/14°$ F. for the first day of stage two 1056, before the setpoint adjustments returns to $1/7°$ F. for the second day of stage two 1058.

In some embodiments, changes to setpoint adjustments may be applied not only to one sub-interval of setpoint temperatures but could be applied to multiple sub-intervals of setpoint temperatures. For example, during the fifth day of stage two, a user modification indicative of negative feedback may be received. The user modification may be received during, e.g., the first sub-interval of the schedule of setpoint temperatures. In addition to reducing the magnitude of the setpoint adjustment for the sixth day of stage two 1060 for the first sub-interval of the schedule, the magnitude of the setpoint adjustment for the sixth day of stage two 1062 for the second sub-interval of the schedule may also be reduced (by the same or a different amount; e.g., it may be reduced less).

In some embodiments, changes to setpoint adjustments may be so significant as to cause the setpoint optimization process to stop adjusting the setpoint temperatures within one or more sub-intervals. For example, during the second day of stage three, a user modification indicative of negative feedback may be received. The user modification may be received during, e.g., the third sub-interval of the scheduled of setpoint temperatures. The number, magnitude, or type of user modification may be so significant (e.g., 3 or more modifications to a current setpoint temperature, a modification having a magnitude greater than 5° F., etc.) that the temperature setpoints for that sub-interval are not modified for the remainder of the stage and/or optimization period. For example, where the user modification received during the second day of stage three has such characteristics, the setpoint adjustment for the third day of stage three 1064 for the third sub-interval of the schedule may be reduced to zero, as may the subsequent setpoint adjustments for that sub-interval.

As previously mentioned, user modifications may not only be indicative of negative feedback but may also be indicative of positive feedback. For example, such a user modification may be received for the fourth day of stage three for the first sub-interval of the schedule. In response, the setpoint adjustment for the fifth day of stage three 1066 may be set to $1/4°$ F. rather than $1/7°$ F. Subsequent setpoint adjustments may be similarly defined as shown in FIG. 13B, or may be reduced as previously described with respect to some examples of negative feedback.

Returning now to FIGS. 11A and 11B, as described, if user modifications were made during the last control period, in operation 816PP the one-week setpoint schedule may be adjusted according to the stage parameters and user modification(s). Once the setpoint schedule is adjusted, processing may return to operation 816EE where the new HVAC control period is begun and the HVAC is controlled in accordance with the adjusted one-week setpoint schedule.

As mentioned, a user modification may be a modification to a setpoint temperature defined in a schedule of setpoint temperatures. For example, with reference to FIG. 12C, during the second day of the first stage the user may manually change a scheduled setpoint temperature at 2400 hrs from 73° F. (or, more accurately, 73 and $2/7°$ F. if such accuracy is communicated to the user) to 71° F. In such a case, during subsequent days of the first stage (and second and third stage), instead of continuing to be adjusted from 73 and $2/7°$ F., adjustments may be made from the newly set schedule setpoint temperature of 71° F. As a result, a user may advantageously continue to control their schedule of temperature setpoints, while schedule optimization may similarly continue to migrate the user's schedule to one that is more optimal.

Returning now to operation 816NN, if it is determined that a stage is finished, then processing continues to operation 816QQ, where it is determined that the stage is finished. In operation 816RR it is then determined whether there are any more stages. If there are, then processing returns to operation 816CC, where the new stage is begun. Otherwise, if there are no more stages, then the schedule optimization process is complete.

It should be appreciated that the specific operations illustrated in FIGS. 11A and 11B provide a particular process for optimizing an original schedule of setpoint temperatures according to an embodiment. The various operations described with reference to FIGS. 11A and 11B may be implemented at and performed by one or more of a variety of electronic devices or components described herein. For example, they may be implemented at and performed by one or more electronic devices in the smart home environment 200, the energy management system 130, etc. Other sequences of operations may also be performed according to alternative embodiments. For example, alternative embodiments of the present invention may perform the operations outlined above in a different order. Moreover, the individual operations illustrated in FIGS. 11A and 11B may include multiple sub-operations that may be performed in various sequences as appropriate to the individual operations. Furthermore, additional operations may be added or existing operations removed depending on the particular applications.

FIGS. 14A through 14L illustrate thermostats having a graphical user interface (GUI) for implementing a schedule optimization process according to various embodiments. For example, the thermostat described herein may correspond to thermostat 202, although it should be recognized that the GUIs described with respect to the thermostat may be similarly implemented on other computing devices of smart home environment 200, such as access device 266.

Figure 14A:
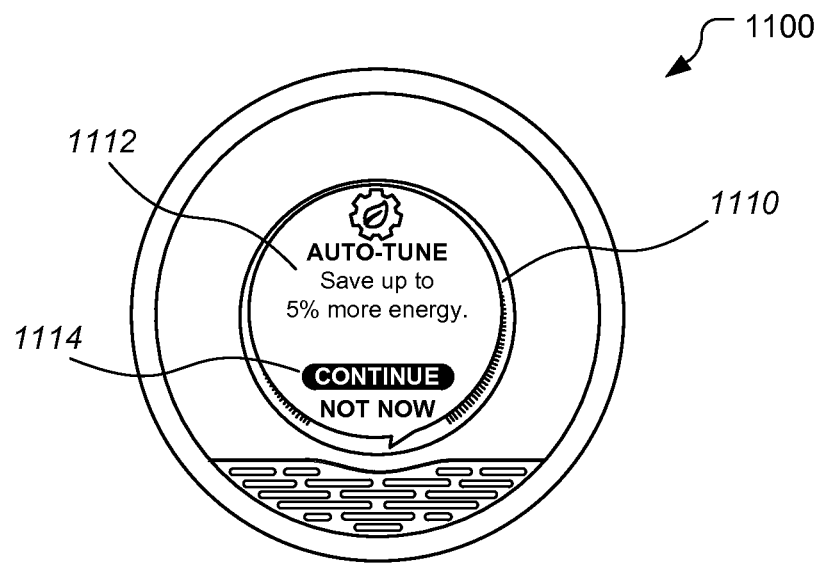
FIGS. 14A through 14L illustrate thermostats having a graphical user interface (GUI) for implementing a schedule optimization process according to various embodiments.

FIG. 14A illustrates a thermostat 1100 having a GUI 1110 that displays an option for a schedule optimization to the user. This option may be displayed in accordance with, for example, operation 812. The GUI 1110 includes a benefit summary 1112 of the schedule optimization process that describes the expected energy reductions if the user accepts and completes the schedule optimization process. Such expected energy reductions may be determined, for example, as described with reference to operation 704F. GUI 1110 may also display an option 1114 which requests whether the user would like to continue or otherwise proceed with the schedule optimization process, or delay the optimization process for a later time.

Figure 14B:
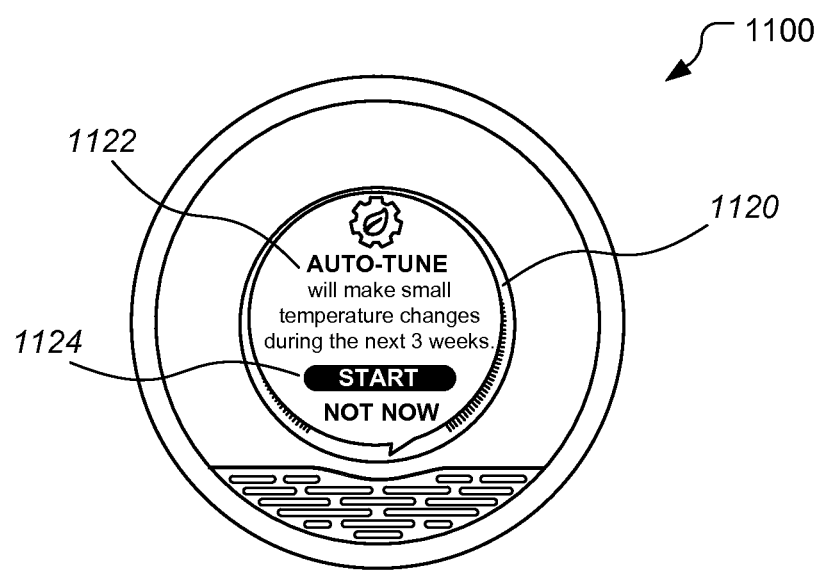

If the user indicates a desire to continue or otherwise proceed with the schedule optimization process, GUI 1120 as illustrated in FIG. 14B may be displayed to the user. GUI 1120 includes a textual description 1122 of the schedule optimization process that includes information indicating how long the schedule optimization process may take. GUI 1120 also includes an option 1124 as to whether the user would like to begin the schedule optimization process immediately, or delay the optimization process for a later time.

Figure 14C:
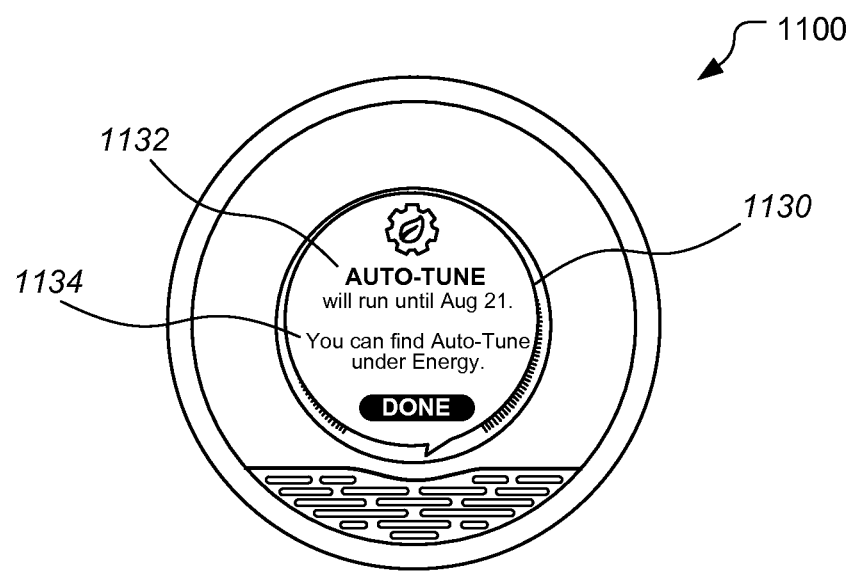

If the user indicates a desire to begin the schedule optimization process immediately, GUI 1130 as illustrated in FIG. 14C may be displayed to the user. GUI 1130 includes a textual description 1132 describing until what day the schedule optimization process will run (if not canceled), as well as a textual description 1134 describing where further information regarding the schedule optimization process can be found. In such a case, processing may continue, for example, as described with reference to operation 816.

Figure 14D:
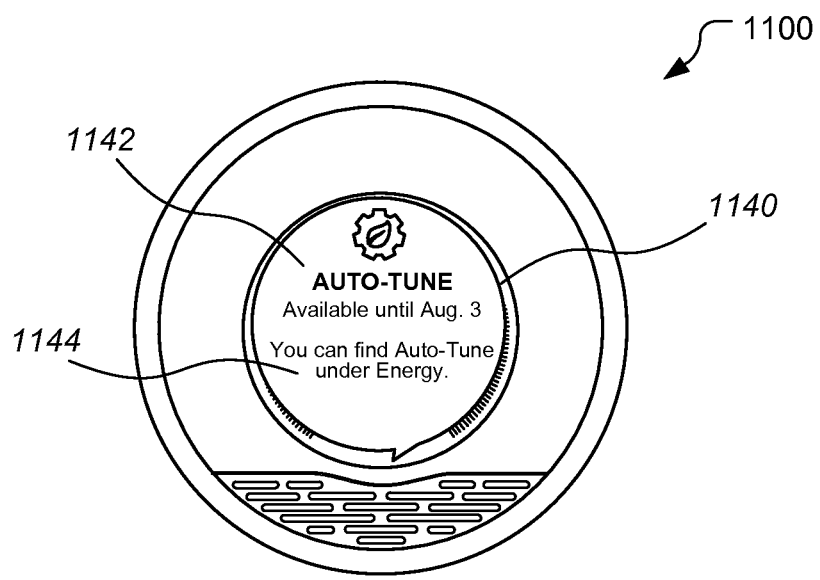

If, on the other hand, the user indicated a desire to delay the optimization process for a later time, GUI 1140 as illustrated in FIG. 14D may be displayed to the user. GUI 1140 includes a textual description 1142 describing until what day the schedule optimization process will be available (if so limited), as well as a textual description 1144 describing where further information regarding the schedule optimization process can be found. In such a case, processing may continue, for example, as described with reference to operation 808.

Figure 14E:
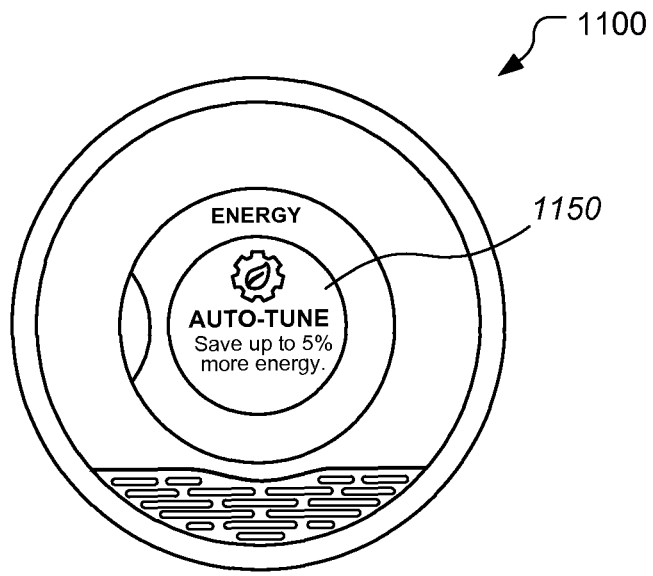

In some embodiments, a variety of operational menu's may be accessed via the input/output interface of the thermostat. One of such menus may include an 'Energy' menu where a variety of information, including information regarding a schedule optimization process, may be found. Turning to FIG. 14E, thermostat 1100 includes a GUI 1150 displaying an 'Energy' menu. In this particular example, the user has previously chosen to delay the optimization process for a later time, and thus GUI 1150 includes a benefit summary of the schedule optimization process similar to benefit summary 1112. In the event the user selects or otherwise actuates the benefit summary, GUI 1120 as illustrated in FIG. 14B may be presented to the user.

Figure 14F:
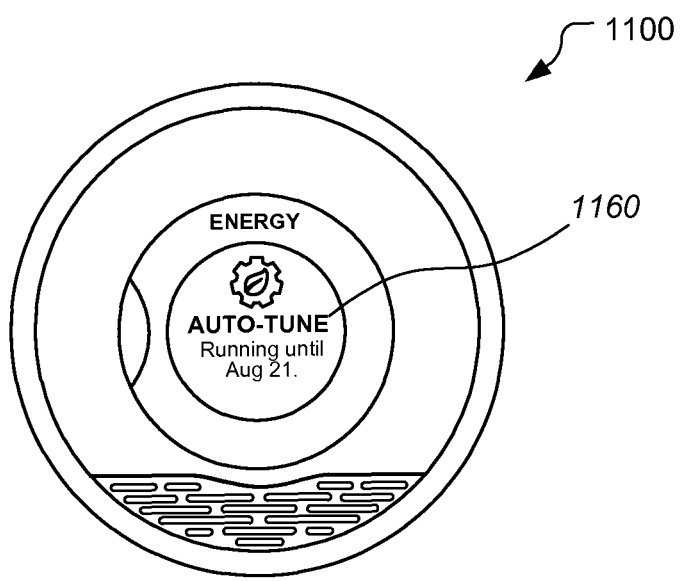
Figure 14G:
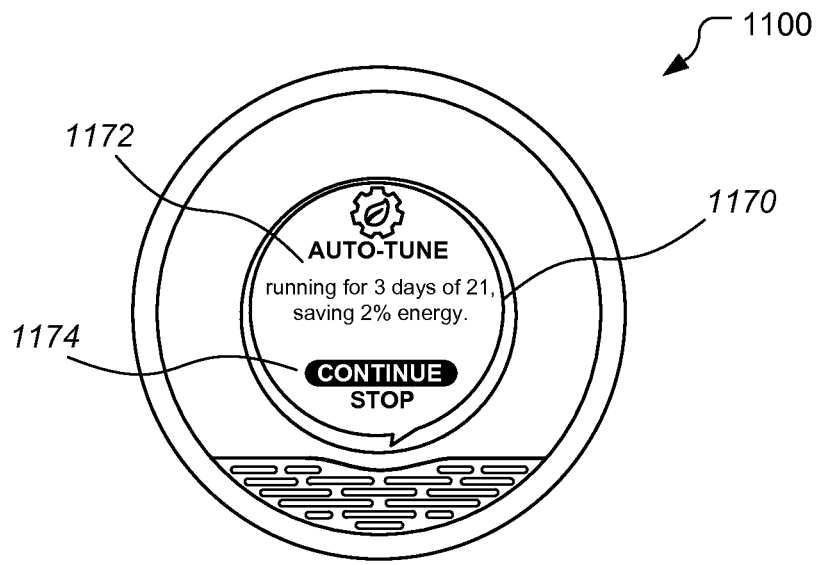
Figure 14H:
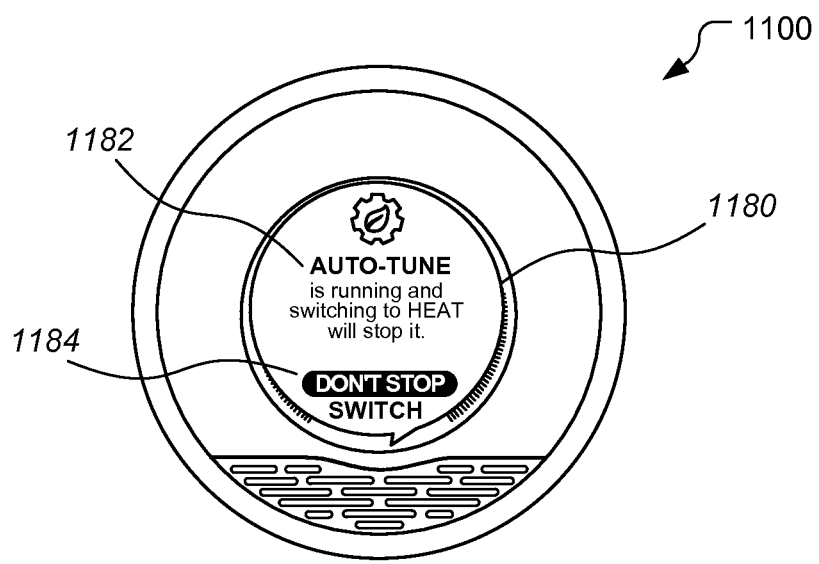

Turning to FIG. 14F, thermostat 1100 includes a GUI 1160 displaying an 'Energy' menu. In this particular example, the user has previously accepted the schedule optimization process, and thus GUI 1160 includes a textual description describing until what day the schedule optimization process will run (if not canceled). In the event the user selects or otherwise actuates the textual display, GUI 1170 as illustrated in FIG. 14G may be presented to the user.

GUI 1170 includes a progress summary 1172 indicating how long the schedule optimization process has been running for, the expected total duration of the schedule optimization process, and the current energy savings that result from implementation of the currently adjusted schedule as compared to the original schedule. Such energy savings may be determined similar to those described with reference to operation 704F, where in this case the original schedule and currently adjusted schedule are used rather than the original schedule and the optimal schedule (i.e., the optimal schedule resulting from completion of the optimization process). GUI 1170 also includes an option 1174 as to whether the user would like to continue the schedule optimization process or stop the schedule optimization process.

In some embodiments, the user may stop the schedule optimization process. This may be done, for example, by an explicit request to stop the schedule optimization process (e.g., as described with reference to FIG. 14G). This may also or alternatively be done as a result of, for example, significant user modifications to a current or scheduled setpoint temperature during the optimization process. This may also be done, for example, as a result of the user changing the HVAC operating state into a state that is opposite that for which the schedule is being optimized. For example, where an HVAC is operating in a cooling mode, and the schedule for the cooling mode is being optimized (i.e., temperature setpoints are being increased to reduce the on-time of an air conditioning element), if the user causes the HVAC to operate in a heating mode such a change may stop the schedule optimization process. The user may be presented with a warning, such as warning 1182 of GUI 1180 illustrated in FIG. 14H, that warns the user that switching the state of the HVAC will result in stopping the schedule optimization process. The user may similarly be presented with an option 1184 to either not stop the schedule optimization process (i.e., not implement the initially selected switch in HVAC states) or to stop the schedule optimization process (i.e., implement the initially selected switch in HVAC states).

Figure 14I:
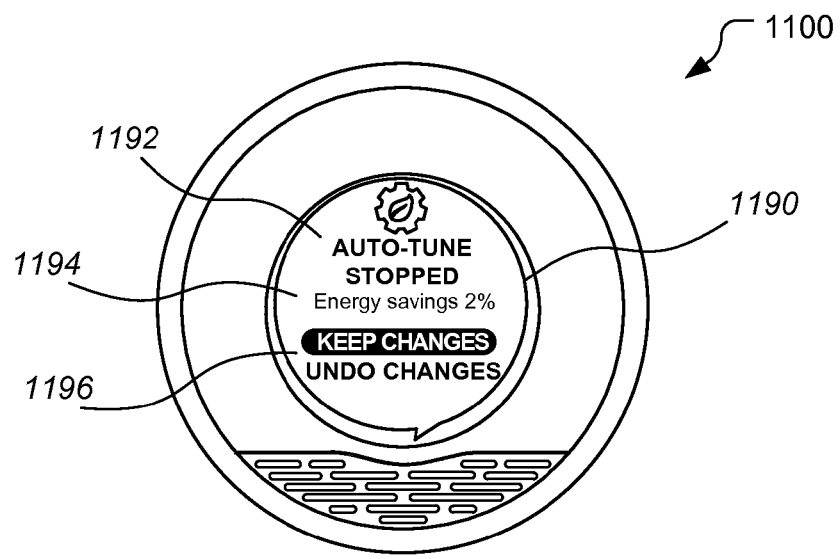

In any case, in response to the user indicating, either explicitly or implicitly, a desire to stop the schedule optimization process, GUI 1190 as illustrated in FIG. 14I may be displayed to the user. GUI 1190 includes an indication 1192 that the schedule optimization process has stopped, a summary 1194 indicating the energy savings that result from implementation of the currently adjusted schedule (i.e., the schedule as adjusted and implemented at the time of stopping the optimization) as compared to the original schedule, and an option 1196 for the user to either keep the adjusted schedule or revert to their original schedule. Such an option may be similar to that described with reference to operation 818.

Figure 14J:
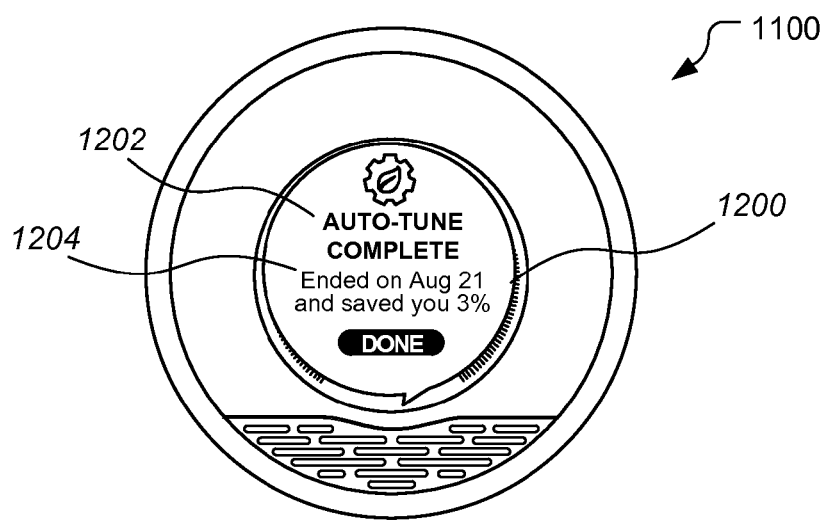

In cases where the schedule optimization process has completed with schedule adjustments kept, GUI 1200 as illustrated in FIG. 14J may be displayed to the user. GUI 1200 includes an indication 1202 that the schedule optimization process has completed, and a summary 1204 indicating the date of completion and the energy savings that result from implementation of the adjusted schedule.

Figure 14K:
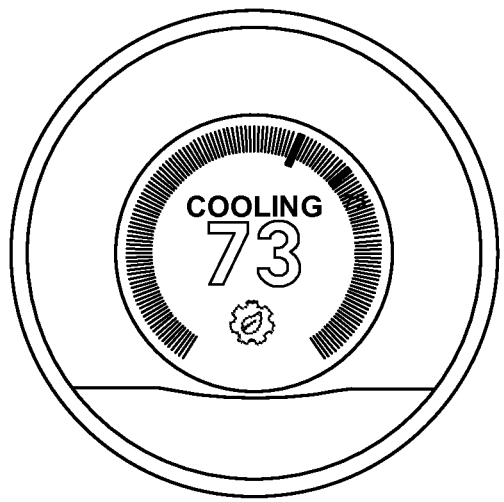
Figure 14L:
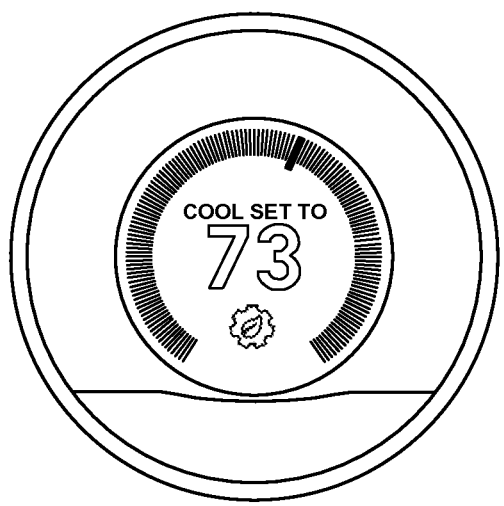

FIGS. 14K-14L illustrate preferable user interfaces associated with thermostat operation during the time that the automated schedule adjustment processes described herein are taking place. Similar user interfaces are provided for remote thermostat control using a browser-based interface, smartphone interface, and so forth. It has been found especially useful and beneficial to automatically display an iconic symbol to the user during these times in association with the user interface, wherein the iconic symbol is designed to simultaneously achieve multiple objectives including reassuring and/or notifying the user that there is an automated process taking place, and that this automated process is directed to achieving an environmentally beneficial objective. It has been found that one particularly useful iconic indicator comprises a symbol of a gear along with a symbol of a leaf embedded therein, the gear being found to connote in the mind of the user that there is an automated process of some sort taking place, and the leaf being found to connote in the mind of the user that this process has a beneficial impact on the environment. In addition to having one advantage that the leaf-in-gear symbol does not need translation into foreign languages, there is furthermore the advantage that the leaf-in-gear symbol is not alarming or threatening to the user, and has a positive connotation such that the user is mildly and subtly encouraged not to take any action that would remove the leaf-in-gear symbol from the user display. At the same time, because there is an associated with automation by virtue of the gear's connotation, the leaf-in-gear symbol is less likely to spur the user into any unnecessary manual interactions with the device.

It should be appreciated that the specific I/O interfaces illustrated in FIGS. 14A through 14L describe particular I/O interfaces according to certain embodiments. The I/O interfaces described with reference to FIGS. FIGS. 14A through 14L may be implemented at one or more of a variety of electronic devices associated with an energy consumer. For example, they may be implemented at and performed by one or more of the a thermostat 202, hazard detection unit 204, entryway interface device 206, wall light switch 208, wall plug interface 210, appliance 212, access device 266, or other electronic device associated with the identified energy consumer. The various messages and input elements may not necessarily be displayed at different times, but rather some messages could be presented simultaneously on the same display. Similarly, although some messages and information are explained as being presented simultaneously, they be instead be displayed at different times. Some messages could be communicated using other communication mechanisms, and responses could similarly be received using other communication mechanisms. For example, audible, touch, or other input/output mechanisms could be used. Further, it should be recognized that additional or alternative information could be presented before, during, and/or after implementation of a schedule optimization process, and all of the information illustrated in and described with reference to FIGS. 14A through 14L need not be presented. One of ordinary skill in the art would recognize and appreciate many variations, modifications, and alternatives.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Further, embodiments may include some or all of the systems, methods, apparatus, etc. described in one or more of the following commonly assigned applications, each of which is incorporated by reference herein: U.S. Ser. No. 13/842,213 (Ref. No. NES0253-US) filed Mar. 15, 2013; U.S. Ser. No. 13/632,118 (Ref. No. NES0119-US) filed Sep. 30, 2012; U.S. Ser. No. 13/632,093 (Ref. No. NES0122-US) filed Sep. 30, 2012; U.S. Ser. No. 13/632,028 (Ref. No. NES0124-US) filed Sep. 30, 2012; U.S. Ser. No. 13/632,041 (Ref. No. NES0162-US) filed Sep. 30, 2012; U.S. Ser. No. 13/632,070 (Ref. No. NES0234-US) filed Sep. 30, 2012; U.S. Prov. Ser. No. 61/704,437 (Ref. No. NES0254-US) filed Sep. 21, 2012; PCT Application No. PCT/US12/20026 (Ref. No. NES0185-PCT) filed Jan. 3, 2012; PCT Application No. PCT/US12/00007 (Ref. No. NES0190-PCT), filed Jan. 3, 2012; and U.S. Ser. No. 13/269,501 (Ref. No. NES0120-US) filed Oct. 7, 2011.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A method of optimizing energy consumption of a heating, ventilation, and air conditioning (HVAC) system, comprising:
    identifying a schedule of temperature setpoints, the schedule of temperature setpoints defining a number of temperature setpoints over a time period;
    beginning with the schedule, for each of a succession of periodic time intervals that are each relatively short in comparison to an overall optimization time period, generating an incrementally adjusted version of the schedule as part of an automated schedule adjustment process executed by a thermostat, the incremental change being directed to a setpoint temperature of the number of temperature setpoints and causing less energy usage during one of the periodic time intervals as compared to a previous one of the periodic time intervals, wherein causing less energy usage comprises having a heating system of the HVAC system or an air conditioner of the HVAC system activated less than if the identified schedule was used for controlling the HVAC system; and
    for each of the succession of periodic time intervals, controlling the HVAC system according to the incrementally adjusted version of the schedule generated for the periodic time interval.

2. The method of claim 1, further comprising:
    identifying a subset of temperature setpoints within the schedule of temperature setpoints, the subset of temperature setpoints corresponding to a sub-interval of the time period over which the schedule of temperature setpoints is defined, wherein generating an incrementally adjusted version of the schedule includes adjusting the subset of temperature setpoints differently than temperature setpoints other than those in the subset.

3. The method of claim 2, further comprising:
    generating an occupancy probability profile that indicates a probability that a structure associated with the HVAC system will be occupied at various time; and
    determining time boundaries of the sub-interval based on the occupancy probability profile.

4. The method of claim 1, further comprising:
    receiving, during one of the periodic time intervals, a user selection of a current temperature setpoint that is different than a corresponding temperature setpoint of the incrementally adjusted version of the schedule generated for the periodic time interval; and
    controlling the HVAC system, for at least a certain time period within the one of the period time intervals, according to the user selected current temperature setpoint rather than the corresponding temperature setpoint of the incrementally adjusted version of the schedule.

5. The method of claim 4, wherein the HVAC system is controlled according to the user selection of the current temperature setpoint from the time of receiving the user selection to a time when a subsequent temperature setpoint of the incrementally adjusted version of the setpoint schedule generated for the one of the periodic time intervals is reached.

6. The method of claim 1, further comprising:
    receiving, for one of the periodic time intervals, a user modification to a temperature setpoint of the incrementally adjusted version of the schedule generated for the one of the periodic time intervals;
    incorporating the user modification into incrementally adjusted versions of the schedule generated for subsequent periodic time intervals; and
    for the subsequent periodic time intervals, controlling the HVAC system based on the incrementally adjusted versions of the scheduled that incorporate the user modification.

7. The method of claim 6 wherein for each periodic time interval following the one of the periodic time intervals, the incrementally adjusted version of the schedule is generated by incrementally adjusting the temperature setpoint as defined by the user modification rather than the temperature setpoint as defined by the schedule of temperature setpoint.

8. An intelligent network-connected thermostat for controlling an operation of an HVAC system in a smart home environment, the thermostat comprising:
    HVAC control circuitry operable to actuate one or more elements of the HVAC system;
    one or more sensors for measuring characteristics of the smart home environment; and
    a processor coupled to the HVAC control circuitry and the one or more sensors and operable to cause the thermostat to perform operations including:
        identifying a schedule of temperature setpoints;
        beginning with the schedule, for each of a succession of periodic time intervals that are each relatively short in comparison to an overall optimization time period, generating an incrementally adjusted version of the schedule as part of an automated schedule adjustment process, the incremental change being directed to a setpoint temperature of the number of temperature setpoints and causing less energy usage during one of the periodic time intervals as compared to a previous one of the periodic time intervals, wherein causing less energy usage comprises having a heating system of the HVAC system or an air conditioner of the HVAC system activated less than in accordance with the identified schedule; and
        for each of the succession of periodic time intervals, controlling the HVAC system according to the incrementally adjusted version of the schedule generated for the periodic time interval.

9. The thermostat of claim 8, wherein generating an incrementally adjusted version of the schedule includes, for each periodic time interval, offsetting a temperature of at least one temperature setpoint of the schedule in a direction that reduces energy consumption by the HVAC system.

10. The thermostat of claim 9, wherein the processor is further operable to cause the thermostat to perform operations including:
    receiving, during one of the succession of periodic time intervals, a user modification to a current temperature setpoint or to a temperature setpoint of the incrementally adjusted version of the schedule.

11. The thermostat of claim 10, wherein in response to receiving a user modification to a current temperature setpoint, the offset for subsequent periodic time intervals is at least temporarily reduced.

12. The thermostat of claim 11, wherein in response to receiving a user modification to a temperature setpoint of the incrementally adjusted version of the original schedule, the offset for subsequent periodic time intervals is at least temporarily reduced by an amount greater than the reduction resulting from a user modification to a current temperature setpoint.

13. The thermostat of claim 10, wherein in response to receiving a user modification to a current temperature setpoint or to a temperature setpoint of the incrementally adjusted version of the schedule, the offset for subsequent periodic time intervals is reduced by an amount that decreases over time.

14. A tangible non-transitory computer-readable storage medium including instructions that, when executed by a computer processor, cause the computer processor to perform operations including:
identifying a schedule of temperature setpoints, the original schedule of temperature setpoints defining a number of temperature setpoints over a time period;
beginning with the schedule, for each of a succession of periodic time intervals that are each relatively short in comparison to an overall optimization time period, generating an incrementally adjusted version of the schedule as part of an automated schedule adjustment process, the incremental change being directed to a setpoint temperature of the number of temperature setpoints and causing less energy usage during one of the periodic time intervals as compared to a previous one of the periodic time intervals, wherein causing less energy usage comprises having a heating system of the HVAC system or an air conditioner of the HVAC system activated less than in accordance with the identified schedule; and
for each of the succession of periodic time intervals, controlling the HVAC system according to the incrementally adjusted version of the schedule generated for the periodic time interval.

15. The storage medium of claim 14 further including instructions that, when executed by the computer processor, cause the computer processor to perform additional operations including:
identifying a first subset of temperature setpoints within the schedule of temperature setpoints, the first subset of temperature setpoints corresponding to a first sub-interval of the time period over which the original schedule of temperature setpoints is defined, the first sub-interval corresponding to a time period during which a structure associated with the HVAC system is likely to be occupied; and
identifying a second subset of temperature setpoints within the schedule of temperature setpoints, the second subset of temperature setpoints corresponding to a second sub-interval of the time period over which the schedule of temperature setpoints is defined, the second sub-interval corresponding to a time period during which a structure associated with the HVAC system is unlikely to be occupied;
wherein generating an incrementally adjusted version of the schedule includes adjusting the first subset of temperature setpoints differently than the second subset of temperature setpoints, the second subset being adjusted to reduce energy usage by a greater amount than an amount resulting from adjustments made to the first subset.

16. The storage medium of claim 14 further including instructions that, when executed by the computer processor, cause the computer processor to perform additional operations including:
identifying a first subset of temperature setpoints within the schedule of temperature setpoints, the first subset of temperature setpoints corresponding to a first sub-interval of the time period over which the schedule of temperature setpoints is defined;
wherein for a first set of the succession of periodic time intervals, generating an incrementally adjusted version of the schedule includes modifying temperature setpoints of the first subset of temperature setpoints.

17. The storage medium of claim 16 further including instructions that, when executed by the computer processor, cause the computer processor to perform additional operations including:
identifying a second subset of temperature setpoints within the schedule of temperature setpoints, the second subset of temperature setpoints corresponding to a second sub-interval of the time period over which the schedule of temperature setpoints is defined;
wherein for a second set of the succession of periodic time intervals following the first set of periodic time intervals, generating an incrementally adjusted version of the schedule includes modifying temperature setpoints of the second subset of temperature setpoints while simultaneously modifying temperature setpoints of the first subset of temperature setpoints.

18. The storage medium of claim 17 further including instructions that, when executed by the computer processor, cause the computer processor to perform additional operations including:
identifying a third subset of temperature setpoints within the schedule of temperature setpoints, the third subset of temperature setpoints corresponding to a third sub-interval of the time period over which the schedule of temperature setpoints is defined;
wherein for a third set of the succession of periodic time intervals following the second set of periodic time intervals, generating an incrementally adjusted version of the schedule includes modifying temperature setpoints of the third subset of temperature setpoints while simultaneously modifying temperature setpoints of the first subset of temperature setpoints and temperature setpoints of the second subset of temperature setpoints.

19. The storage medium of claim 18 wherein the temperature setpoints of the first subset, second subset, and third subset that are modified are all modified at the same rate of change.

20. The storage medium of claim 18 wherein the temperature setpoints of at least one of the first subset, second subset, and third subset that are modified are modified at a different rate of change in response to a user input.

* * * * *